(12) United States Patent
DeMarcken

(10) Patent No.: US 6,377,932 B1
(45) Date of Patent: Apr. 23, 2002

(54) RULES VALIDATION FOR TRAVEL PLANNING SYSTEM

(75) Inventor: Carl G. DeMarcken, Arlington, MA (US)

(73) Assignee: ITA Software, Inc., Cambridge, MA (US)

( * ) Notice: Subject to any disclaimer, the term of this patent is extended or adjusted under 35 U.S.C. 154(b) by 0 days.

(21) Appl. No.: 09/109,486

(22) Filed: Jul. 2, 1998

(51) Int. Cl.[7] .............................................. G06F 17/60
(52) U.S. Cl. ................................... 705/5; 705/6; 705/1
(58) Field of Search ................... 705/5, 6, 1

(56) References Cited

U.S. PATENT DOCUMENTS

| | | | |
|---|---|---|---|
| 4,862,357 A | 8/1989 | Ahlstrom et al. | 364/407 |
| 5,021,953 A | 6/1991 | Webber et al. | 364/407 |
| 5,177,684 A | 1/1993 | Harker et al. | 364/436 |
| 5,191,523 A * | 3/1993 | Whitesage | 705/6 |
| 5,237,499 A | 8/1993 | Garback | 364/407 |
| 5,253,166 A * | 10/1993 | Dettelbach et al. | 705/5 |
| 5,255,184 A | 10/1993 | Hornick et al. | 364/407 |
| 5,331,546 A * | 7/1994 | Webber et al. | 705/6 |
| 5,422,809 A * | 6/1995 | Griffin et al. | 705/5 |
| 5,570,283 A | 10/1996 | Shoolery et al. | 364/407 |
| 5,623,413 A | 4/1997 | Matheson et al. | 364/436 |
| 5,644,721 A | 7/1997 | Chung et al. | 395/206 |
| 5,732,398 A | 3/1998 | Tagawa | 705/5 |
| 5,794,172 A | 8/1998 | Matheson et al. | 701/117 |
| 5,797,127 A * | 8/1998 | Walker et al. | 705/5 |
| 5,832,454 A | 11/1998 | Jafri et al. | 705/6 |
| 5,838,973 A | 11/1998 | Carpenter-Smith et al. | 395/701 |
| 5,897,620 A | 4/1999 | Walker et al. | 705/5 |
| 5,948,040 A | 9/1999 | DeLorme et al. | 701/201 |

FOREIGN PATENT DOCUMENTS

| | | | | |
|---|---|---|---|---|
| EP | 0 451 371 A1 | 10/1991 | | |
| EP | 0 762 306 A2 | 3/1997 | | |
| WO | WO 89/07798 | * 8/1989 | | G06F/15/22 |
| WO | WO 97/08639 | 6/1997 | | |
| WO | WO 99/01822 | * 1/1999 | | G06F/15/00 |
| WO | WO 00/002152 | * 1/2000 | | G06F/17/60 |

OTHER PUBLICATIONS

Strom, David, "Embryonic use of SQL Server yields fare payoff", PC Week, pp. 2–3, Apr. 1989.*

Wong, J.–T., "Flexible assignment approach to itinerary seat allocation", Transportation Research, p. 1 (abstract), Feb. 1993.*

"Towards desktop personal travel agents", D.T. Ndumu, J.C. Collis and H.S. Nwana, BT Technol. J., vol. 16, No. 3, Jul. 1998, pp. 69–78.

* cited by examiner

*Primary Examiner*—Tariq R. Hafiz
*Assistant Examiner*—Akiba Robinson-Boyce
(74) *Attorney, Agent, or Firm*—Fish & Richardson P.C.

(57) ABSTRACT

An airline travel planning system is described. The system includes a server computer executing a server process including a search process to search for set of pricing solutions in accordance with at least one destination and at least one origin. The search process represents the set of pricing solutions in the form of a directed acyclic graph. The system also includes a client computer executing a client process on the set of pricing solutions. The client process has a manipulation process that manipulates the set of pricing solutions in response to user preferences. Several processes are described including a process responsive to user preferences and to set of pricing solutions that provides pricing solutions sorted by said user preference, a process that sorts set of pricing solutions to produce a subset of said set of pricing solutions in accordance with user specified preferences, and a process that prunes from the directed acyclic graph nodes that are no longer contained within the subset of set of pricing solutions.

29 Claims, 33 Drawing Sheets

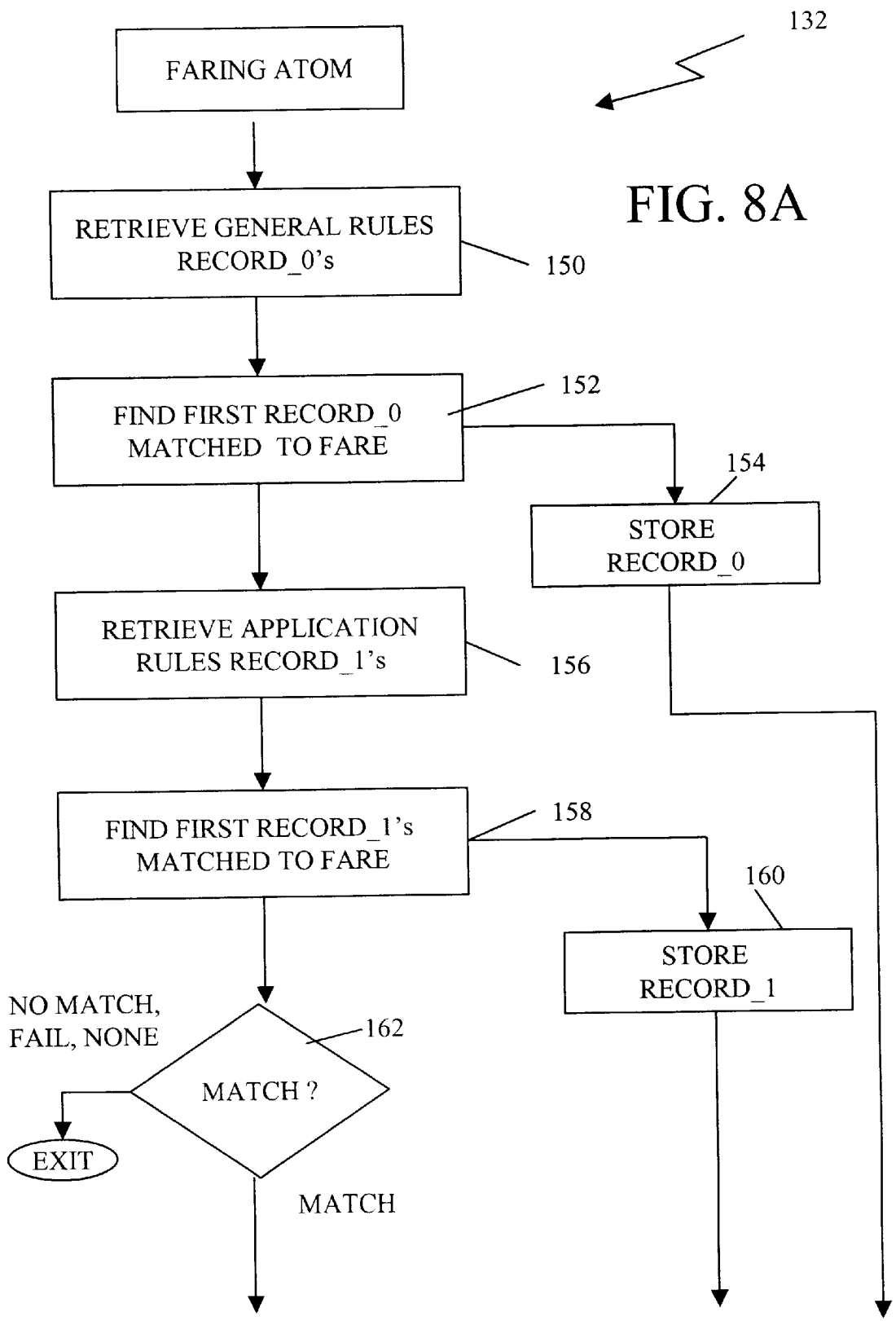

FIG. 23

| Layover | Departure Point | Flight | Date | Departure | Arrival | Elapsed | Airline | Aircraft Type |
|---|---|---|---|---|---|---|---|---|
| | ESB Ankara | TK 109 | June 4 | Wed, 8:00 | Wed, 9:05 | 1:05 | Turkish Airline | Boeing 737-400 |
| 1:40 | IST | TK 581 | June 4 | Wed, 10:45 | Wed, 15:00 | 11:15 | Turkish Airline | Airbus A310 300 |
| 17:45 | JFK | HP 2011 | June 5 | Thur, 8:45 | Thur, 11:10 | 5:25 | America West | Boeing 757 - 200 Pass |
| (1:00) | LAS | HP 2011 | June 5 | Thur, 12:10 | Thur, 13:12 | 1:02 | America West | Boeing 757 - 200 Pass |
| | SAN San Diego | | June 5 | | Thur, 13:12 | 39:12 | | |

Fares

| Count | Airline | Market | OW/RT | Code | Class | Amount |
|---|---|---|---|---|---|---|
| 1 | HP | NYC-SAN | OW | H | Economy Class (Discounted) | $469.00 |
| 1 | TK | NYC-IST | OW | Y2 | Economy Class | $858.00 |
| 1 | TK | ANK-IST | OW | Y | Economy Class | $106.00 |
| | | | | | | $1433.00 |

RULES VALIDATION FOR TRAVEL PLANNING SYSTEM

BACKGROUND

This invention relates to computerized travel planning systems.

Travel planning systems are used to produce itineraries and prices by selecting suitable travel units from databases containing geographic, scheduling and pricing information. In the airline industry, fundamental travel units include "flights" (sequences of regularly scheduled takeoffs and landings assigned a common identifier) and "fares" (prices published by airlines for travel between two points). The term "itinerary" is often used to refer to a sequence of flights on particular dates, and the term "pricing solution" is often used to refer to a combination of fares and itineraries that satisfies a travel request.

The databases usually contain schedule information provided by airlines, typically in the so-called Standard Schedules Information Manual (SSIM) format, and usually fares published by airlines and resellers, typically provided through the intermediary Airline Tariff Publishing Company® (ATPCO). The database may also contain "availability" information that determines whether space is available on flights, or this may be obtained through communication links to external sources such as airlines.

Presently, so-called computer reservation system (CRSs) operate to produce fare and schedule information. There are four generally known computer reservation systems that operate in the United States, Sabre®, Galileo®, Amadeus® and WorldSpan®. The typical CRS contains a periodically updated central database that is accessed by subscribers such as travel agents through computer terminals. The subscribers use the computer reservation system to determine what airline flights are operating in a given market, what fares are offered and whether seats are available on flights to make bookings and issue tickets to clients.

The computer reservation systems typically conduct searches using the information contained in the database to produce itineraries that satisfy a received request. The search results are sorted and returned to the requester s computer for display. Typically, the number of possible itineraries and pricing solutions that are returned by a CRS is a small portion of the total set that may satisfy a passengers request.

SUMMARY

According to an aspect of the invention, a method of validating fares in a travel planning system includes retrieving a fare rule for a fare, applying the rule to an itinerary to determine if the fare can be used with the itinerary; and storing results of applying the rule.

According to an additional aspect of the invention, a method for retrieving rules over multiple travel dates includes retrieving rules from a rules database that divides rules according to sets of records having travel dates and finding a first record from the sets of records that is matched to a current fare. The method also includes storing a result of applying the matched record and storing a latest travel date for which the result remains valid and determining for subsequent travel dates whether the subsequent travel date falls within a bound defined by the stored date.

According to a further aspect of the invention, a method of validating faring atoms for an airline travel planning system includes retrieving a faring atom and determining whether a previous result of applying a current rule is stored and if the previous result is stored, returning the previous result stored for the current rule.

According to a still further aspect of the invention, a computer program product residing on a computer readable medium for validating faring atoms, for inclusion in a pricing solution of a travel planning system, includes instructions for causing a computer to retrieve rules from a rules database that divides rules according to hierarchical sets of records, search each hierarchical set of records for a first record from the hierarchical sets of records that matches a current faring atom and store matched records and a latest date for which a result of applying the matched record remains valid. The program also includes instructions to cause the computer to determine for a subsequent travel date of the faring atom whether the subsequent travel date of the faring atom falls within a bound defined by the stored travel date; and if the subsequent travel date does fall within the bound of the stored date and use a rule corresponding to the stored travel date to validate the faring atom.

According to a still further aspect of the invention, a travel planning system, includes a computer and a computer readable medium. The computer readable includes a computer program product residing on the computer readable medium for validating faring atoms, for inclusion in a pricing solution provided by the travel planning system and includes instructions for causing to retrieve rules from a rules database that divides rules according to hierarchical sets of records, search the hierarchical set of records for a first record from the hierarchical set of records that matches a current faring atom, store matched records and a latest travel date for which a result of applying the matched record remains valid and determine for a subsequent travel date of the faring atom whether the subsequent date falls within a bound defined by the stored travel date; and if the subsequent date does fall within the bound of the stored date, use a stored result corresponding to the stored travel date to validate the faring atom.

BRIEF DESCRIPTION OF THE DRAWINGS

The foregoing features and other aspects of the invention will be described in further detail by the accompanying drawings, in which:

FIGS. 8A–8C are flow charts showing a process for retrieving fare rules.

FIG. 23 is a diagram of a window depicting an itinerary and associated fares corresponding to one of the solutions depicted in FIG. 21.

DETAILED DESCRIPTION

Figure 1:
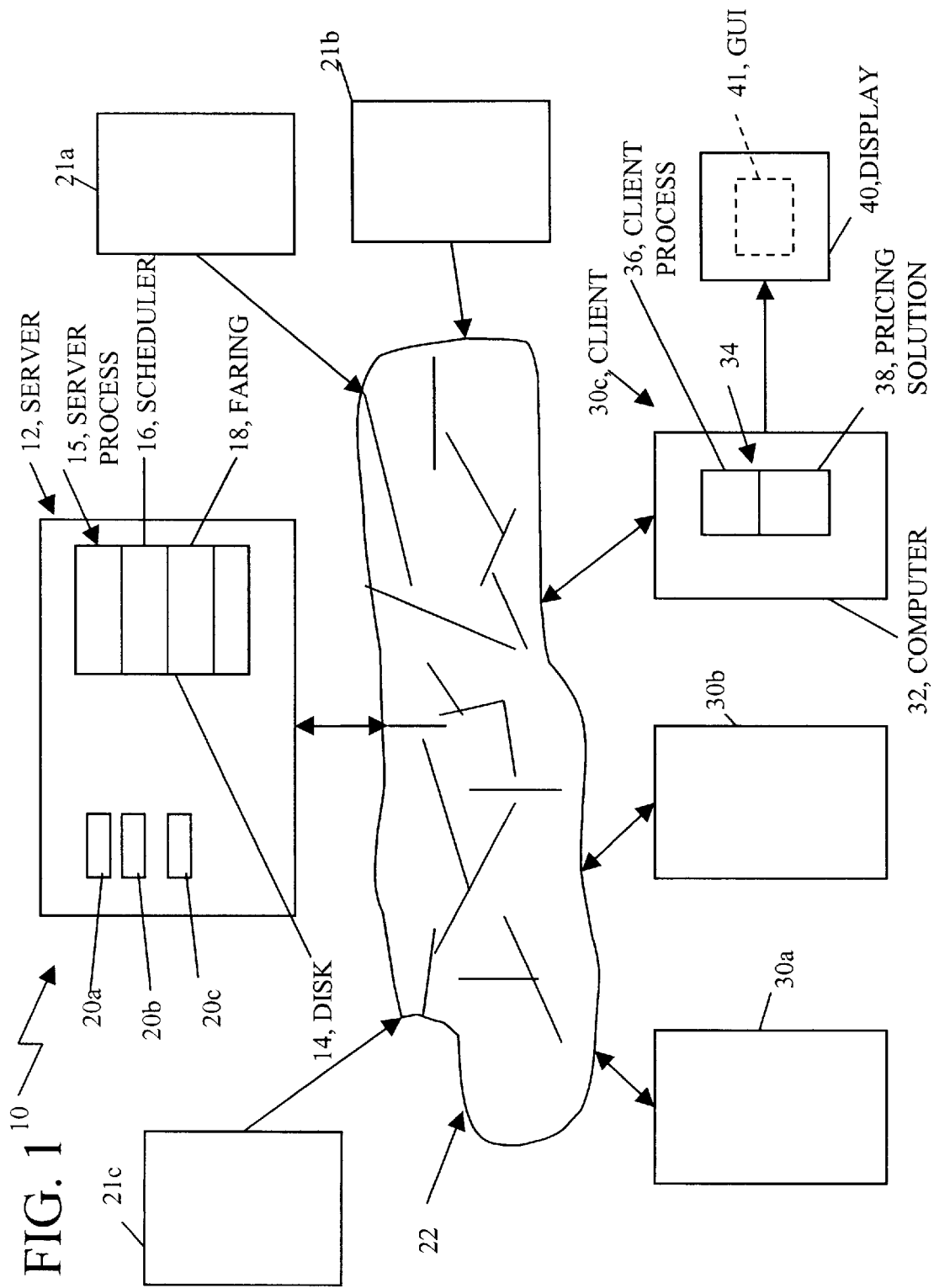
FIG. 1 is a block diagram of a client server travel planning system.

Referring now to FIG. 1, a travel planning system 10 is shown. The travel planning system can be used with various forms of travel such as airline, bus and railroad and is particularly adapted for air travel. It includes a server computer 12 having a computer memory or storage media 14 storing a server process 15. The server process includes a scheduler process 16 and a faring process 18. The scheduler process 16 is any suitable scheduler process that will produce from a travel request sets of flights that can satisfy the request. The faring process 18 is a process that determines a set of valid fares and links the set of valid fares to the sets of flights to form a pricing solution. The server process 15 can be configured to produce other travel-related information as a result of a user query. For example, the server process 12 can produce routes or airline suggestions, optimal travel times and suggestions for alternative requests.

The travel planning system 10 also includes a plurality of databases 20a, 20b which store industry-standard information pertaining to travel (e.g., airline, bus, railroad, etc.). For example, database 20a can store the Airline Tariff Publishing Company database of published airline fares and their associated rules, routings and other provisions, the so-called ATPCO database. Database 20b can be an inventory of current availability of airline information for a particular carrier and so forth. The databases 20a–20b are typically stored locally and updated periodically by accessing remote resources 21a, 21b that maintain the respective databases.

The system 10 also includes a plurality of clients 30a–30c (generally, 30) implemented by terminals or preferably personal computers. The clients 30a–30c are coupled to the server 12 via a network 22 which is also used to couple the remote resources (21a–21c) that supply the databases 20a–20b to the server 12. The network 22 can be any local or wide area network or an arrangement such as the Internet.

The clients 30a–30c are preferably smart clients. That is, using client 30c as an illustrative example, client 30c includes a client computer system 32 including a computer memory or storage media 34 that stores a client process 36 and a set of pricing solutions 38. The set of pricing solutions 38 in one embodiment is provided from the server process 15 and comprises a set of fares that are valid for a journey, and associated information linking the fares to the flight segments of the journey.

The set of pricing solutions 38 is obtained from the server 12 in response to a user request sent from the client 30c to the server 12. The server 12 executes the server process 15 using the scheduling process 16 and the faring process 18 to produce a set of pricing solutions for a particular journey. If requested by the client, for example client 30c, the server 12 will deliver the set of pricing solutions 38 to the requesting client 30c. Under control of the client process 36, the requesting client 30c can store and/or logically manipulate the set of pricing solutions 38 to extract or display a subset of the set of pricing solutions as a display representation 41 on the monitor 40.

SERVER PROCESS

Figure 2:
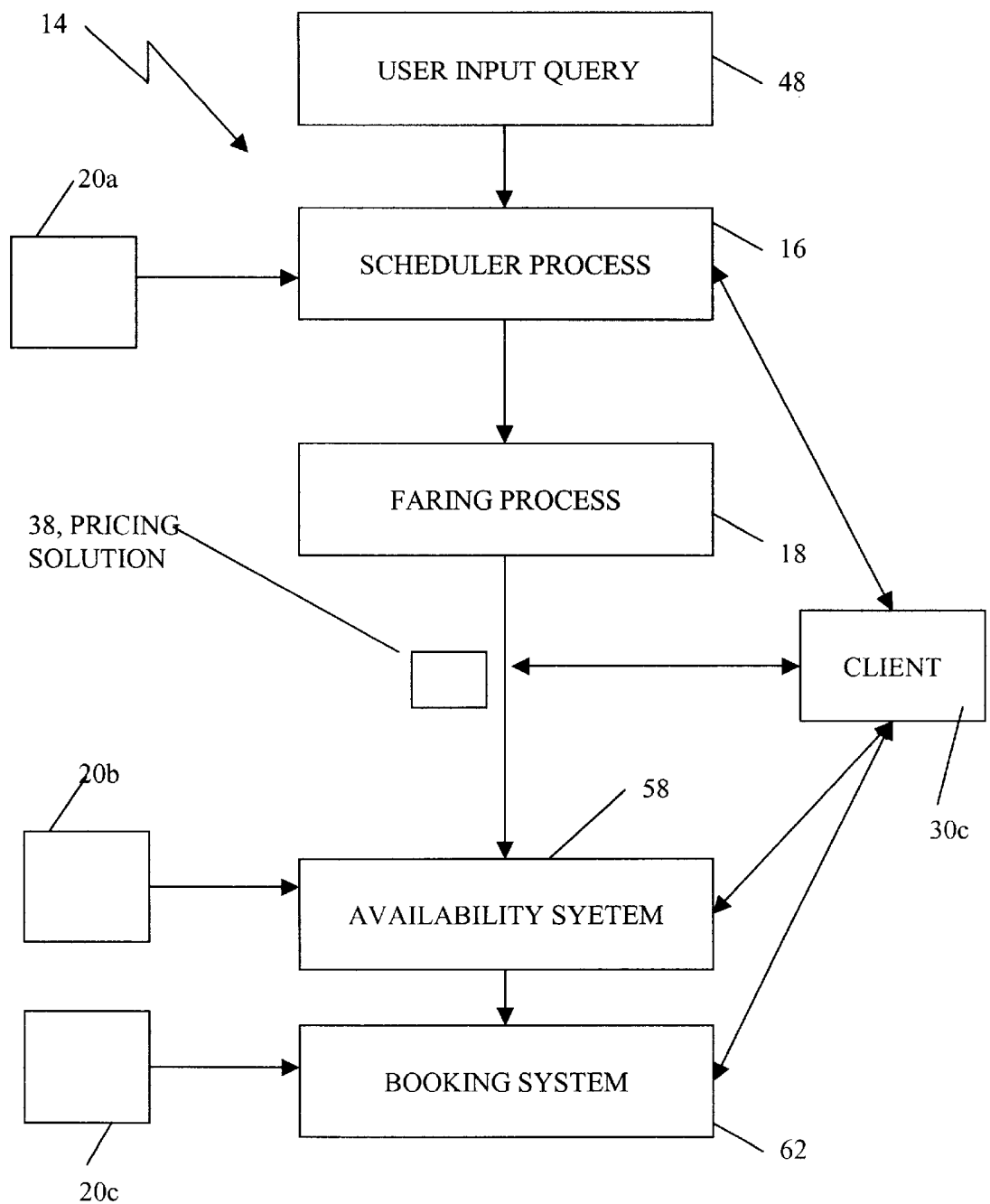
FIG. 2 is a flow chart showing a server process used in the system of FIG. 1.

Referring now to FIG. 2, the server process 18 is preferably executed on the server computer 12 but could be executed on the client computer 32. The server process 18 is responsive to a user input query 48. The user input query 48 would typically include minimal information needed to determine a set of pricing solutions. This information typically requires at a minimum, an origin and a destination for travel. In addition, the information could also include times, dates and so forth.

This query 48 is fed to the scheduler process 16 that produces a large number of itineraries, that is, sequences of flight segments between the origin and destination for each slice of a journey. Examples of scheduler systems that may be used include the OAG Flight Desk® (Official Airlines Guide, a division of Reed Travel Group) or schedule components of computer reservation systems (CRS's) such as Sabre®, Apollo®, Amadeus® and WorldSpan®. It is preferable in order to obtain the largest number of possible itineraries to use a scheduler with dynamic connection generation. Such a scheduler is described in co-pending patent application entitled SCHEDULER SYSTEM FOR TRAVEL PLANNING SYSTEM, Ser. No. 09/109,622, filed on Jul. 2, 1998 by Carl G. deMarcken et al. and assigned to the assignee of the invention and incorporated herein by reference.

The scheduler process 16 provides the itineraries to a faring process 18. The faring process 18 provides a set of pricing solutions 38 by finding valid fares corresponding to the itineraries produced by the scheduler process 16. The faring process 18 validates the fares for inclusion in the set of pricing solutions 38.

The set of pricing solutions 38 is used by an availability system 58 that interrogates an airline inventory database 20b to determine whether there are seats available on particular flights for particular pricing solutions. The availability system 58 uses the airline inventory database 20b as a filter to remove from the set of pricing solutions 38 those pricing solutions for which there are not available seats. The availability system 58 is shown after the faring process 18. However, it could be included at nearly any point in the server process 18. In addition, it is shown being fed by the pricing solution when it may only receive flight information from the scheduler process 16 depending on the airline.

The client system 30c receives the results from the server process 18. These results are the set of pricing solutions 38 and/or pricing solutions based upon availability. The client process 36 executed in the client 30c uses this information or a subset of it to access a booking system 62 to provide a booking and reservation for a user selected, enumerated pricing solution, as will be described below.

CLIENT PROCESS

Figure 3:
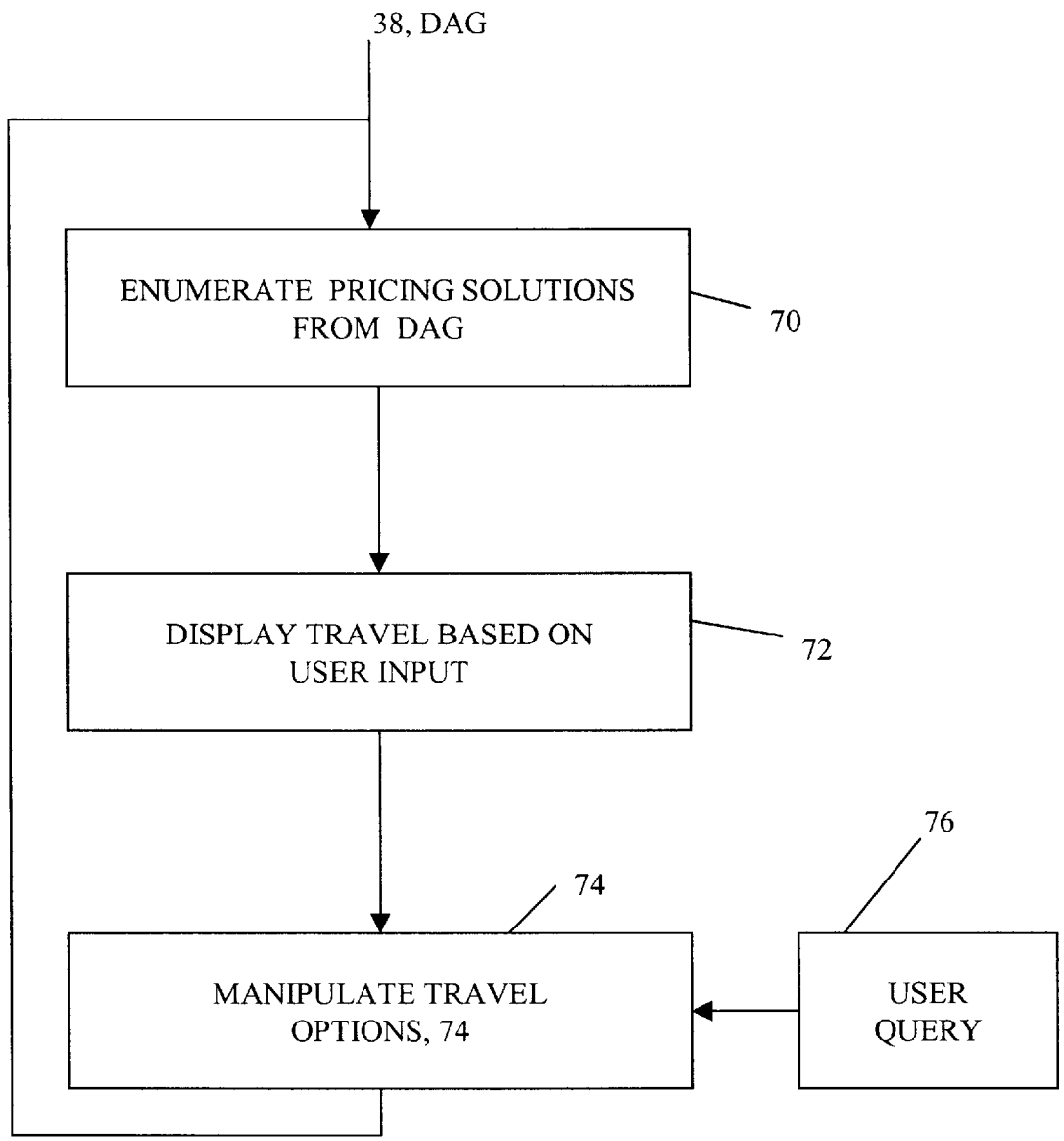
FIG. 3 is a flow chart showing a client process used in the system of FIG. 1.

Referring now to FIG. 3, the client process 36 receives a listing of possible itineraries from the scheduler process 16 as well as the set of fares from the faring process 18 or the availability system 58. The set of pricing solutions 38, if obtained from the faring process 18, will include a large number of pricing solutions for which there is not any available inventory. Therefore, the components would need to be first checked out with an airline prior to booking. The set of pricing solutions 38 if obtained after the availability system 58 should contain pricing solutions which have a high degree of availability for booking on an airline.

In one embodiment, the set of pricing solutions 38 is provided in a compact representation 38'. A preferred, compact representation 38' of the set of pricing solutions 38 is as a data structure comprising a plurality of nodes including itineraries and fares and that can be logically manipulated using value functions to enumerate a set of pricing solutions. One preferred example is a graph data structure type particularly a directed acyclic graph (DAG) that contains nodes that can be logically manipulated or combined 74 to extract 75 a plurality of pricing solutions for display 72.

The client process 36 receives the flight information from scheduler process 16 and the pricing solution from the faring process 18 or the availability system 56 and enumerates pricing solutions from the directed acyclic graph (DAG) representation. The enumerated 70 set of pricing solutions is rendered or displayed 72 in a graphical user interface 41 on the client monitor 40 (FIG. 1) in a manner as will be described below.

In response to user input 76, the client 40 can manipulate 74 travel options and can query the local copy of the DAG to produce and display a subset of pricing solutions enumerated from the DAG that satisfy the query 76. The manipulation process used to control the display and change the travel options will be described below.

A directed acyclic graph (DAG) is used to represent the compact set of pricing solutions 38' since, in general, the number of nodes needed to represent a typical pricing solution will be substantially less than the actual number of pricing solutions represented by the DAG. This significantly increases the efficiency of transfer of a set of pricing solutions 38 from the server process 18 to the client process 36. The DAG representation also minimizes the storage requirements for the set of pricing solutions 38. The DAG representation permits the use of powerful search, sorting and manipulation processes to produce various subsets of set of pricing solutions in an efficient manner. As used herein, a directed acyclic graph (DAG) is a set of nodes connected by directed arcs, that have no loops of arcs in the same direction. If a node A is connected to a node B via an arc A→B, then A is called a parent of B, and B is called a child of A. Each node may have zero, one or many parents and zero, one or many children. As used herein, a pricing solution that is represented by a graph will be referred to as a pricing graph.

PRICING-GRAPH

A pricing graph that is produced by the faring process 18 and that represents a pricing solution includes three types of nodes. The first type of node is an exclusive node, i.e., "OR" node. An OR node N with children A, B and C represents an exclusive choice between A, B and C. In other words, a pricing-solution involving node N contains either the fares and itineraries represented by A, or by B, or by C.

The second type of node is a collection node, i.e., an "AND" node. An AND node N with children A, B and C represents the sum of A, B and C. In other words, a pricing solution involving N contains all the fares and itineraries found within A, B and C.

The third type of node is a terminal node. Terminal nodes are used to hold pricing objects. Pricing objects include fares, itineraries, surcharges, routes, prices, booking codes, taxes, rules/restrictions and other information of the user or information that might be part of a travel option. Collectively, "AND" and "OR" nodes are non-terminal nodes.

An example of the pricing-graph for a hypothetical round-trip journey is presented below in TABLE 1. For each node, its type and children are listed. If a node is a terminal, the fare or itinerary is provided. Many nodes in the pricing graph have more than one parent.

TABLE 1

| Node | Type | Children | Object |
|---|---|---|---|
| 0 | OR | Nodes 1, 2, 3 | |
| 1 | AND | Nodes 10, 14, 17, 17 | |
| 2 | AND | Nodes 4, 5 | |
| 3 | AND | Nodes 13, 15, 19, 19 | |
| 4 | OR | Nodes 8, 9 | |
| 5 | OR | Nodes 6, 7 | |
| 6 | AND | Nodes 14, 16 | |
| 7 | AND | Nodes 15, 18 | |
| 8 | AND | Nodes 13, 16 | |
| 9 | AND | Nodes 13, 18 | |
| 10 | OR | Nodes 11, 12 | |
| 11 | Itin. | | Slice 1: BOS→LAX UA023 |
| 12 | Itin. | | Slice 1: BOS→DFW UA100, DFW→LAX UA103 |
| 13 | Itin. | | Slice 1: BOS→SAN NW222 |
| 14 | Itin. | | Slice 2: LAX→BOS UA515 |
| 15 | Itin. | | Slice 2: SAN→BOS NW223 |
| 16 | Fare | | UA BOS-LAX One-way "Y" |
| 17 | Fare | | UA BOS-LAX Round-trip "QE7NR" |
| 18 | Fare | | NW BOS-SAN One-way "F" |
| 19 | Fare | | NW BOS-SAN Round-trip "H7NR" |

This pricing-graph represents a total of nine pricing solutions. These solutions can be extracted from the pricing-graph descending from the root node, node 0. At every OR node a choice between children is made, and the choice determines the pricing-solution that results. At every AND node each child branch is descended, and the results are combined.

The term BOS→LAX UA023 is an itinerary which uses standard nomenclature to represent airports BOS and LAX, airline UA, and flight number 023. In general, conventional nomenclature used in the airline industry will be used herein.

The set of pricing-solutions that represented in the pricing-graph is presented in TABLE 2 below.

TABLE 2

| Solution Number | Itineraries | Fares |
|---|---|---|
| 1 | Slice 1: BOS→LAX UA023 | UA BOS-LAX RT "QE7NR" |
|   | Slice 2: LAX→BOS UA515 | UA BOS-LAX RT "QE7NR" |
| 2 | Slice 1: BOS→LAX UA023 | UA BOS-LAX OW "Y" |
|   | Slice 2: LAX→BOS UA515 | UA BOS-LAX OW "Y" |
| 3 | Slice 1: BOS→LAX UA023 | UA BOS-LAX OW "Y" |
|   | Slice 2: SAN→BOS NW223 | NW BOS-SAN OW "F" |
| 4 | Slice 1: BOS→DFW UA100, DFW_LAX UA103 | UA BOS-LAX RT "QE7NR" |
|   | Slice 2: LAX→BOS UA515 | UA BOS-LAX RT "QE7NR" |
| 5 | Slice 1: BOS→DFW UA100, DFW_LAX UA103 | UA BOS-LAX OW "Y" |
|   | Slice 2: LAX→BOS UA515 | UA BOS-LAX OW "Y" |
| 6 | Slice 1: BOS→DFW UA100, DFW_LAX UA103 | UA BOS-LAX OW "Y" |
|   | Slice 2: SAN→BOS NW223 | NW BOS-SAN OW "F" |
| 7 | Slice 1: BOS→SAN NW222 | NW BOS-SAN OW "F" |
|   | Slice 2: LAX→BOS UA515 | UA BOS-LAX OW "Y" |
| 8 | Slice 1: BOS→SAN NW222 | NW BOS-SAN RT "H7NR" |
|   | Slice 2: SAN→BOS NW223 | NW BOS-SAN RT "H7NR" |
| 9 | Slice 1: BOS→SAN NW222 | NW BOS-SAN OW "F" |
|   | Slice 2: SAN→BOS NW223 | NW BOS-SAN OW "F" |

The pricing-graph encodes the requirement that two itineraries are combined, one from slice 1 and one from slice 2, to form a pricing solution. Further, each itinerary is spanned by fares. In this case each pricing solution involves two fares, and round-trip fares are combined with like round-trip fares. In most circumstances, the number of nodes in the pricing-graph is small compared to the number of pricing-solutions those nodes represent. In many cases, a graph of 10,000 or so nodes can represent more than 1,000,000,000 pricing-solutions.

Figure 3A:
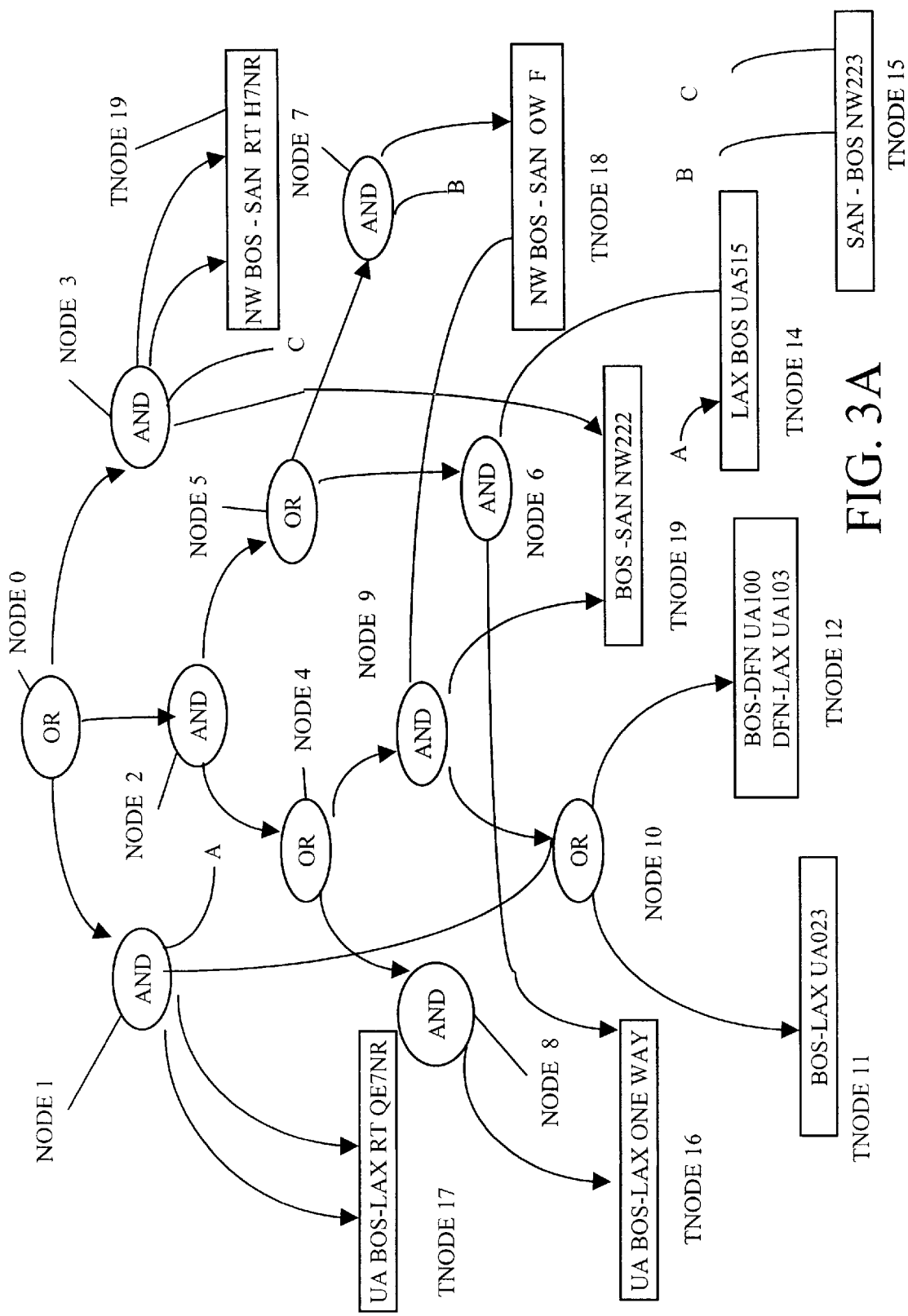
FIGS. 3A–3B are diagrammatic representations of pricing graphs.

Referring now to FIG. 3A, the nodes of the pricing graph corresponding to Table 1 are shown, as an example. This figure illustrates the manner in which nodes in the pricing graph data structure as represented in Table 1 are combined to provide the pricing solutions shown in Table 2. Using pricing solution No. 1 (from TABLE 2) as an example, it can be shown that starting at the top of the graph at node 0, node 0 allows for a choice between nodes 1, 2, and 3. For pricing solution No. 1, Node 1 is chosen. Node 1 is the AND node that points to nodes 10 and 14, and has two pointers to node 17. Node 10 is an OR node which provides a choice of either nodes 11 or nodes 12. Node 11 as shown in FIG. 3A corresponds to a terminal node, the itinerary (BOS-LAX UA 023). Node 12 corresponds to a terminal node, the itinerary BOS-DFN UA 100, DFN-LAX UA 103. This second choice in node 10 will provide pricing solutions corresponding to numbers 4–6, respectively. Therefore, selecting node 11 provides the itinerary for the first slice of solution 1. The fare for pricing solution 1 is provided by node 17 which has two pointers, one for each slice, to the fare "US BOS-LAX RT QE7NR" corresponding to the fare shown for pricing solution no. 1 in Table 2 for the first slice. The second itinerary for pricing solution no. 1 is provided by node 14 which is referenced in AND node 1 that points to the itinerary LAX-BOS UA 515. The corresponding fare is also from terminal node 17 since it is a round trip fare UA BOS-LAX RT QE7NR.

A second one of the pricing solutions, for example, the pricing solution 4 incorporating the terminal node 12 is provided by starting at node 0, and using node 1. Node 1 is an AND node requiring that nodes 17 (twice), node 10, and node 14 be included. Node 10 is an OR node as mentioned above and is used to select node 12 which is the itinerary including segments "BOS→DFW UA 100" and "DFW→LAX UA 103". From node 1, node 14 the return itinerary LAX-BOS UA 515 also is reached. Node 17 also is chosen which contain the round trip fares. Similarly, the remaining ones of the pricing solutions can be extracted from the pricing graph in the same manner as the two examples given above.

As mentioned above, a graph will typically have many more pricing solutions than nodes in the graph. The example just illustrated in conjunction with FIG. 3A has 9 pricing solutions and 19 nodes which is an exception to that general rule. Another example of a pricing graph which does satisfy that general observation is shown in conjunction with FIG. 3B.

Figure 3B:
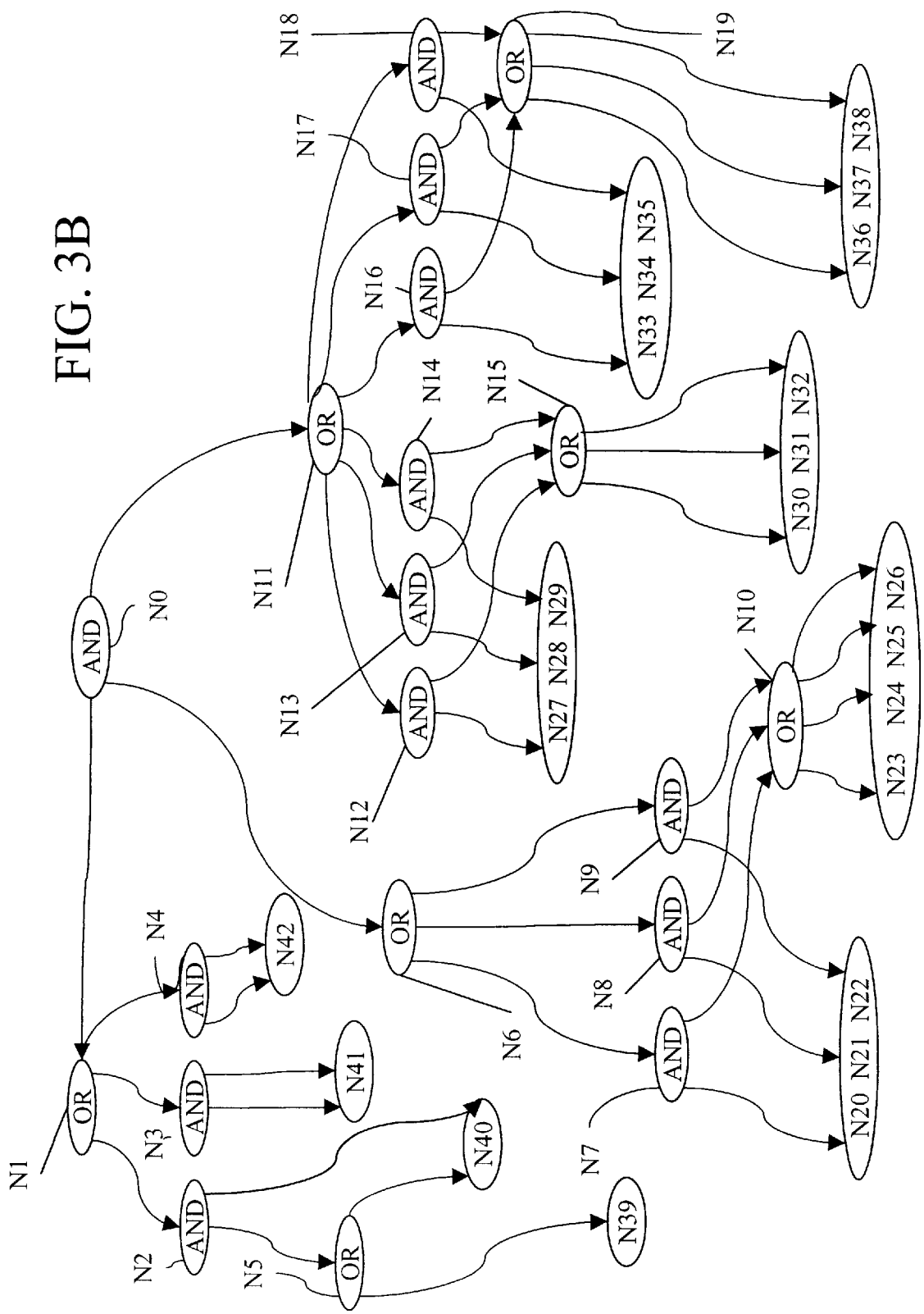

Referring now to FIG. 3B, a pricing graph is shown having 43 nodes NO–N42 that when combined represent 856 pricing solutions. Each node in the pricing graph has a number associated with it corresponding to the number of pricing solutions that is represents. In order to make this illustration of manageable size, identifiers (representing the nodes of the terminals) are substituted in the pricing graph for the actual terminal objects of the graph. Thus, as shown in FIG. 3B, outbound and return itineraries, and fare nodes are represented by the Nodes N20–N42

This pricing graph (TABLE 3) has 9 itineraries which can be combined with 14 fares represented by 13 AND nodes and 7 OR nodes. The pricing objects are represented by 23 nodes. The pricing graph has a combined total of 43 nodes to represent 876 pricing solutions.

FIG. 3B shows examples of a pricing graph for a round trip LAX-BOS journey. This example shown in FIG. 3B is generally more representative of an outcome of a faring search. That is, generally the pricing graph represents more pricing solutions than nodes contained in the graph.

TABLE 3

| Node | Type | Children | Object |
|---|---|---|---|
| 0 | AND | Nodes 1, 6, 11 | |
| 1 | OR | Nodes 2, 3, 4 | |
| 2 | AND | Nodes 5, 40 | |
| 3 | AND | Nodes 41, 41 | |
| 4 | AND | Nodes 42, 42 | |
| 5 | OR | Nodes 39, 40 | |
| 6 | OR | Nodes 7, 8, 9 | |
| 7 | AND | Nodes 20, 10 | |
| 8 | AND | Nodes 21, 10 | |
| 9 | AND | Nodes 22, 10 | |
| 10 | OR | Nodes 23, 24, 25, 26 | |
| 11 | OR | Nodes 12, 13, 14, 16, 17, 18 | |
| 12 | AND | Nodes 27, 15 | |
| 13 | AND | Nodes 28, 15 | |
| 14 | AND | Nodes 29, 15 | |
| 15 | AND | Nodes 30, 31, 32 | |
| 16 | AND | Nodes 33, 19 | |
| 17 | AND | Nodes 34, 19 | |
| 18 | AND | Nodes 35, 19 | |
| 19 | OR | Nodes 36, 37, 38 | |
| 20 | Itin. | | Slice 1: LAX→DFW NW100, DFW→BOS AA223 |
| 21 | Itin. | | Slice 1: LAX→DFW NW137, DFW→BOS AA223 |
| 22 | Itin. | | Slice 1: LAX→DFW NW137, DFW→BOS AA414 |
| 23 | Fare | | DFW, LAX NW "Y" OW |
| 24 | Fare | | DFW, LAX NW "F" OW |
| 25 | Fare | | DFW, LAX NW "C" OW |
| 26 | Fare | | DFW, LAX NW "QA7" OW |
| 27 | Itin. | | Slice 2: BOS→DFW AA67, DFW→LAX CO716 |
| 28 | Itin. | | Slice 2: BOS→DFW AA67, |

TABLE 3-continued

| Node | Type | Children | Object |
|---|---|---|---|
| | | | DFW→LAX CO717 |
| 29 | Itin. | | Slice 2: BOS→DFW AA67, |
| | | | DFW→LAX CO719 |
| 30 | Fare | | DFW, LAX CO "F" OW |
| 31 | Fare | | DFW, LAX CO "C" OW |
| 32 | Fare | | DFW, LAX CO "Y" OW |
| 33 | Itin. | | Slice 2: BOS→DFW AA852, |
| | | | DFW→LAX DL186 |
| 34 | Itin. | | Slice 2: BOS→DFW AA852, |
| | | | DFW→LAX DL180 |
| 35 | Itin. | | Slice 2: BOS→DFW AA852, |
| | | | DFW→LAX DL343 |
| 36 | Fare | | DFW, LAX DL "F" OW |
| 37 | Fare | | DFW, LAX DL "C" OW |
| 38 | Fare | | DFW, LAX DL "Y" OW |
| 39 | Fare | | DFW, BOS AA "QE7NR" RT |
| 40 | Fare | | DFW, BOS AA "QE7IP" RT |
| 41 | Fare | | DFW, BOS AA "QE14NR" RT |
| 42 | Fare | | DFW, BOS AA "QE21NR" RT |

THE FARING SYSTEM

Figure 4A:
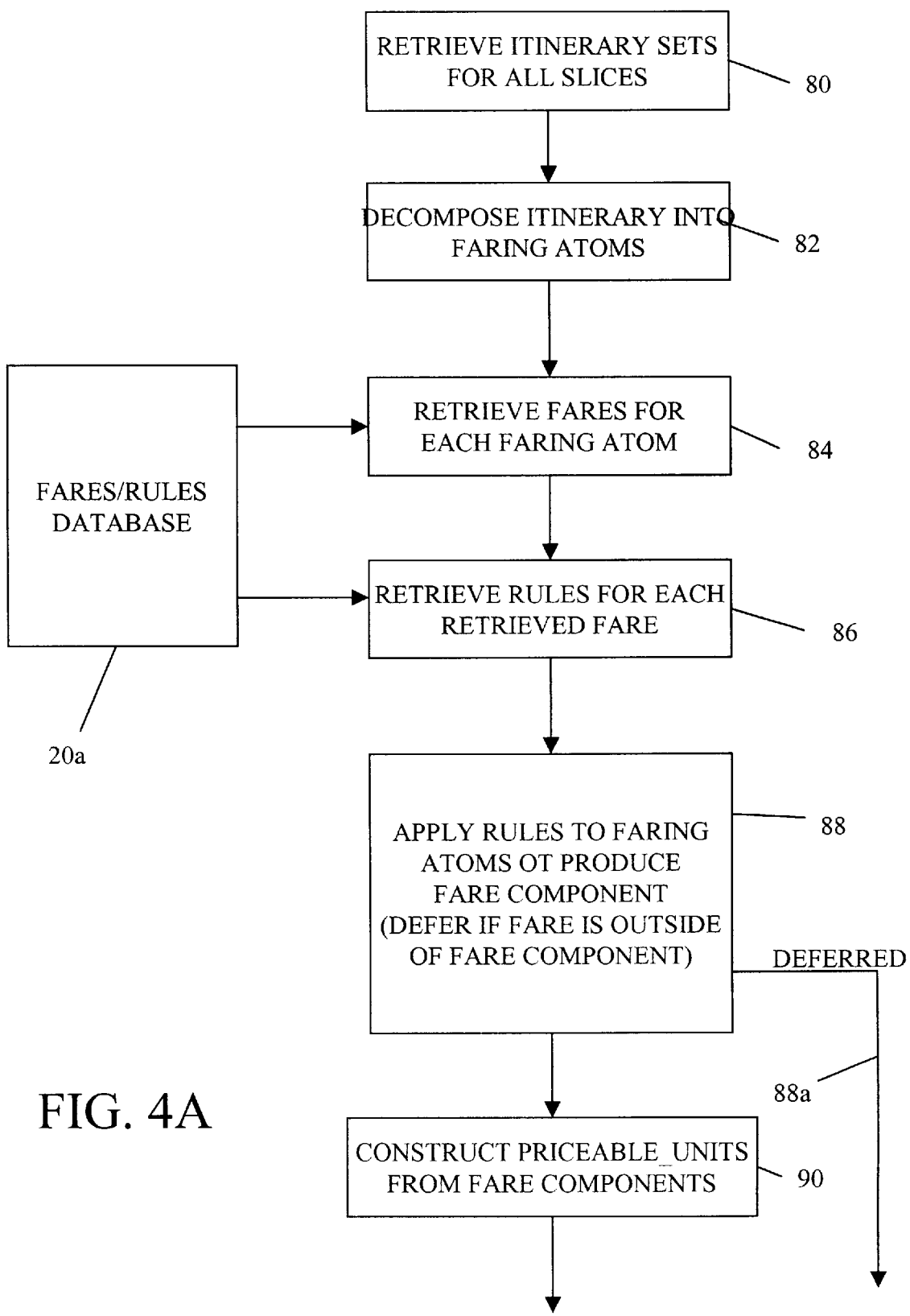
FIGS. 4A–4B are flow charts showing a faring process used in the server process of FIG. 2.
Figure 4B:
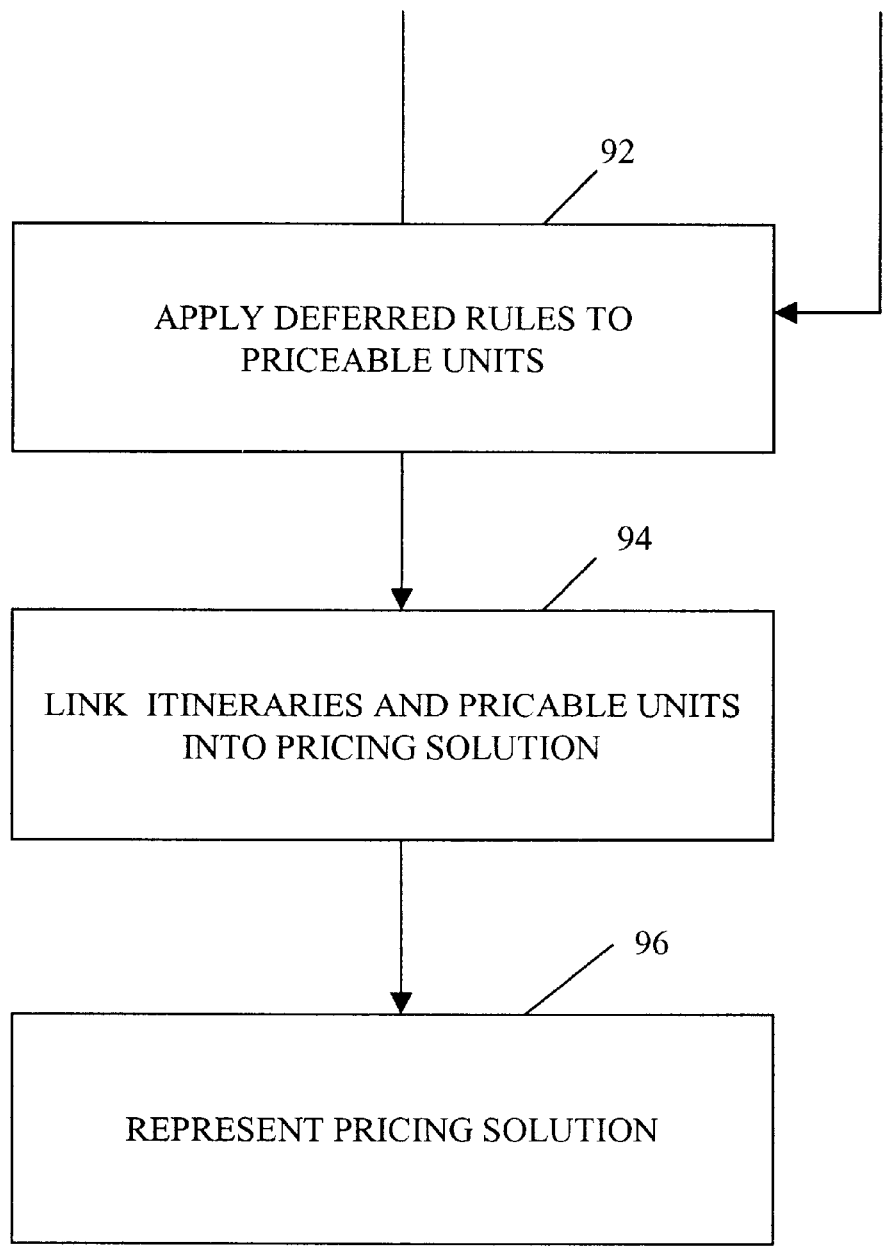

Referring now to FIGS. 4A and 4B, the faring process 18 includes a process 80 to retrieve itinerary sets for all slices in an itinerary. The itinerary sets are provided from the scheduler process 16 for each slice of a journey where a slice corresponds to a direction of travel. Thus, for example, for a round trip journey there would be two slices, one for the outbound part of the journey and one for the return part of the journey. The faring process 18 decomposes 82 the itinerary into faring atoms. As used herein, faring atoms refer to a sequence of flight segments or equivalently legs that are spanned by a single fare. For example, the itinerary UA005 from DFW to BOS at 12:30 on 12NOV UA010 from BOS to YYZ at 18:00 on 12NOV AC121 from YYZ to YVR at 01:00 on 13NOV permits the following faring-atoms as shown in TABLE 4.

TABLE 4

| Faring-Atom Number | Legs and Departure Times |
|---|---|
| 1 | DFW→BOS UA005 12NOV 12:30 |
| 2 | BOS→YYZ UA010 12NOV 18:00 |
| 3 | DFW→BOS UA005 12NOV 12:30 |
| | BOS→YYZ UA010 12NOV 18:00 |
| 4 | YYZ→YVR AC121 13NOV 01:00 |

A faring atom is represented by a data structure that preferably includes the following fields as shown in TABLE 5:

TABLE 5

| Faring-Atom fields | Use |
|---|---|
| legs-and-departure-times | A list of legs and their departure times and dates. |
| faring-market | The faring-market that this faring-atom is in. |
| cached-results | A storage space used to eliminate redundant computation in the rule-checking process. As rule record-2s are applied to faring-atoms, the results are stored in this field. If the same record-2 is applied again, the answer is retrieved rather than recomputed. |
| priceable-unit-labels | A list of the priceable-unit-labels that the faring-atom enters into. |

After the faring process 18 decomposes the itineraries into faring atoms, the faring process 18 retrieves fares 84 and rules 86 for each faring atom by accessing the fares/rules database 20a mentioned above. At this point a fare's routing is retrieved from a routing database and applied to a faring atom. If the routing test fails, the fare cannot be applied to the faring atom and a fare component is not built.

The faring process 18 applies the rules 88 to the faring atoms to produce fare components. Fare-components are combinations of faring-atoms and fares. Fare-components (TABLE 6) are produced if a fare's rules pass a preliminary check on a faring-atom. They are used to store deferred rules (e.g., deferred record-2s and combinability record-2s) that are applied at a later stage of processing 88a. Fare components also store extra information produced during the rule-checking process, such as information about surcharges and penalties and discounts that are applied to the base fare price.

TABLE 6

| Fare-Component fields | Use |
|---|---|
| fare | The fare-component's fare. |
| faring-atom | The fare-component's faring-atom. |
| deferred-record-2s | A list of non-category-10 record-2s that have not been fully evaluated. |
| combinability-record-2 | If the fare's rules include a category-10 ("Fare Combinability") record-2, it is stored here. |
| surcharges | A list of surcharges, penalties, discounts and other pieces of information produced during the rule-checking process. |

From the fare components the faring process 18 constructs 90 priceable units. For certain types of rules such as those which require access to fares and/or flights from outside of the fare component, those rules are stored in the fare component for later or deferred evaluation. The priceable unit process 90, takes valid fare components and constructs priceable units from the fare components. This process 90 involves grouping fare components from different slices and checking fare component combination restrictions. At this stage of processing, the rules deferred in step 88 are reapplied.

Priceable units are represented by priceable-unit-cores and priceable-unit-labels. Priceable-unit-cores are collections of fares and other information associated with fares within a priceable-unit, such as discounts and penalties and surcharges. Priceable-unit-cores (TABLE 7) are referenced by priceable-unit-labels.

TABLE 7

| Priceable-Unit-Core fields | Use |
|---|---|
| fares | A list of fares. |
| slice-numbers | A list of the slices the fares originate from. |
| surcharges | A list of surcharges, penalties, discounts and other pieces of information produced during the rule-checking process. |

Priceable-unit-labels group a set of priceable-unit-cores with sets of faring-atoms. Together, they are used to represent sets of priceable-units (TABLE 8).

TABLE 8

| Priceable-Unit-Label fields | Use |
|---|---|
| priceable-unit-cores | A set of priceable-unit cores. |
| slice-numbers | A list of the slices the fares and faring-atoms originate from. |
| faring-atom-sets | A list of sets of faring-atoms, one per slice. |

When all the fare components within a priceable unit are known, rules that were deferred from the processing 88 are applied 92 to the priceable unit sets of faring atoms.

After evaluation of the deferred record-2s at the priceable unit stage, the itineraries and priceable units are grouped together into complete set of pricing solutions. This occurs by a link process 94 that links itineraries to corresponding pricing units from different slices to provide 96 the pricing solution. At this juncture, any remaining cross priceable unit fare combinability checks are performed to eliminate invalid combinations.

The linking process involves two additional data structures slice-label-sets and open-label-sets. Slice-label-sets group itinerary divisions by the multi-slice priceable-unit-labels they can enter into. In each slice of a journey, a unique slice-label-set is constructed for every set of multi-slice priceable-unit-labels. Each slice-label-set stores both the set of multi-slice priceable-unit-labels and a set of itinerary-label-holders, which contain single-slice priceable-unit-labels on a per-itinerary basis. Each slice-label-set is a pair of an itinerary and a set of division-label-holders. Each of these division-label-holders is a pair of a division and a set of sets of single-slice priceable-unit-labels (TABLE 9).

TABLE 9

| | Use |
|---|---|
| Slice-Label-Set fields | |
| multi-slice-PU-labels | A set of multi-slice PU-labels. |
| itinerary-label-holders | A set of itinerary-label-holders. |
| Itinerary-Label-Holder fields | |
| itinerary | An itinerary. |
| division-label-holders | A set of division-label-holders. |
| Division-Label-Holder fields | |
| division | An itinerary division. |
| single-slice-PU-label-sets | A set of sets of single-slice PU-labels. |

Open-label-sets (TABLE 10) are used to summarize the state of the linking process 94. Each is a set of "open" multi-slice priceable-unit-labels and a set of backward-links. Each of these backward-links is a pair of a slice-label-set and an open-label-set.

TABLE 10

| | Use |
|---|---|
| Open-Label-Set fields | |
| open-PU-labels | A set of open multi-slice FU-labels. |
| backward-links | A set of backward-links. |
| Backward-Link fields | |
| slice-label-set | A slice-label-set. |
| open-label-set | An open-label-set. |

The pricing solution resulting from the linking process 94 is used to construct a pricing graph from the various data structures built during the preceding processes. This pricing graph is transmitted to the client process or can be stored for later use or transmission. A pseudocode representation of the high level processing logic involved in the above search procedure is set out below in TABLE 11.

TABLE 11

```
price-itinerary-sets(itinerary-sets, fare-database, rule-database, routing-database, environmental-information)
    //
    // itinerary-sets is a set of sets of itineraries, one per slice.
    // environmental-information contains information about the passenger, the current date, the location
    // where tickets will be purchased, and other non-itinerary-based information that is necessary for applying
    // fare rules.
    //
    Let faring-market-sets = {}
    // Construct itinerary-divisions, faring-markets and faring-atoms.
    Let slice-number = 1
    For itinerary-set in itinerary-sets
        //
        // create-divisions constructs the itinerary-divisions, faring-markets and faring-atoms for
        // all the itineraries within a slice. It returns a set of faring-markets.
        faring-market-sets += create-divisions(itineraries, slice-number, fare-database)
        slice-number += 1
    // Apply fare rules, constructing fare-components in each faring-market.
    For faring-market-set in faring-market-sets
        //
        // apply-fare-rules constructs fare-components for each faring-market within a slice.
        // This process contains pseudo-code for apply-fare-rules.
        apply-fare-rules(faring-market-set, fare-database, rule-database,
            routing-database, environmental-information)
    // Create priceable-units.
    // for create-priceable-units
    create-priceable-units(faring-market-sets)
    // Link itineraries between slices. This procedure returns either nil, if there are no pricing-solutions, or
    // a "root" open-label-set. This process is described in link-itineraries
    Let root-object = link-itineraries(itinerary-sets)
    If (root-object = nil)
```

TABLE 11-continued

```
    return(nil)
// Create the pricing-graph from the data-structures that have been built in the preceding steps.
// This process includes psedo-code for create-pricing-graph.
Let root-node = create-pricing-graph(root-object)
// Return the pricing graph.
return(root-node)
```

Figure 5:
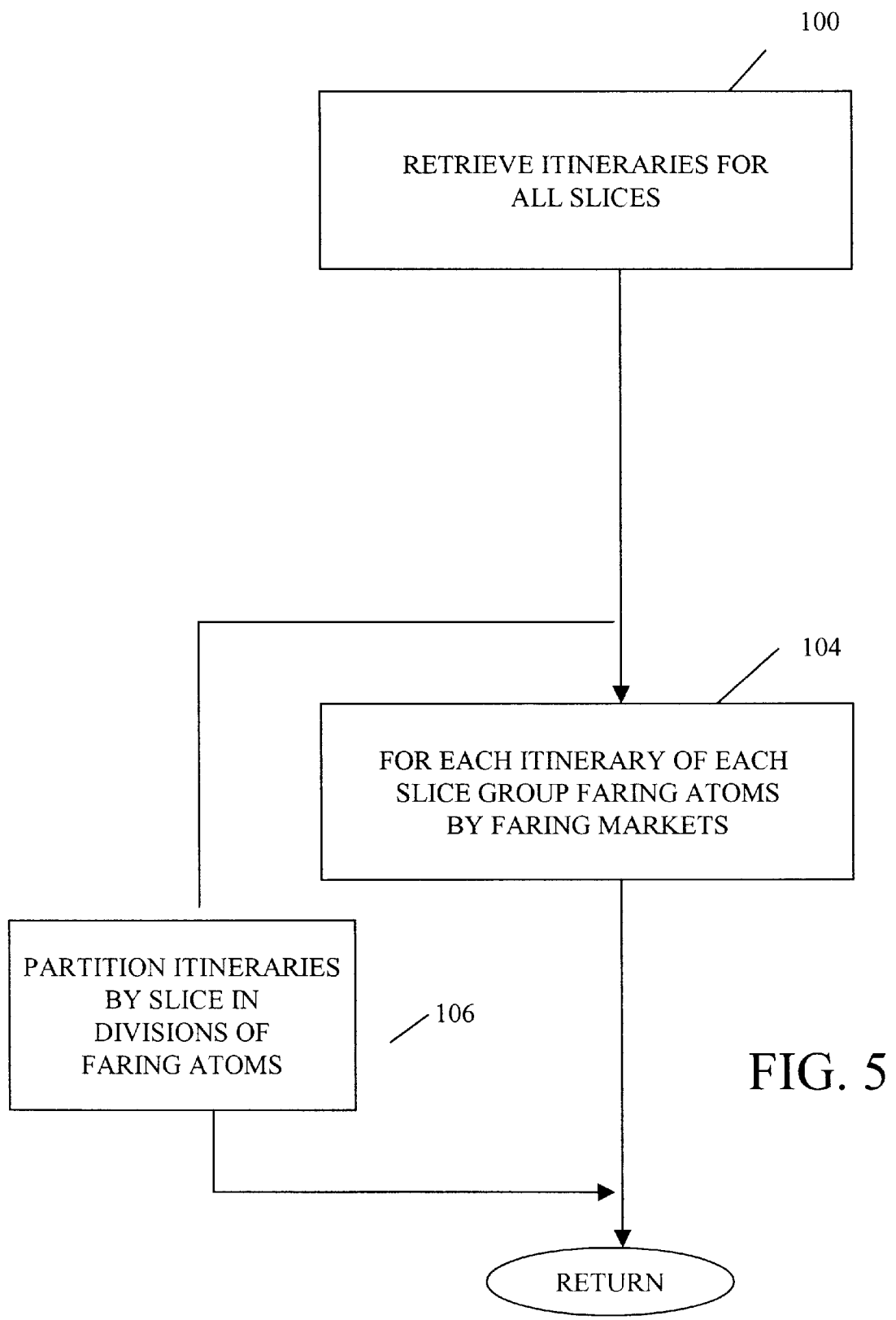
FIG. 5 is a flow chart showing a process to decompose an itinerary into faring atoms used in the process of FIG. 4A.

Referring now to FIG. 5, the process 82 to decompose an itinerary into faring atoms includes a retrieval process 100 that retrieves all itineraries for all slices in a journey. For each itinerary in each slice, the process 82 groups faring atoms by faring markets at 104 and partitions itineraries into the divisions of faring atoms at 106.

Figure 6:
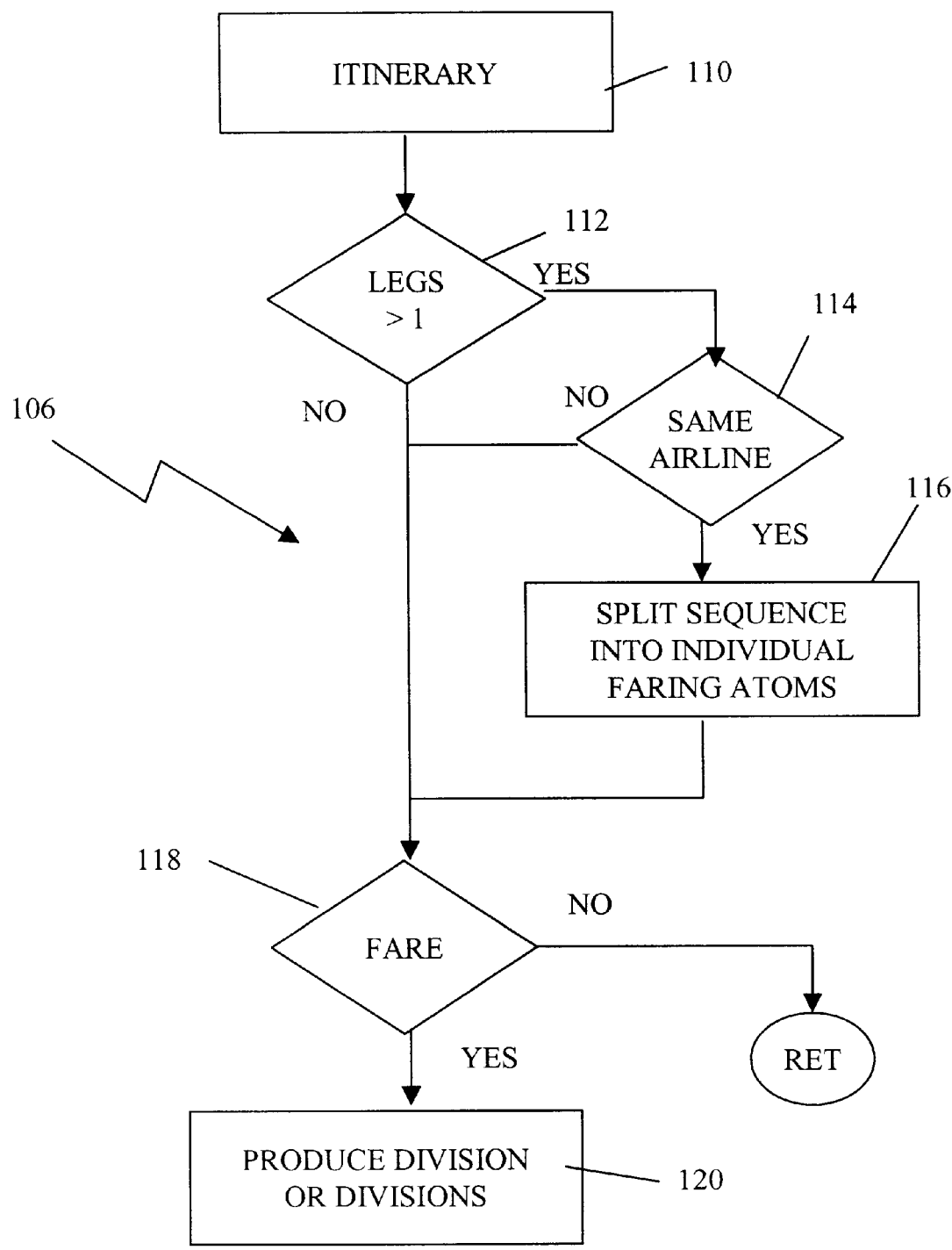
FIG. 6 is a flow chart showing a process for partitioning itineraries used in the process of FIG. 5.

Referring now to FIG. 6, itineraries are partitioned into divisions of faring atoms by examining 110 for each itinerary whether or not the itinerary includes more than one leg 112 on the same airline 114. For each sequence on the same airline, a faring-atom is produced. If the sequence has more than one leg, the sequence is also split into multiple faring-atoms (at 116), resulting in more than one division of the itinerary into a set of faring-atoms. The process checks 118 whether fares exist for the airline in the markets spanned by each faring atom. Otherwise, the process will branch from the examination process 112 and the airline check process 114 to a fare check process 118 to check in the fare database 20a that a fare exists for the airline in the market spanned by the faring atom. If all of the faring atoms within a division have at least one fare in the market, a division for the market is produced at 120. Another possible implementation creates divisions by producing all possible partitions of legs into faring-atoms.

A high-level pseudocode representation for the algorithm that generates faring atoms, faring markets and faring divisions for each itinerary within a slice is set forth below in TABLE 12.

TABLE 12

```
create-divisions(itineraries, slice-number, fare-database)
    Let faring-atoms = {}
    Let faring-markets = {}
    Subroutine get-faring-market(origin-airport, destination-airport, airline)
        Let origin-city = city(origin-airport)
        Let destination-city = city(destination-airport)
        Let previous-faring-market = find(<origin-city, destination-city, airline>, faring-markets)
        If (previous-faring-market)
            return(previous-faring-market)
        Else
            If (fares-exist(origin-city, destination-city, airline))
                Let faring-market = new-faring-market()
                faring-market.slice-number = slice-number
                faring-market.origin-city = origin-city
                faring-market.destination-city = destination-city
                faring-market.airline = airline
                faring-market.faring-atoms = {}
                faring-markets += faring-market
                return(faring-market)
            Else
                return(nil)
    Subroutine get-faring-atom(legs-and-departure-times, origin-airport, destination-airport, airline)
        Let previous-faring-atom = find(legs-and-departure-times, faring-atoms)
        If (previous-faring-atom)
            return(previous-faring-atom)
        Else
            Let faring-market = get-faring-market(origin-airport, destination-airport, airline)
            If (faring-market <> nil)
                Let faring-atom = new-faring-atom()
                faring-atom.faring-market = faring-market
                faring-atom.legs-and-departure-times = legs-and-departure-times
                faring-atom.priceable-unit-labels = {}
                faring-atom.cached-results = {}
                faring-market.faring-atoms += new-faring-atom
                faring-atoms += faring-atom
                return(faring-atom)
            Else
                return(nil)
    Subroutine get-online-divisions(legs-and-departure-times, origin-airport, destination-airport, airline)
        Let online-divisions = {}
        Let number-of-legs = length(legs-and-departure-times)
        Let single-faring-atom = get-faring-atom(legs-and-departure-times, origin-airport, destination-airport, airline)
        If (single-faring-atom <> nil)
            online-divisions += list(single-faring-atom)
        For i from 1 to number-of-legs - 1
            Let legs-and-departure-times1 = legs-and-departure-times[1 . . . i]
            Let legs-and-departure-times2 = legs-and-departure-times[i+1 . . . number-of-legs]
            Let destination-airport1 = destination-airport(faring-atom-legs1)
```

TABLE 12-continued

```
        Let origin-airport2 = origin-airport(faring-atom-legs2)
        If (is-not-same-flight-segment(legs-and-departure-times1, legs-and-departure-times2))
            Let faring-atom1 = get-faring-atom(legs-and-departure-times1, origin-airport,
                                destination-airport1, airline)
            Let faring-atom2 = get-faring-atom(legs-and-departure-times2, origin-airport2,
                                destination-airport, airline)
            If (faring-atom1 <> nil and faring-atom2 <> nil)
                online-divisions += list(faring-atom1, faring-atom2)
        return(online-divisions)
    For each itinerary in itineraries
        Let divisions = { {} }
        Let legs-and-departure-times = itinerary.legs-and-departure-times
```

Figure 7:
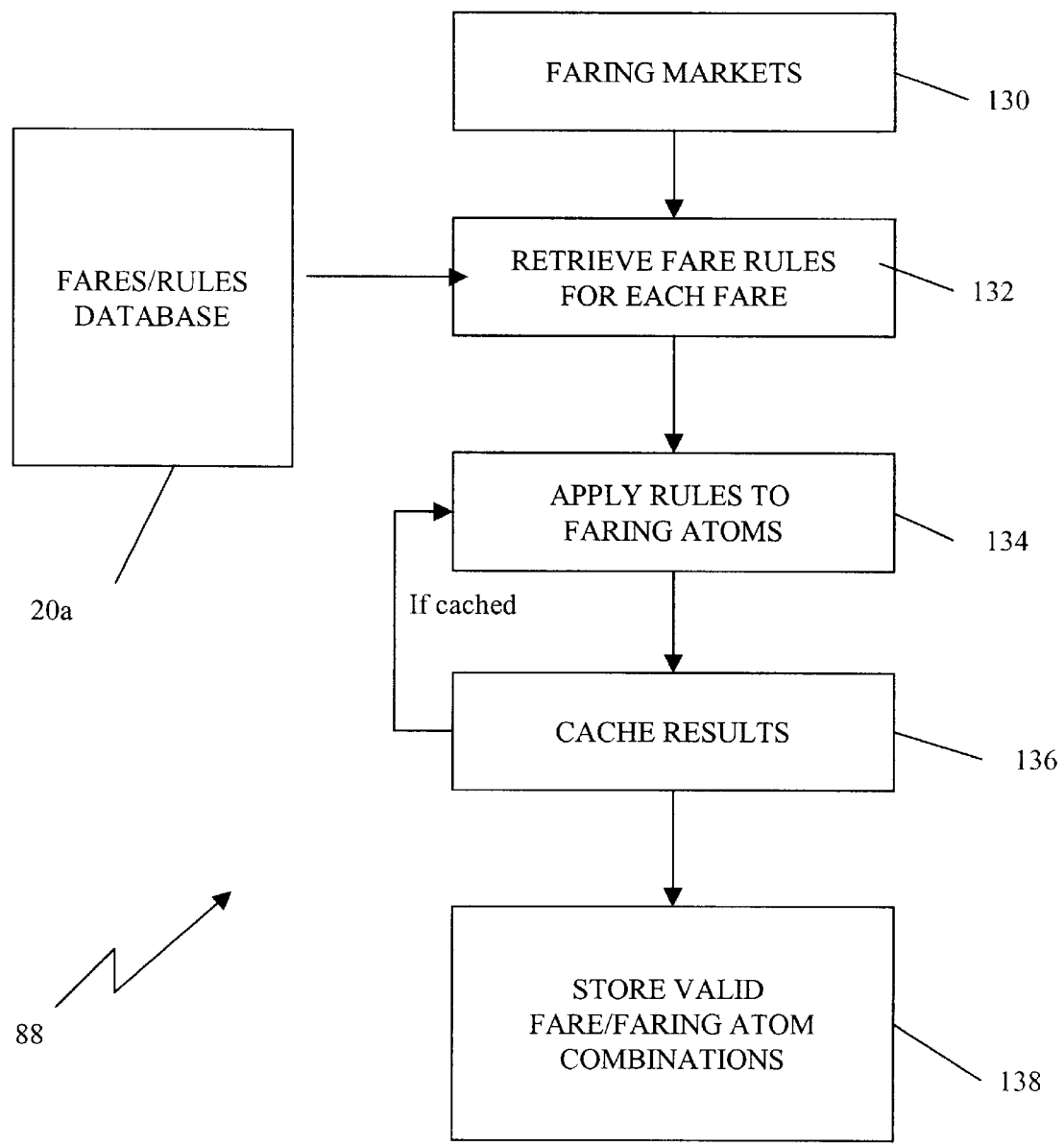
FIG. 7 is a flow chart showing a process for applying rules to faring atoms used in the faring process of FIG. 4A.

Referring now to FIG. 7, a process 88 to apply the faring rules to faring atoms is shown. The input to the application process 88 includes the fare/rules database 20a and faring markets 130. For each faring atom in each faring market, a fare and corresponding rules are retrieved 132 from fare/rules database 20a. The rules are applied to the faring-atoms at 134. Because faring-atoms are shared across itineraries, it is only necessary to apply a fare's rules to a faring atom once no matter how many itineraries the faring-atom may appear in. The results of rule applications are cached 136. Caching of a rule minimizes computational effort. This is because the rule application process 88 involves many redundancies, because different fares share rule restrictions. Valid fare/faring-atom combinations are stored 138 in the form of fare-components.

Figure 8B:
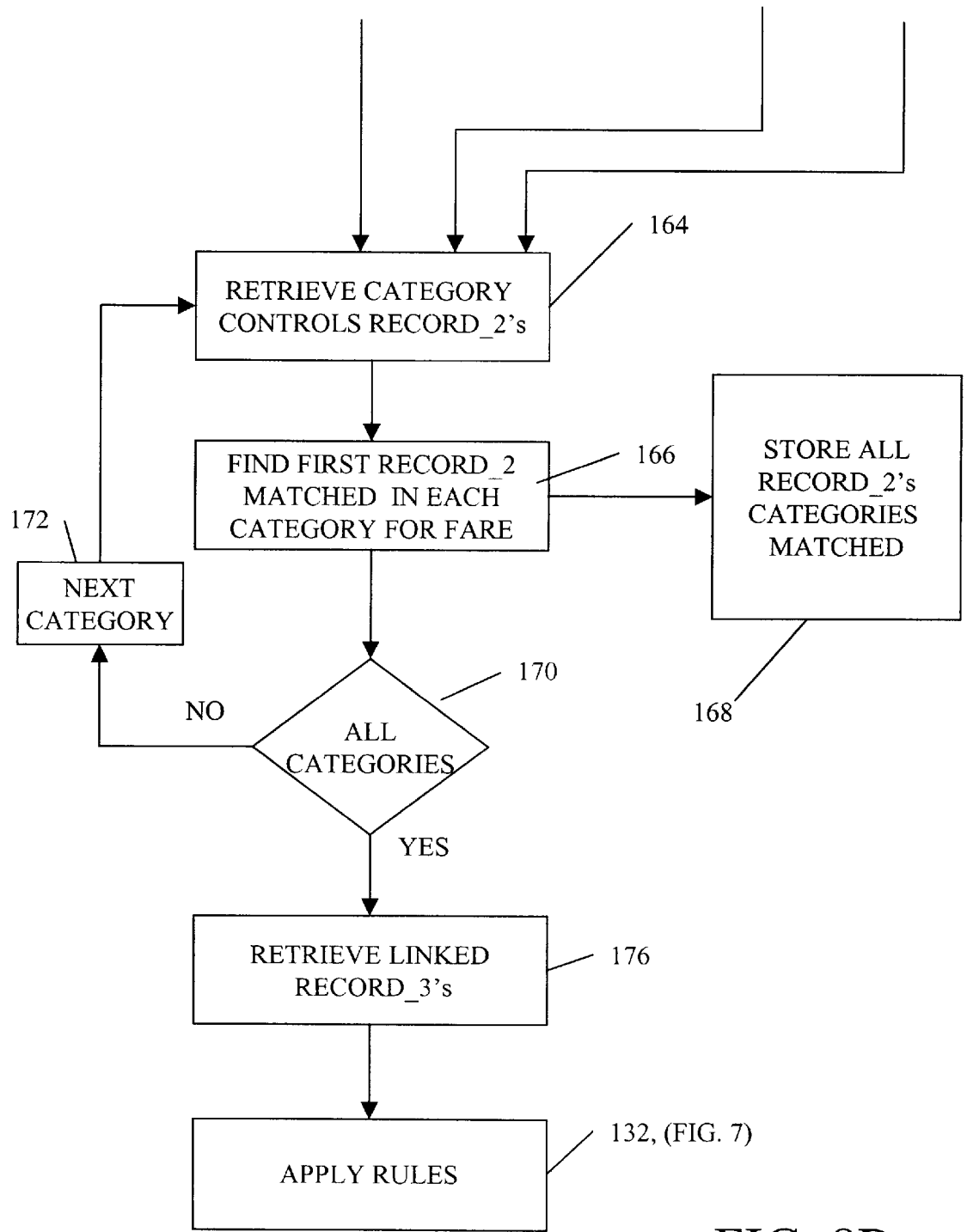

Referring to FIGS. 8A and 8B, a process 132 for retrieving rules and footnotes from the rules database 20a containing the ATPCO rules, routes and fares includes retrieving 150 general rules commonly referred to as record_0's for each faring atom in a faring market. The retrieved general rules are searched 152 to find the first record_0 matched to the faring atom to produce a matched record_0. If there is a matched record_0, it is stored at 154. Whether or not there are matched record_0's, the process 132 retrieves 156 application rules commonly referred to as record_1 rules. The retrieved application rules are searched to find 158 the first record_1 matched to each of the faring atoms. The first matched record_1's is stored 160.

If after traversing through all the record_1's there are no matches found, the process will return a "FAIL" at 162 and terminate indicating that the faring atom cannot be used by the faring process 18.

If there is a match, the process 132 retrieves 164 category controls (commonly referred to as record_2's). The process 132 will find 166 the first record-2 in each category that matches the fare. Record_2's or the category control records typically comprise a large number of categories currently 30 different categories. The process is run for each category. It is not necessary that every category have a match and in many instances many if not most categories will not have a match. Rules in those categories that have a match are stored at 168 and the process continues to run at 170 until all categories have been traversed. If all categories have not been traversed, a pointer to a next category 172 is set and the next category is retrieved 164. Record-3's are retrieved 176 as part of the rule application process 132.

Figure 8C:
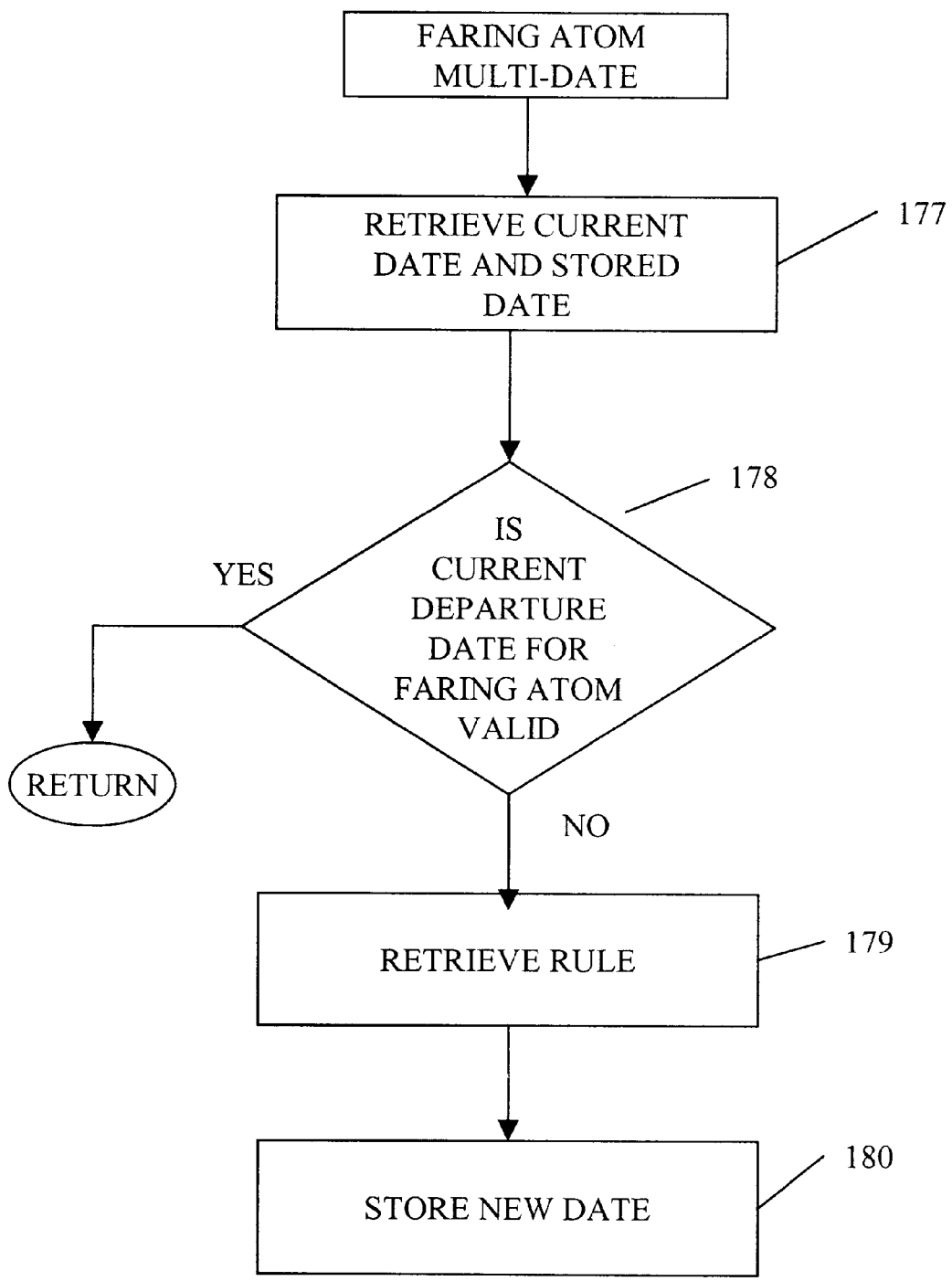

The ATPCO rule retrieval process 132 that retrieves the rules for a fare includes record-matching processes 150, 156, and 164(FIG. 8A) that may depend on the departure date of the faring-atom. To minimize computational effort expended in rule retrieval 132, rules for a fare are not retrieved once for every faring-atom, but at most once per departure-date. To further minimize computation, a caching mechanism is employed. Referring now to FIG. 8C, a process that checks dates for rule retrieval includes retrieving 177 a current date from a faring market that contains faring atoms with multiple travel dates, and a stored date corresponding to a latest stored date that a result for the rule remains valid. The current date is compared 178 to the stored date and if the rule still remains valid (i.e., the current date falls within a bound set by the stored date) the rule is not retrieved and instead rules that had been cached are used. If the stored date for the rule is not valid then a new rule is retrieved 179 and a new date is subsequently stored 180 for the new rule.

Figure 9:
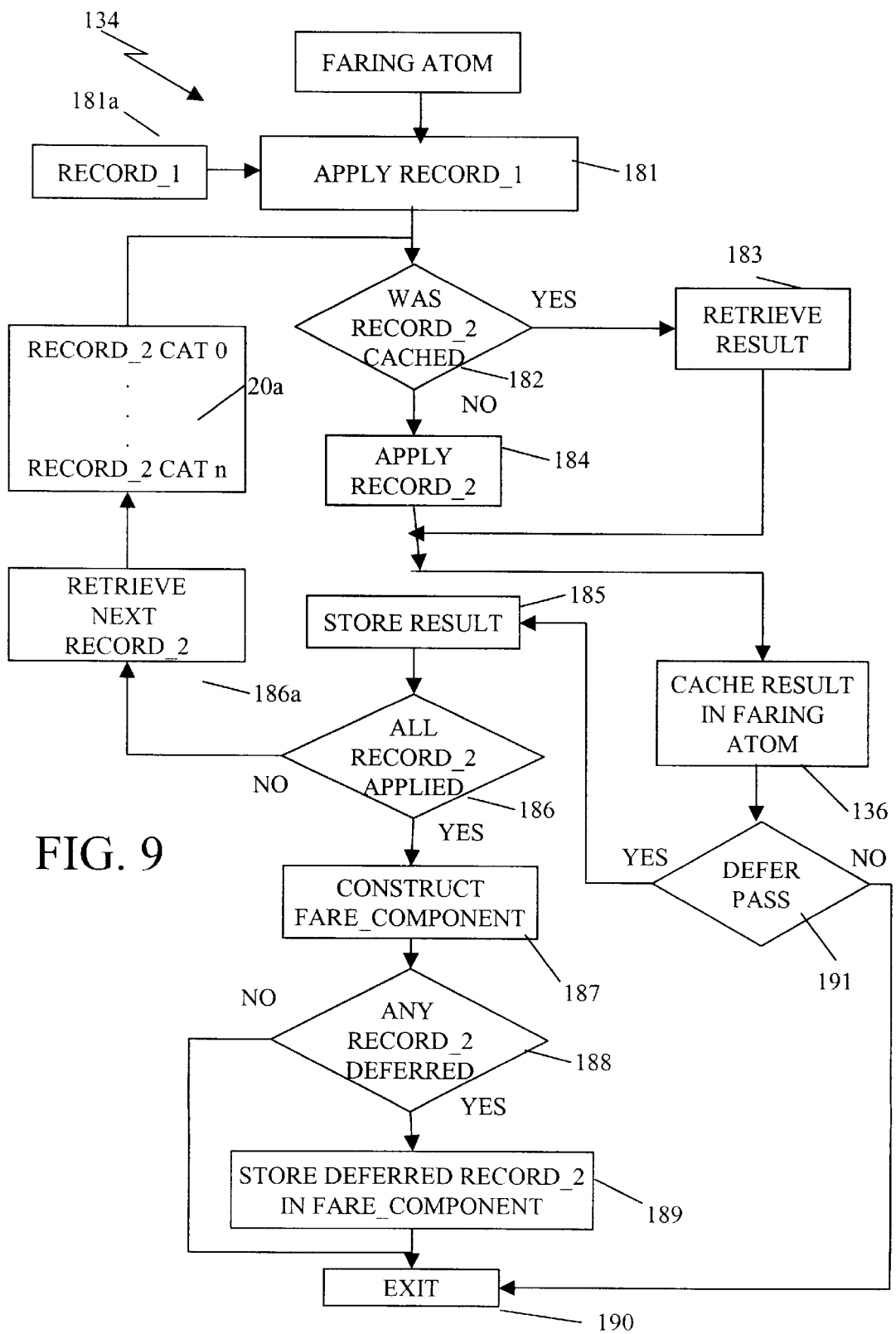
FIG. 9 is a flow chart showing a process for applying fare rules.

Referring now to FIG. 9, a process 134 for applying the rules retrieved with process 132 is shown. The rule application process 134 operates on each faring atom. The process 134 applies 181 the record-1 records to check for booking codes etc. The process 134 determines 182 whether each record-2 was cached in the faring atom. If a record-2 was cached in the faring atom, the process returns 183 the cached results. Otherwise, the process 134 applies 184 the record_2's for each of the stored record_2 categories. Rules provisions are expressed as "record_2s", which are retrieved 132, as described in FIGS. 8A and 8B. These record_2s express logical relations over so called "record_3s", which are records that contain detailed provisions. Individual procedures are provided for evaluating each record_3 as applied to a faring atom. Each record_3 procedure returns either DEFER, FAIL, PASS, NO_MATCH or UNAVAILABLE, and these results are combined according to the logic in the record_2 to produce a result of either DEFER, FAIL or PASS for the entire record_2. The proper procedures for applying record_3s and for combining their results according to record_2s are described in the ATPCO documentation. The "PASS" value is an extension used here since not all record_3s can be fully evaluated on the basis of the faring-atom alone. The RECORD_2 result is either PASS, FAIL or DEFER (the other two values are from record_3s).

As a result of returning a cached result or of the application of the record_2's, the process can return one of five possible results, "DEFER", "PASS", or "FAIL." The record as well as its results DEFER, PASS, or FAIL, are cached at 136 in the faring atom. The result FAIL causes the process 134 to exit 190. Whereas, returning a pass or a defer permits the process 134 to continue to examine remaining record-2s. A defer or pass result is stored 185 and it is determined 186 whether all record-2s have been processed. If all records have not been applied/examined if cached, the next record-2 is retrieved at 186a. After all record-2s have been examined, if pass results have been provided for all, the PASS result causes the process 134 to construct 188 fare components and exit 190. If at least one DEFER result was returned process 134 constructs 187 the fare components, stores 189 deferred record-2's in the faring component and exits 190. The routines 188, 189 and 190 thus correspond to the stored valid faring atom combination routine 138 (FIG. 7).

APPLICATION OF RECORD-3S

The information contained in record-3s varies by category. For example, category-5 record-3s, which specify advanced-purchase restrictions, contain fields that specify how long in advance of travel time a fare must be reserved, how long after a reservation a fare must be purchased, and so on. Category-4 record-3s, which specify flight-restrictions, contain fields that restrict flight-numbers, aircraft-type, airline, and whether flights are direct or non-stop. Every category has a different procedure for evaluating a faring-atom.

As discussed above the record-3 procedures that evaluate a faring-atom returns one of five values, and may return some other information such as discounts, penalties and surcharges. A value of PASS or FAIL can only be returned if that answer can be determined without examining any faring-atom other than the one the fare spans.

The ATPCO rules distinguish between fare-component and priceable-unit restrictions. Most restrictions on travel route, flight-numbers, and aircraft-type are fare-component-based, i.e., restrict only the flights in the faring-atom governed by the fare. On the other hand, minimum and maximum-stay restrictions are priceable-unit-based, i.e., apply to joint properties of all the faring-atoms within a priceable-unit. A minimum-stay requirement for a round-trip fare, for example, constrains the combination of outbound and return faring-atoms. Generally speaking, FC-based record-3s will be able to return either PASS or FAIL, while PU-based restrictions may need to be deferred. Deferring rules means checking them at a later point, however. This is a more computationally expensive process, because it must be done for combinations of faring-atoms within a priceable-unit, and the number ways faring-atoms can be combined to create priceable-units can be quite large, and grows quickly with the size of the priceable-unit. For this reason, whenever possible it is desirable for record-3 application not to result in a value of DEFER.

Many properties of faring-atoms can be bounded. For example, the earliest and latest departure-time within a faring-market, or within a slice, can be recorded, as well as the minimum and maximum number of connections within the faring-market and so forth. This information can often be used to evaluate priceable-unit restrictions at the fare-component level. A simple example of this is given below.

In this example, it is assumed that a certain fare's rules require at least a 3-day layover at the intermediate point of a round-trip priceable-unit, measured from the departure-times of the fare-components. The fare is used for the first half (outbound travel) of the priceable-unit, in the NW CHI_MSP faring-market in slice 1. If there are exactly two slices in the query, then the fare-component that covers return travel must come from the NW MSP_CHI faring-market in slice 2. Suppose that the following faring-atoms exist (TABLE 13). (The airport ORD is in the city Chicago.)

TABLE 13

| Slice 1 NW CHI_MSP faring-atoms | Slice 2 NW MSP_CHI faring-atoms |
|---|---|
| ORD_MSP NW220 12APR97 13:00 | MSP_ORD NW301 15APR97 19:00 |
| ORD_MSP NW220 13APR97 13:00 | MSP_ORD NW577 16APR97 12:00 |

TABLE 13-continued

| Slice 1 NW CHI_MSP faring-atoms | Slice 2 NW MSP_CHI faring-atoms |
|---|---|
| ORD_MSP NW220 14APR97 13:00 | MSP_ORD NW301 16APR97 19:00 |

In each faring-market, the earliest and latest departure-times can be calculated. In this case, the earliest departure-time in the slice-2 NW MSP_ORD market is Apr. 15, 1997 19:00, and the latest departure-time is Apr. 16, 1997 19:00.

When the minimum-stay requirement restriction is applied to the first faring-atom, its departure time of Apr. 12, 1997 13:00 can be compared to the two outer bounds on return-travel departure-time, Apr. 15, 1997 19:00 and Apr. 16, 1997 19:00. In this case, the minimum-stay requirement is met even for the earliest possible return travel time, so the faring-atom unconditionally passes the restriction. Similarly, for the third faring-atom, since the restriction fails even for the latest possible return-travel departure-time, the faring-atom unconditionally fails the minimum-stay requirement. But for the second faring-atom, because the restriction fails for the earliest possible return time, but passes the latest possible return time, it is necessary to defer the application of the restriction.

GENERAL TIME BOUNDS

Many priceable-unit-based categories restrict times. Categories 3, 5, 6, 7, 8, 9, 10 and 14 are usually priceable-unit-based. Categories 3 and 14 usually restrict the departure-date of the first flight in a priceable-unit. Category 5 specifies how far in advance of travel fares must be purchased, and this is usually measured from the departure-date of the first flight in a priceable-unit. Categories 6 and 7 specify minimum and maximum-stays at stopovers within a priceable-unit.

In many cases these categories do not need to be deferred. This is especially true if, as in the above example, time-bounds are known for other faring-markets in the journey, and the range of faring-markets that might enter into a priceable-unit with the faring-atom in not great. It is a relatively simple matter to record for each faring-market the earliest and latest departure-date of any faring-atom within the faring-market. This can be done as faring-atoms are constructed. The problem remains of how to know what other faring-markets might participate in a priceable-unit with the faring-atom at hand.

CATEGORY-3

Pseudo code for an example of a procedure that implements record-3 category-3, "Seasonality Restrictions" is shown in TABLE 15. Each category-3 record-3 an example of which is shown in TABLE 14 specifies a permissible date range for travel, via a start-date and an end-date, either of which may be left blank. The default interpretation of category-3 is that these date restrictions apply to the departure-date of the first flight of the priceable-unit. This interpretation can be modified in two ways. First, if a certain field is set, then the category becomes fare-component based. In other words, the date restrictions apply to the departure-date of the first flight within the fare-component. Second, a geographic specification may be provided that alters the measurement of the departure-date. For example, the geographic specification may dictate that the relevant date is the departure-date of the first transoceanic flight.

Category-3s (TABLE 14) also includes a field that specifies whether the record-3 is available. If it is not, that is an indication that some information is missing and the record-3 should not be used for pricing a ticket. In this case, the record-3 application must return UNAVAILABLE. Finally, a category-3 may include a specification of a date range that the category-3 is valid for. If travel is outside of these dates, the record-3 application must return NO-MATCH.

TABLE 14

| Category-3 field | Example |
|---|---|
| Earliest Permitted Travel Date | nil |
| Latest Permitted Travel Date | 19OCT97 |
| Fare-Component Based | false |
| Geographic Specification | nil |
| Earliest Record-3 Valid Date | 15MAY88 |
| Latest Record-3 Valid Date | nil |
| Available | true | the departure date of the faring-atom is compared to the date-range of the record-3, and either PASS or FAIL is returned. If a geographic specification is provided, then this is used to compute the relevant travel date, and the same procedure applies. If, on the other hand, the record-3 is priceable-unit based, then broad time-bounds checks are used. If there is no geographic specification, the earliest and latest possible priceable-unit departure-dates are retrieved and compared to the date-range of the record-3. If they both succeed, PASS is returned. If they both fail, FAIL is returned. Otherwise DEFER is returned. Finally, if the record-3 is priceable-unit based and includes a geographic specification, then DEFER is returned. The following pseudo-code implements the processing of record-3 category-3 in the case where the record-3 must be evaluated given only a single faring-atom from the priceable-unit.

TABLE 15

```
apply-record-3-FC-category-3(record-3, faring-atom, passenger-information, current-date)
    If (record-3.available = false)
        return(unavailable)
    Let date = departure-date(faring-atom)
    If ((record-3.earliest-record-3-valid-date <> nil and record-3.earliest-record-3-valid-date > date) or
        (record-3.latest-record-3-valid-date <> nil and record-3.latest-record-3-valid-date < date))
        return(no-match))
    If (record-3.fare-component-based = true)
        Let travel-date = date
        If (record-3.geographic-specification <> nil)
            travel-date = apply-geographic-specification(record-3.geographic-specification, faring-atom)
        If ((record-3.earliest-permitted-travel-date <> nil and record-3.earliest-permitted-travel-date > travel-date) or
            (record-3.latest-permitted-travel-date <> nil and record-3.latest-permited-travel-date < travel-date))
            return(fail)
        Else
            return(pass)
    Else If (record-3.geographic-specification <> nil)
        return(defer)
    Else
        Let earliest-travel-date = earliest-priceable-unit-departure-date(faring-atom)
        Let latest-travel-date = latest-priceable-unit-departure-date(faring-atom)
        Let result = pass
        If (record-3.earliest-permitted-travel-date <> nil)
            If (record-3.earliest-permitted-travel-date > latest-travel-date)
                result = fail
            Else If (record-3.earliest-permitted-travel-date <= earliest-travel-date)
                result = defer
        If (record-3.latest-permitted-travel-date <> nil)
            If (record-3.latest-permitted-travel-date < earliest-travel-date)
                result = fail
            Else If (result <> fail and record-3.latest-permitted-travel-date >= latest-travel-date)
                result = defer
        return(result)
```

The logic of the procedure that processes the record-3 is as follows. If the record-3 is not available, UNAVAILABLE is returned. If travel is outside of the valid date-range of the record-3, NO-MATCH is returned. Then, processing branches depending on whether the record-3 is priceable-unit based (the default), or fare-component based. If fare-component based, and there is no geographic specification, There can be another version of this application procedure, as shown in TABLE 16 dedicated to the case where all of the faring-atoms within the priceable-unit are known. This procedure is simpler, because there is no need for time bound checks since all times are known exactly. This procedure is used to evaluate deferred record_3's (see TABLE 24).

TABLE 16

```
apply-record-3-PU-category-3(record-3, fares, faring-atoms, prime-faring-atom, passenger-information, current-date)
    If (record-3.available = false)
        return(unavailable)
    Let date = departure-date(prime-faring-atom)
    If ((record-3.earliest-record-3-valid-date <> nil and record-3.earliest-record-3-valid-date > date) or
        (record-3.latest-record-3-valid-date <> nil and record-3.latest-record-3-valid-date < date))
        return(no-match))
    Let travel-date = date
    If (record-3.fare-component-based = true)
```

TABLE 16-continued

```
If (record-3.geographic.specification <> nil)
    travel-date = apply-geographic-specification(record-3.geographic-specification, prime-faring-atom)
Else
    travel-date = departure-date(faring-atoms)
    If (record-3.geographic-specification <> nil)
        travel-date = apply-geographic-specification(record-3.geographic-specification, faring-atoms)
If ((record-3.earliest-permitted-travel-date <> nil and record-3.earliest-permitted-travel-date > travel-date) or
   (record-3.latest-permitted-travel-date <> nil and record-3.latest-permitted-travel-date < travel-date))
    return(fail)
Else
    return(pass)
```

Figure 10:
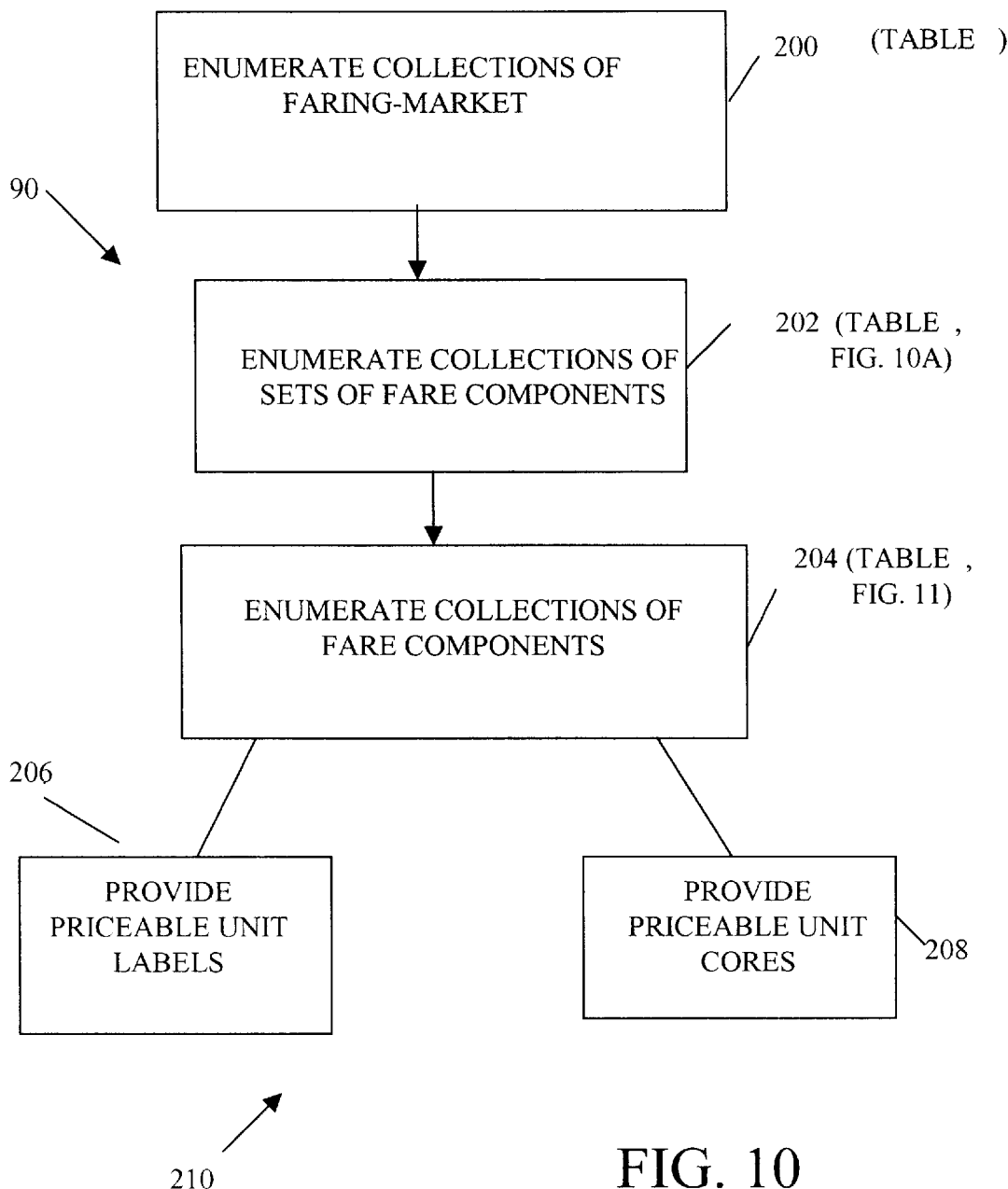
FIG. 10 is a flow chart showing a process for determining priceable units used in the faring process of FIGS. 4A–4B.

Referring now to FIG. 10, the process 90 for constructing priceable units is shown. The term "priceable unit" as used herein represents a fundamental unit at which many fare restrictions apply. For example, round trip fares often include minimum stay requirements and these can only be expressed when both an outbound and a return faring atom are combined. This occurs at the level of the priceable unit.

The process 90 of constructing priceable unit cores and pricing unit labels is organized as several nested procedures as follows. The process enumerates 200 a collection of faring markets. Collections of faring markets are enumerated 200 with each faring market from a different slice by an algorithm that depends on the type of a priceable unit that is constructed. For example, for a round trip priceable unit two faring markets are chosen on the same carrier and between the same cities but in opposite directions. The process 90 also enumerates collections of sets of faring components at 202. For each faring market in a collection of faring markets its faring components are partitioned into sets of fare components that have the same fare and the same combinability record-2s. Collections of these sets are enumerated with one set chosen from each faring market resulting in a collection of fares and associated collection of sets of fare components. At this juncture, any combinability record 2-s are evaluated to insure that the fares may be used together in a priceable unit.

The process 90 also enumerates 204 collections of fare components. Thus, given a collection of sets of fare components from 202, the process evaluates any deferred record 2-s on collections of fare components in the enumeration process 204. These collections are constructed by selecting one fare component from each set. The process of evaluating deferred rules on collections of fare components outputs results in the form of a list of factored representations of priceable units. Thus, the output is a logical OR of logical ANDs of logical ORs of fare components.

From the factored representations produced in 204 the process produces priceable-unit-labels 206 and priceable-unit-cores 208 with some sharing occurring between these structures to ensure that the number of priceable-unit-cores and priceable-unit-labels is kept to a minimum.

The pseudo-code below (TABLE 17) summarizes enumerating collections of faring markets process 200. It takes as input a set of sets of faring-markets, containing one set per slice. These are the faring-markets generated by the calls to "create-divisions" (120 FIG. 6), as described above.

TABLE 17

```
create-priceable-units(faring-market-sets)
    Let number-of-slices = length(faring-market-sets)
    Let priceable-unit-labels = {}
    For slice-number1 from 1 to number-of-slices
    For faring-market1 in faring-market-sets[slice-number1]
        Let airline = faring-market1.airline
        // Create one-way priceable-units.
        priceable-unit-labels = create-PUs-in-markets1(faring-market1, priceable-unit-labels, one-way)
        For slice-number2 from slice-number1 + 1 to number-of-slices
        For faring-market2 in faring-markets-on-carrier(faring-market-sets[slice-number2], airline)
            // Create single and double open-jaws.
            priceable-unit-labels = create-PUs-in-markets2(faring-market1, faring-market2,
                                        priceable-unit-labels, open-jaw)
            If (faring-market1.destination-city = faring-market2.origin-city)
                // Create round-trips and circle-trips of size 2.
                If (faring-market2.destination = faring-market1.origin)
                    priceable-unit-labels = create-PUs-in-markets2(faring-market1, faring-market2,
                                                priceable-unit-labels, round-trip)
                    priceable-unit-labels = create-PUs-in-markets2(faring-market1, faring-market2,
                                                priceable-unit-labels, circle-trip2)
                For slice-number3 from slice-number2 + 1 to number-of-slices
                For faring-market3 in faring-markets-on-carrier(faring-market-sets[slice-number3], airline)
                    If (faring-market2.destination-city = faring-market3.origin-city)
                        // Create circle-trips of size 3.
                        If (faring-market3.destination-city = faring-market1.origin-city)
                            priceable-unit-labels =
                                create-PUs-in-markets3(faring-market1, faring-market2, faring-
                        //
                        // More iterations for circle-trips of lengths 4 and 5.
                        //
```

TABLE 17-continued

```
...
// Store priceable-unit-labels in faring-atoms.
For priceable-unit-label in priceable-unit-labels
    For faring-atom-set in priceable-unit-label.faring-atom-sets
        For faring-atom in faring-atom-set
            faring-atom.priceable-unit-labels += priceable-unit-label
```

This pseudo-code iterates over faring-markets in different slices, and passes faring markets to one of several possible create-PUs-in-markets procedures. These procedures vary by size of priceable-unit produced. The code ensures that the faring-markets are in the correct format for the type of priceable-unit produced, and that the priceable units are all on the same airline. This last restriction is motivated by efficiency since rarely do carriers permit priceable-units with fares from more than one airline.

Each call to create-PUs-in-markets returns an updated set of priceable-unit-labels. At the end of the procedure, these priceable-unit-labels are stored in their component faring-atoms.

There are many other combinability restrictions that limit the manner in which fare components can be combined into priceable continuous units. Even when searching for fares for a small number of itineraries, there can be a very large number of possible pricing units because of the large number of possible fares that can exist. It is preferred to represent these priceable units in a compact manner so as to minimize the computation involved in their construction.

The faring algorithm does not actually construct a data-structure for every priceable-unit. Instead, priceable-units are represented by a combination of two data structures: priceable-unit-cores (PU-cores) and priceable-unit-labels (PU-labels). PU-core data structures contain all the information associated with an individual priceable-unit except its faring-atoms. Thus, each PU-core contains a set of fares (one fare per fare-component in the priceable-unit) and any other information associated with those fares, such as discounts, surcharges and penalties. PU-label data structures compactly represent connections between faring-atoms and PU-cores.

At this stage of processing, a collection of fares has been fixed on, and for each fare there is a set of fare-components. Priceable-units are constructed by selecting one fare-component from each set and evaluating any deferred rules. The simplest manner that this could be accomplished would be to enumerate complete collections of fare-components and to apply the deferred record-2s from within these fare-components. Often, this method can be made more efficient in some cases by use of the function get-OR-AND-OR-form as will be described. That function takes a collection of sets of fare-components, evaluates any deferred rule-conditions, and returns a representation of the set of valid priceable-units. This representation is in OR-AND-OR form. In other words, it takes the form of a set of collections of sets of fare-components. This is very close to a set of priceable-unit-labels except that since the sets are of fare-components rather than faring-atoms, there are no PU-cores. The inner sets of fare-components returned by get-OR-AND-OR-form are guaranteed to have the same fares, surcharges, discounts, penalties and so on.

PU-cores and PU-labels are constructed from the output of get-OR-AND-OR. The pseudo-code below summarizes this procedure. It iterates over the inner AND-OR form, constructing PU-cores (if no identical PU-core already exists) and PU-labels (if no identical PU-label already exists). PU-labels are constructed by mapping from fare-components to faring-atoms. PU-cores are stored on PU-labels.

TABLE 18

```
create-PUS-from-fare-components(faring-markets, fares, fare-component-sets, existing-PU-labels,
                                environmental-information)
    Let slice-numbers = {}
    Let PU-labels = existing-PU-labels
    Let PU-cores = {}
    For faring-market in faring-markets
        slice-numbers += faring-market.slice-number
    For AND-OR in get-OR-AND-OR(faring-markets, fare-component-sets, environmental-information)
        //
        // AND-OR is a collection of sets of fare-components, representing all the priceable-units
        // that can be constructed by choosing one fare-component from each set.
        //
        Let PU-core = nil
        Let surcharges = {}
        Let faring-atom-sets = {}
        For fare-component-set in AND-OR
            surcharges += first(fare-component-set).surcharges
            Let faring-atom-set = {}
            For fare-component in fare-component-set
                faring-atom-set += fare-component.faring-atom
            faring-atom-sets += faring-atom-set
        // Find an existing PU-core with these fares and surcharges, or construct a new one.
        For test-PU-core in PU-cores
            If (test-PU-core.surcharges = surcharges)
                PU-core = test-PU-core
        If (PU-core = nil)
            PU-core = new-PU-core()
```

TABLE 18-continued

```
    PU-core.fares = fares
    PU-core.surcharges = surcharges
    PU-core.slice-numbers = slice-numbers
    // Find an existing PU-label with these faring-atoms, or construct a new one.
    Let PU-label = nil
    For test-PU-label in PU-labels
        If (test-PU-label.faring-atom-sets = faring-atom-sets)
            PU-label = test-PU-label
    If (PU-label = nil)
        PU-label = new-PU-label()
        PU-label.faring-atom-sets = faring-atom-sets
        PU-label.slice-numbers = slice-numbers
        PU-label.priceable-unit-cores = {}
        PU-labels += PU-label
    PU-label.priceable-unit-cores += PU-core
return(PU-labels)
```

To understand the role PU-cores and PU-labels play in the faring algorithm, it may be helpful to look at an example, involving a round-trip journey between BOS and MSP. In this example, there are four outbound itineraries and four return itineraries, each of which is spanned by a single faring-market. For both the outbound and return itineraries, there is a choice between two airlines, UA and NW. Both of these airlines offer two round-trip fares and one one-way fare. This situation is summarized in TABLE 19 below.

TABLE 19

| Faring-market | Faring-Atoms | Fares |
| --- | --- | --- |
| Slice 1: UA BOS→MSP | BOS→MSP UA100 | UA BOS-MSP RT "Q" |
|  | BOS→MSP UA200 | UA BOS-MSP RT "M14" |
|  |  | UA BOS-MSP OW "Y" |
| Slice 1: NW BOS→MSP | BOS→MSP NW300 | NW BOS-MSP RT "HE7" |
|  | BOS→MSP NW400 | NW BOS-MSP RT "Q7NR" |
|  |  | NW BOS-MSP OW "F" |

TABLE 19-continued

| Faring-market | Faring-Atoms | Fares |
| --- | --- | --- |
| Slice 2: UA MSP→BOS | MSP→BOS UA111 | same as for the outbound UA faring-market |
|  | MSP→BOS UA222 |  |
| Slice 2: NW MSP→BOS | MSP→BOS NW333 | same as for the outbound NW faring-market |
|  | MSP→BOS NW444 |  |

Assume that in each of the four faring-markets (i.e., BOS-MSP UA, BOS-MSP NW, MSP-BOS UA and MSP-BOS NW), fare-components have been constructed for every combination of faring-atom and fare. The fare-components built from the fare "NW BOS-MSP RT HE7" contain a deferred record-2 that is checked during priceable-unit construction. This record-2 does not permit outbound travel on flight "NW300" combined with return travel on flight "NW444." When constructing round-trip priceable-units, round-trip fares are combined with like round-trip fares. This situation permits the construction of a total of 23 priceable-units, as shown in TABLE 20.

TABLE 20

| Priceable-Unit Number and Type | Slice-1 Faring-Atom | Slice-1 Fare | Slice-2 Faring-Atom | Slice-2 Fare |
| --- | --- | --- | --- | --- |
| 1 Round-trip | BOS → MSP UA100 | RT "Q" | MSP → BOS UA111 | RT "Q" |
| 2 Round-trip | BOS → MSP UA100 | RT "M14" | MSP → BOS UA111 | RT "M14" |
| 3 Round-trip | BOS → MSP UA100 | RT "Q" | MSP → BOS UA222 | RT "Q" |
| 4 Round-trip | BOS → MSP UA100 | RT "M14" | MSP → BOS UA222 | RT "M14" |
| 5 Round-trip | BOS → MSP UA200 | RT "Q" | MSP → BOS UA111 | RT "Q" |
| 6 Round-trip | BOS → MSP UA200 | RT "M14" | MSP → BOS UA111 | RT "M14" |
| 7 Round-trip | BOS → MSP UA200 | RT "Q" | MSP → BOS UA222 | RT "Q" |
| 8 Round-trip | BOS → MSP UA200 | RT "M14" | MSP → BOS UA222 | RT "M14" |
| 9 Round-trip | BOS → MSP NW300 | RT "HE7NR" | MSP → BOS NW333 | RT "HE7" |
| 10 Round-trip | BOS → MSP NW300 | RT "Q7NR" | MSP → BOS NW333 | RT "Q7NR" |
| 11 Round-trip | BOS → MSP NW300 | RT "Q7NR" | MSP → BOS NW444 | RT "Q7NR" |
| 12 Round-trip | BOS → MSP NW400 | RT "HE7NR" | MSP → BOS NW333 | RT "HE7" |
| 13 Round-trip | BOS → MSP NW400 | RT "Q7NR" | MSP → BOS NW333 | RT "Q7NR" |
| 14 Round-trip | BOS → MSP NW400 | RT "HE7NR" | MSP → BOS NW444 | RT "HE7" |
| 15 One-way | BOS → MSP NW400 | RT "Q7NR" | MSP → BOS NW444 | RT "Q7NR" |
| 16 One-way | BOS → MSP UA100 | OW "Y" |  |  |
| 17 One-way | BOS → MSP UA200 | OW "Y" |  |  |
| 18 One-way | BOS → MSP NW300 | OW "F" |  |  |
| 19 One-way | BOS → MSP NW400 | OW "F" |  |  |
| 20 One-way |  |  | MSP → BOS UA111 | OW "Y" |
| 21 One-way |  |  | MSP → BOS UA222 | OW "Y" |
| 22 One-way |  |  | MSP → BOS NW333 | OW "F" |
| 23 One-way |  |  | MSP → BOS NW444 | OW "F" |

Even in this example, the list of possible priceable-units is long (23 units). The reason that there are so many priceable-units is because production of priceable-units involves several choices (of fares and faring-atoms).

In TABLE 21 below, each entry represents a choice (an OR) of either faring-atoms or PU-cores. Each row represents a collection (an AND) of these choices. And finally, the entire table represents a choice (an OR) over these collections. Collectively, this OR-AND-OR table provides a compact representation of the 23 priceable-units.

ENUMERATING COLLECTIONS OF SETS OF FARE-COMPONENTS

Each of the faring-markets that is passed to create-PUs-in-markets has a set of fare-components produced by applying fare rules procedure 88.

Figure 10A:
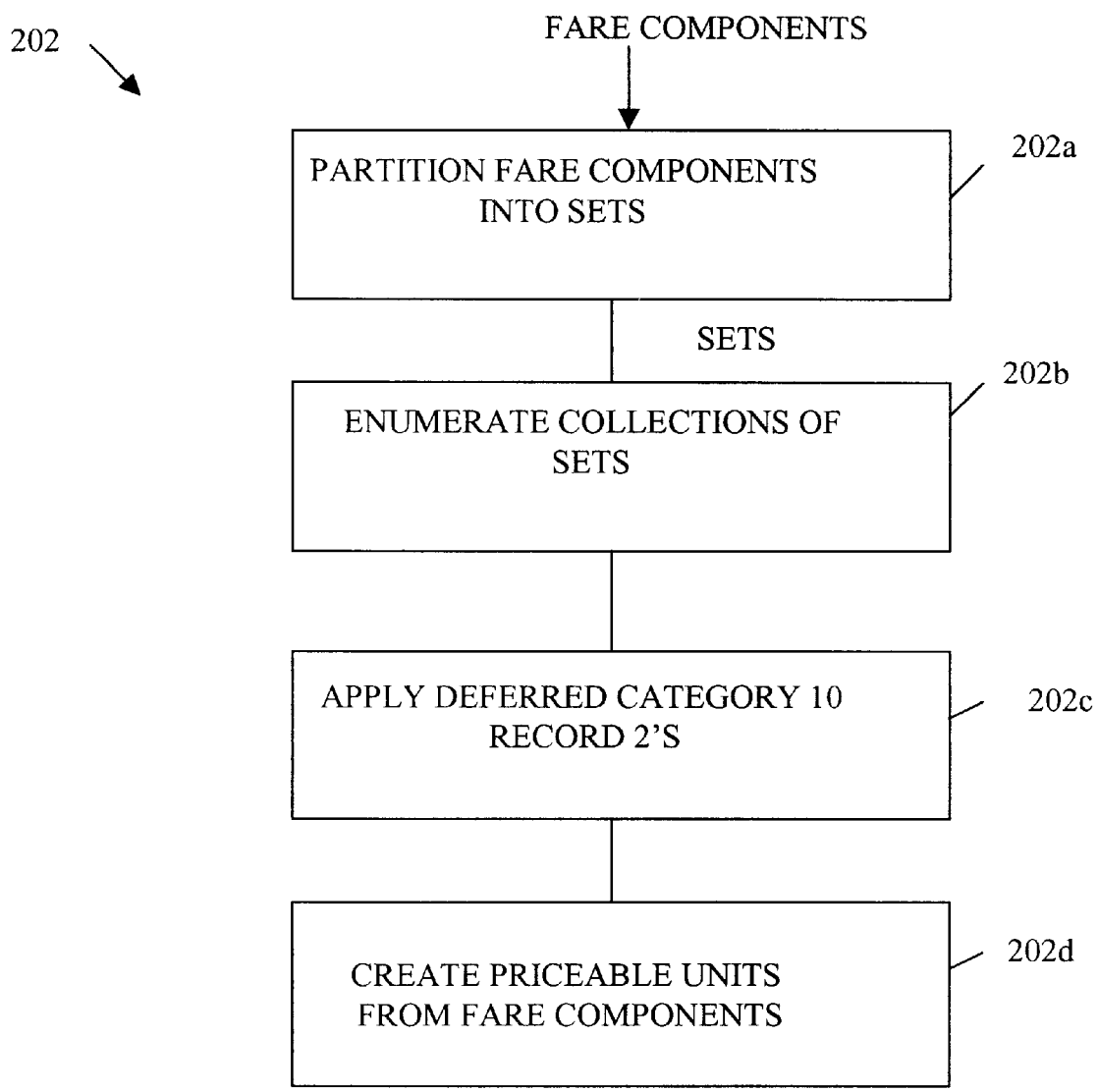
FIG. 10A is a flow chart showing a process for enumerating collections of sets of faring components used in the process of FIG. 10.

Referring now to FIG. 10A, enumerating collections of sets of fare-components 202 (described by pseudo-code below) partitions the fare-components in each faring-market into sets such that every fare-component in a set has the same fare and the same combinability record-2s. Fare com-

TABLE 21

| Label Number | Slice-1 Faring-Atom Options | Slice-2 Faring-Atom Options | Priceable-Unit-Core Options |
|---|---|---|---|
| 1 | BOS → MSP UA100<br>BOS → MSP UA200 | MSP → BOS UA111<br>MSP → BOS UA222 | 1: RT "Q", 2: RT "Q"<br>1: RT "M14", 2: RT "M14" |
| 2 | BOS → MSP NW300<br>BOS → MSP NW400 | MSP → BOS NW333<br>MSP → BOS NW444 | 1: RT "Q7NR", 2: RT "Q7NR" |
| 3 | BOS → MSP NW300 | MSP → BOS NW333 | 1: RT "HE7", 2: RT "HE7" |
| 4 | BOS → MSP NW400 | MSP → BOS NW333<br>MSP → BOS NW444 | 1: RT "HE7", 2: RT "HE7" |
| 5 | BOS → MSP UA100<br>BOS → MSP UA200 |  | 1: OW "Y" |
| 6 | BOS → MSP NW300<br>BOS → MSP NW400 |  | 1: OW "F" |
| 7 |  | MSP → BOS UA111<br>MSP → BOS UA222 | 2: OW "Y" |
| 8 |  | MSP → BOS NW333<br>MSP → BOS NW444 | 2: OW "F" |

Each row of TABLE 21 is a priceable-unit-label (PU-label), an object that factors a set of priceable-units into a collection of choices that have no further dependencies. There is a choice for every faring-atom involved in the priceable-unit, and a choice of a priceable-unit-core (PU-core). Each PU-core contains the same number of fares as there are faring-atom choices. In the case where there are no constraints between faring-atoms in different slices, PU-labels are a very compact representation of priceable-units. PU-label #1, for example, represents a total of eight different priceable-units. In cases where there are interactions between the faring-atoms in different slices, several PU-labels can be produced for a single PU-core. An example of several PU-labels is shown for the NW RT "HE7" fare represented by PU-labels numbers 3 and 4. These priceable-unit-labels and priceable-unit-cores are used by the linking procedure 94 (FIG. 4B) to associate itineraries from more than one slice to fares.

binability restrictions are specified in record-2s rule category 10. Any category-10 record-2s in a fare's rules is stored in the combinability-record-2 field in the fare-components.

Once fare-components are partitioned 202*a* into sets, collections of these sets are enumerated 202*b*, by selecting one set from each faring-market. For each fare there is a choice of fare-components. At this point, when the fares within a priceable-unit have been fixed, any category-10 record-2s that was deferred is applied 202*c* to determine whether the fares may be used together in a priceable-unit. This is accomplished by applying 202*c* each fare's combinability record-2 (if it has one) to every other fare within the priceable-unit.

The code below (TABLE 22) is written for two faring-markets within a priceable-unit, as would be the case for round-trips, open jaws and circle-trips of size two. Similar code would be used for priceable-units of other sizes.

TABLE 22

```
partition-fare-components-into-sets(faring-market)
    //
    // Partition fare-components into sets based on fare and combinability record-2.
    //
    Let fare-component-sets = {}
    For fare-component in faring-market.fare-components
        Let fare = fare-component.fare
        Let combinability-record-2 = fare-component.combinability-record-2
        Let previous-set = nil
        For test-set in fare-component-sets
            Let test-fare-component = first(test-set)
            If ((fare = test-fare-component.fare) and
                (combinability-record-2 = test-fare-component.combinability-record-2))
                previous-set = test-set
        If (previous-set = nil)
            fare-component-sets += list(fare-component)
        Else
            previous-set += fare-component
```

TABLE 22-continued

```
    return(fare-component-sets)
create-PUs-in-markets2(faring-market1, faring-market2, existing-PU-labels, PU-type, environmental-information)
    Let fare-component-sets1 = partition-fare-components-into-sets(faring-market1)
    Let fare-component-sets2 = partition-fare-components-into-sets(faring-market2.)
    Let PU-labels = existing-PU-labels
    For fare-components1 in fare-component-sets1
        For fare-components2 in fare-component-sets2
            Let fare1 = first(fare-components1).fare
            Let fare2 = first(fare-components2).fare
            Let combinability-record-2-1 = first(fare-components1).combinability-record-2
            Let combinability-record-2-2 = first(fare-components2).combinability-record-2
            // Check fare combinability requirements, by applying each fares's combinabilty
            // record-2 to all the other fares within the priceable-unit.
            If ((combinability-record-2-1 = nil or
                apply-combinability-record-2(combinability-record-2-1, fare2, PU-type) = pass) and
                (combinability-record-2-2 = nil or
                apply-combinability-record-2(combinability-record-2-2, fare1, PU-type) = pass))
                PU-labels = create-PUs-from-fare-components(list(faring-market1, faring-market2),
                                list(fare1, fare2),
                                list(fare-components1, fare-components2),
                                PU-labels, environmental-information)
    return(PU-labels)
```

The procedure create-PUs-in-markets2, after it has selected two fares and two sets of fare-components and verified fare combinability restrictions, calls the procedure 202d create-PUs-from-fare-components to evaluate deferred rules and construct priceable-unit-labels and priceable-unit-cores.

CONSTRUCTING PRICEABLE-UNITS

At this stage of processing, a collection of fares is determined, and for each fare there is a set of fare-components. Priceable-units are constructed by selecting one fare-component from each set and evaluating any deferred rules.

Figure 11:
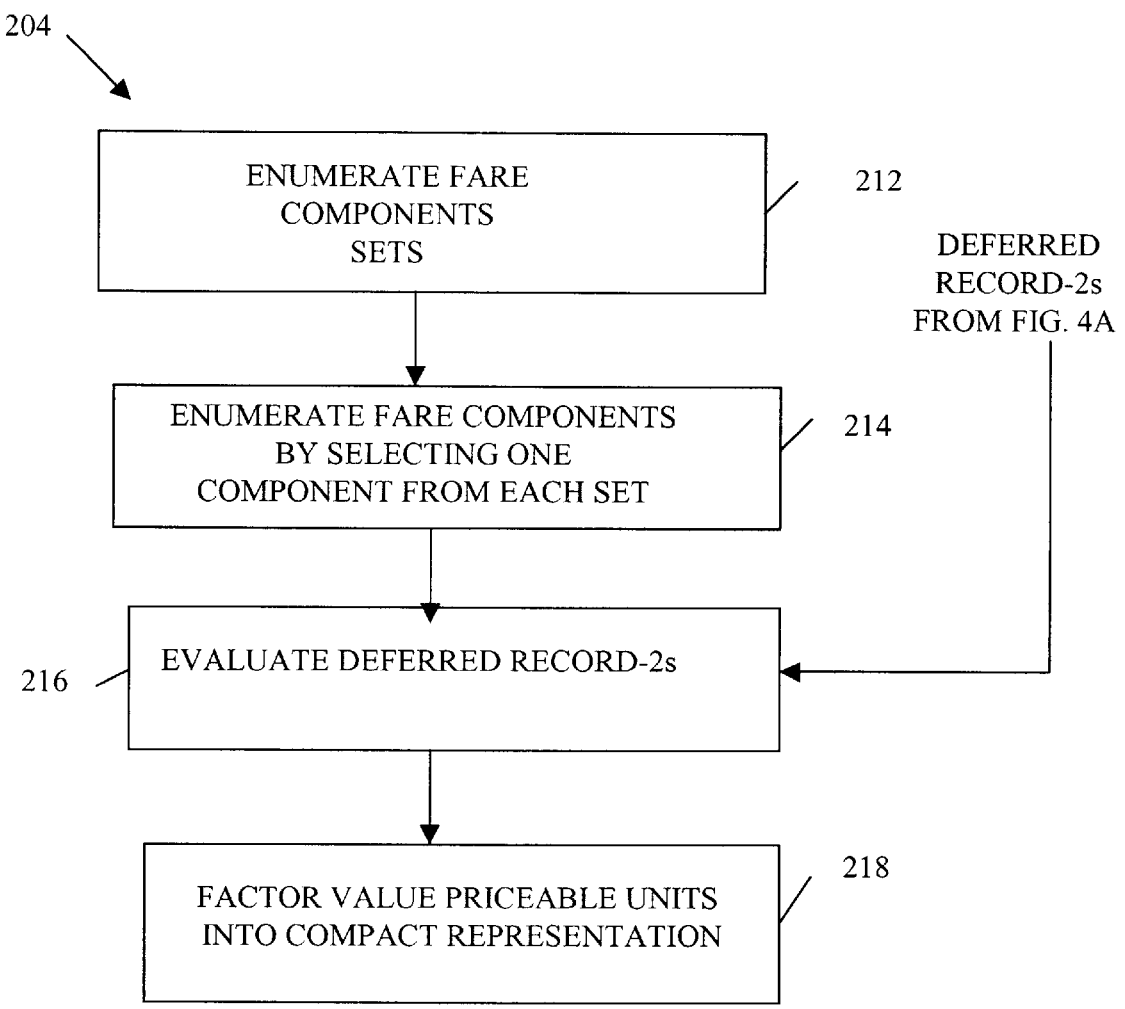
FIG. 11 is a flow chart showing a process for enumerating collections of faring components used in the process of FIG. 10.

Referring now to FIG. 11, a process 204 to enumerate collection of fare components is shown. The process 204 can enumerate 212 a collection of sets of fare-components, enumerate 214 fare components by selecting one component from each set, apply or evaluate 216 any deferred rule-conditions, and return a compact representation 218 of the set of valid priceable-units. A preferred technique to accomplish this uses a "GET_OR_AND_OR" operation described below TABLES 24, 26 and 27.

deferred record-2s, and constructs a set of valid priceable-units. This set is transformed into a factored OR-AND-OR form, and returned.

Figure 12:
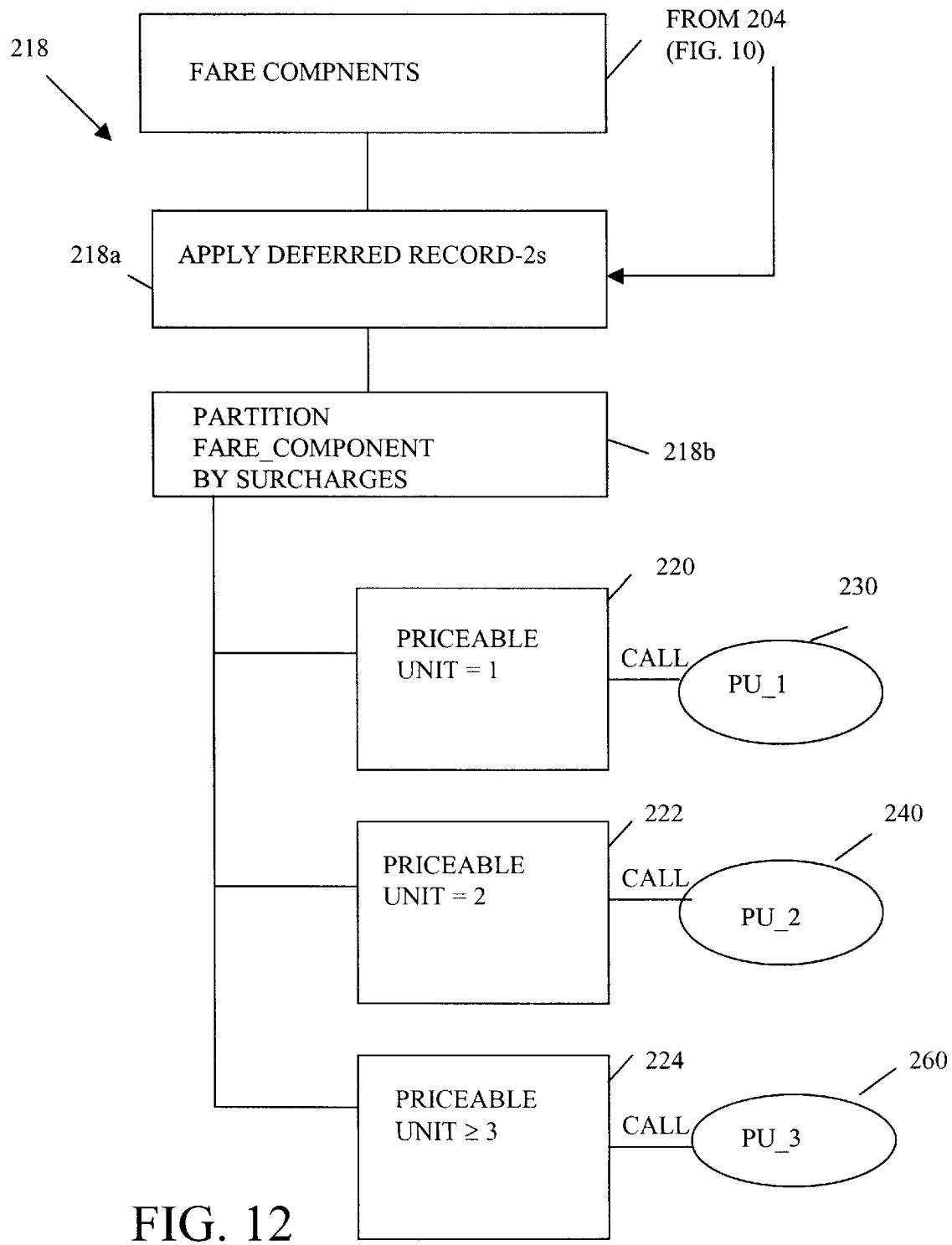
FIG. 12 is a flow chart showing a process for representing priceable units in a compact representation.
Figure 13:
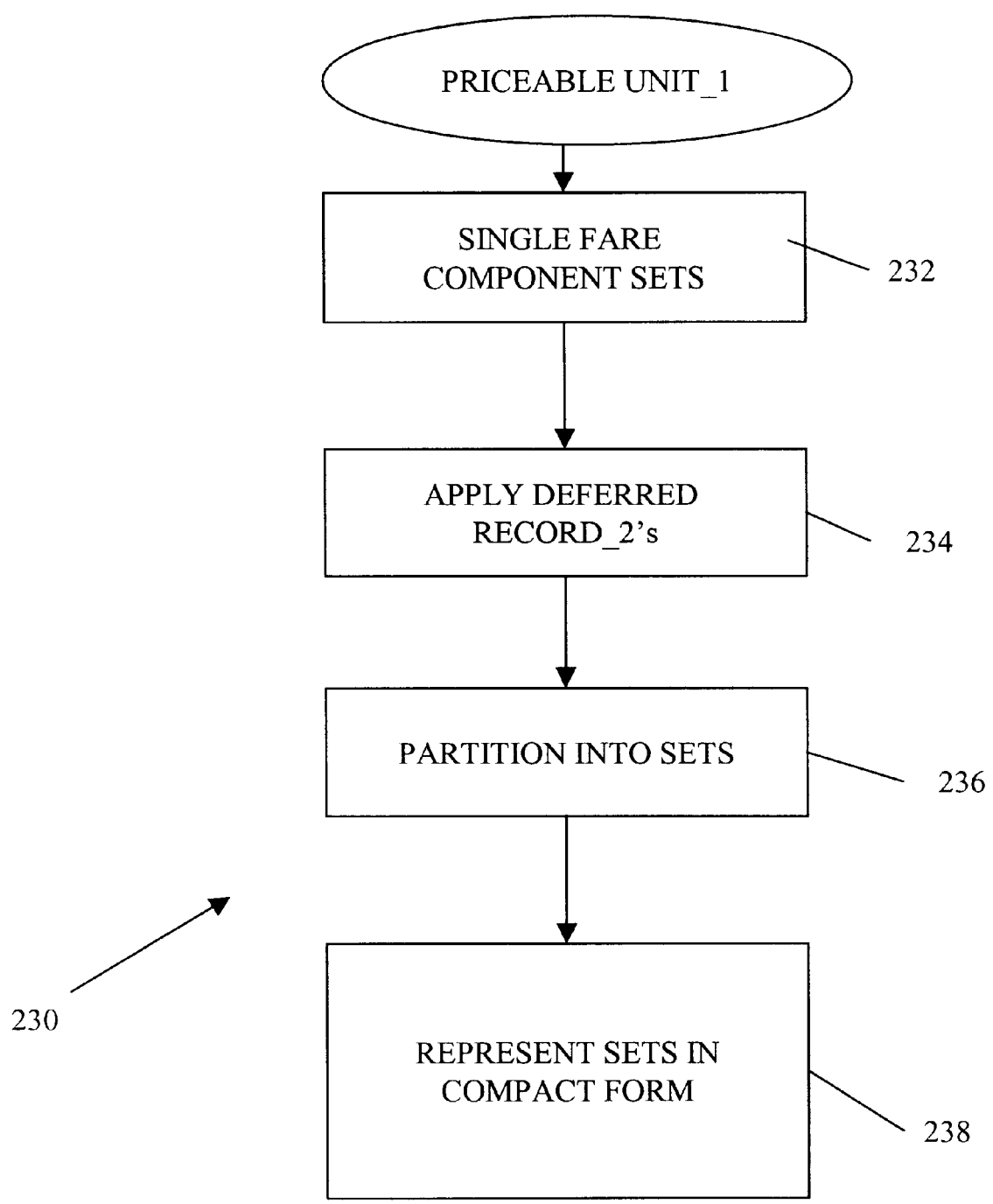
FIGS. 13–15 are flow charts showing processes for determining priceable units.

Referring back to FIG. 10, PU-cores and PU-labels are constructed 210 at process 206 and 208 from the output of get-OR-AND-OR process 204. The pseudo-code below and FIGS. 12–13 summarizes this procedure. Construction 210 iterates over the inner AND-OR form, producing PU-cores 206 (if no identical PU-core already exists) and PU-labels 208 (if no identical PU-label already exists). PU-labels are produced by mapping fare-components to faring-atoms and PU-cores are stored on PU-labels.

FACTORING PRICEABLE-UNITS

Referring now to FIGS. 12–15, the get-OR-AND-OR process 218 to construct the priceable unit representation is shown and is also described in detail below through pseudo-code. As shown in FIG. 12 and in pseudo-code in TABLE 23 below, three different high-level procedures are used, depending on whether priceable-units are one 220, two 222, or three or more 224 fare-components.

TABLE 23

```
get-OR-AND-OR(faring-markets, fare-component-sets, environmental-information)
    Let size = length(faring-markets)
    If(size = 1)
        return(get-OR-AND-OR-1(faring-markets, fare-component-sets, environmental-information)
    Else If (size = 2)
        return(get-OR-AND-OR-2(faring-markets, fare-component-sets, environmental-information)
    Else
        return(get-OR-AND-OR-3+(faring-markets, fare-component-sets, environmental-information)
```

The representation process 218 produces an OR-AND-OR representation of the priceable units. The process 218 produces a set of collections of sets of fare-components similar to that in FIG. 20, that will later be transformed into priceable-unit-labels and priceable-unit-cores by processes 206 and 208 described further in TABLE 22. The inner sets of fare-components returned by get-OR-AND-OR-form have the same fares, surcharges, discounts, penalties and so on.

The procedure 218 get-OR-AND-OR, takes a collection of fare-component sets and enumerate collections of fare-components by selecting one from each set. It evaluates any Two auxiliary functions are used in the get-OR-AND-OR procedures. The first, apply-deferred-record-2s 218a, takes a collection of fare-components (a potential priceable-unit) and evaluates any deferred record-2s they might have. In contrast to the initial stage of rule application, here all the fares and faring-atoms within the priceable-unit are known. It returns either PASS, FAIL or DEFER (in this case, DEFER means that the record-2s cannot be evaluated even at the priceable-unit level: they involve journey-level constraints). In such a case the priceable-unit is not produced (TABLE 24.)

TABLE 24

```
apply-deferred-record-2s(fare-components, environmental-information)
    Let faring-atoms = {}
    Let fares = {}
    For fare-component in fare-components
        fares += fare-component.fare
        faring-atoms += fare-component.faring-atom
    For fare-component in fare-components
        For record-2 in fare-component.deferred-record-2s
            If (apply-record-2-PU(record-2, fares, faring-atoms,
                                fare-component.faring-atom,
                                environmental-information)
                        <> pass
                return(fail)
    return(pass)
```

The second auxiliary function, partition-fare-components-by-surcharges 218b, (TABLE 25) takes a set of fare-components and partitions it into subsets that have the same secondary characteristics: the same surcharges, discounts, penalties, etc.

TABLE 25

```
partition-fare-components-by-surcharges(fare-components)
    Let partitions = {}
    For fare-component in fare-components
        Let found-partition = false
        Let surcharges = fare-component.surcharges
        For partition in partitions
            If (first(partition).surcharges surcharges)
                found-partition = true
                partition += fare-component
        If (found-partition = false)
            partitions += list(fare-component)
    return(partitions)
```

FACTORING PRICEABLE-UNITS OF SIZE ONE

Referring now to FIG. 13, the get-OR-AND-OR function 230 for priceable-units of one fare-component (one-way priceable-units) is shown. It is passed only a single fare-component set 232, and applies 216 deferred record-2s. The final set of valid fare-components is partitioned 234 into sets with the same surcharges, penalties, and discounts. The partitioned sets 236 are placed into the proper OR-AND-OR representation 238 to represent them in a compact form.

TABLE 26

```
get-OR-AND-OR-1(faring-markets, fare-component-sets, environmental-information)
    Let valid-fare-components = {}
    For fare-component in first(fare-component-sets)
        If (apply-deferred-record-2s(list(fare-component), environmental-information)
            valid-fare-components += fare-component
    Let OR-AND-OR = {}
    For OR in partition-fare-components-by-surcharges(valid-fare-components)
        Let AND-OR = list(OR)
        OR-AND-OR += AND-OR
    return(OR-AND-OR)
```

FACTORING PRICEABLE-UNITS OF SIZE TWO

Figure 14:
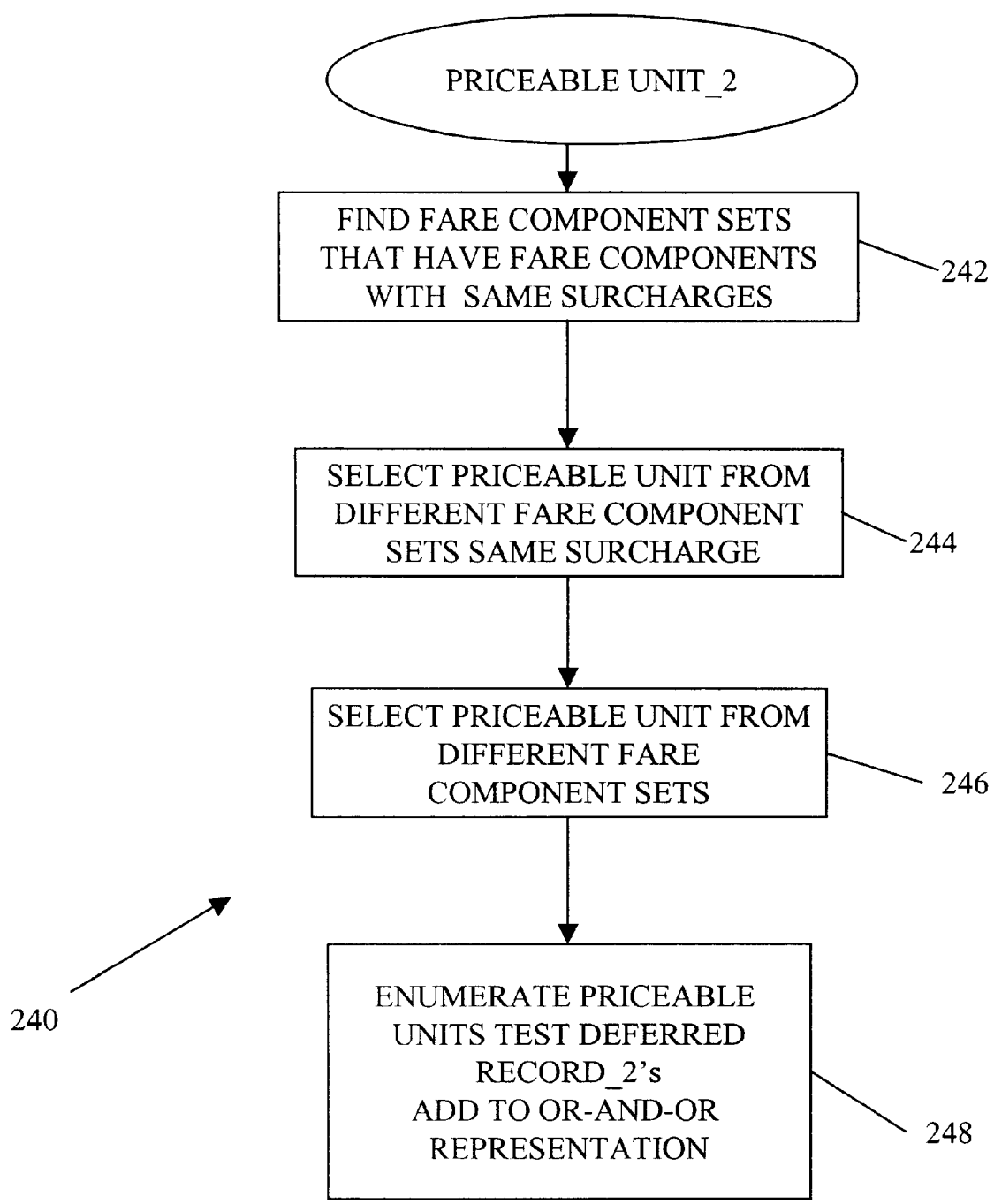

Referring to FIG. 14, two-component priceable-units include round-trips and two-component open-jaws and circle-trips. They are common and should be computed efficiently and represented compactly. The function get-OR-AND-OR-2 240 efficiently computes and represents two component priceable units (242–246). Combinations of fare-components are not enumerated unless it is necessary for evaluation of deferred record-2s. The resulting set of priceable-units is also represented in a compact OR-AND-OR form.

Pseudo code for the get-OR-AND-OR-2 procedure is set forth below (TABLE 27). The process 240 enumerates priceable units 248 by selecting one fare component from each set. The get-OR-AND-OR-2 process 240 tests deferred record-2s and, if the test is passed, adds the resulting valid priceable unit to the OR-AND-OR representation.

TABLE 27

```
get-OR-AND-OR-2(faring-markets, fare-component-sets, environmental-information)
    Let OR-AND-OR {}
    Subroutine find-AND-OR(surcharges1, fare-component-set2)
        //
        // Return any AND-OR from OR-AND-OR that has fare-components with surcharges surcharges1 in its
        // first set of fare-components, and has fare-component-set as its second set of fare-components.
        //
        For AND-OR in OR-AND-OR
            If (first(first(AND-OR)).surcharges = surcharges1 and second(AND-OR) = fare-component-set2)
                return(AND-OR)
        return(nil)
    Subroutine add-uniform-cross-product(fare-component-set1, fare-component-set2)
```

TABLE 27-continued

```
//
// Add the priceable-units that can be had by selecting one element from fare-component-set1 and
// one element from fare-component-set2. Both sets are uniform with respect to surcharges.
//
    Let AND-OR = find-AND-OR(first(fare-component-set1).surcharges, fare-component-set2)
    If (AND-OR = nil)
        OR-AND-OR += list(fare-component-set1, fare-component-set2)
    Else
        first(AND-OR) = append(first(AND-OR), fare-component-set1)
Subroutine add-cross-product(fare-component-set1. fare-component-set2)
//
// Add the priceable-units that can be had by selecting one element from fare-component-set1 and
// one element from fare-component-set2.
//
    Let uniform-fare-component-sets1 = partition-fare-components-by-surcharges(fare-component-set1)
    Let uniform-fare-component-sets2 = partition-fare-components-by-surcharges(fare-component-set2)
    For uniform-fare-component-set1 in uniform-fare-component-sets1
        For uniform-fare-component-set2 in uniform-fare-component-sets2
            add-uniform-cross-product(uniform-fare-component-set1, uniform-fare-component-set2)
Subroutine enumerate-priceable-units(fare-component-set1, fare-component-set2)
//
// Enumerate priceable-units by selecting one fare-component from each set. Test deferred record-2s,
// and if they pass, add the resulting priceable-unit to the OR-AND-OR representation.
//
    For fare-component1 in fare-component-set1
        Let valid-fare-components2 = {}
        For fare-component in fare-component-set2
            If (apply-deferred-record-2s(list(fare-component1, fare-component2), environmental-information))
                valid-fare-components2 += fare-component2
        If (valid-fare-components2 <>({})
            add-cross-product(list(fare-component1), valid-fare-components2)
    Let fare-component-set1-with-rules = {}
    Let fare-component-set1-without-rules = {}
    Let fare-component-set2-with-rules = {}
    Let fare-component-set2-without-rules = {}
For fare-component1 in first (fare-component-sets)
            If (fare-oomponent1.deferred-record-2s = nil)
                    fare-component-set1-without-rules += fare-component1
            Else
                    fare-component-set1-with-rules += fare-component1
        For fare-component in second(fare-component-sets)
            If (fare-component.deferred-record-2s = nil)
                    fare-component-set2-without-rules += fare-component2
            Else
                    fare-component-set2-with-rules += fare-component2
        // There is no need to enumerate combinations of fare-components that have no deferred rules.
        add-cross-product(fare-component-set1-without-rules, fare-component-set2-without-rules)
        // For the remainder of fare-components, though, explicit enumeration is necessary.
        enumerate-priceable-units(fare-component-set1-with-rules, fare-component-set2-without-rules)
        enumerate-priceable-units(fare-component-set1, fare-component-set2-with-rules)
        return(OR-AND-OR)
```

FACTORING PRICEABLE-UNITS OF SIZE THREE OR GREATER

Properly enumerating all possible combinations of fare-components for priceable-units of size three or greater is computationally burdensome, though possible.

Figure 15:
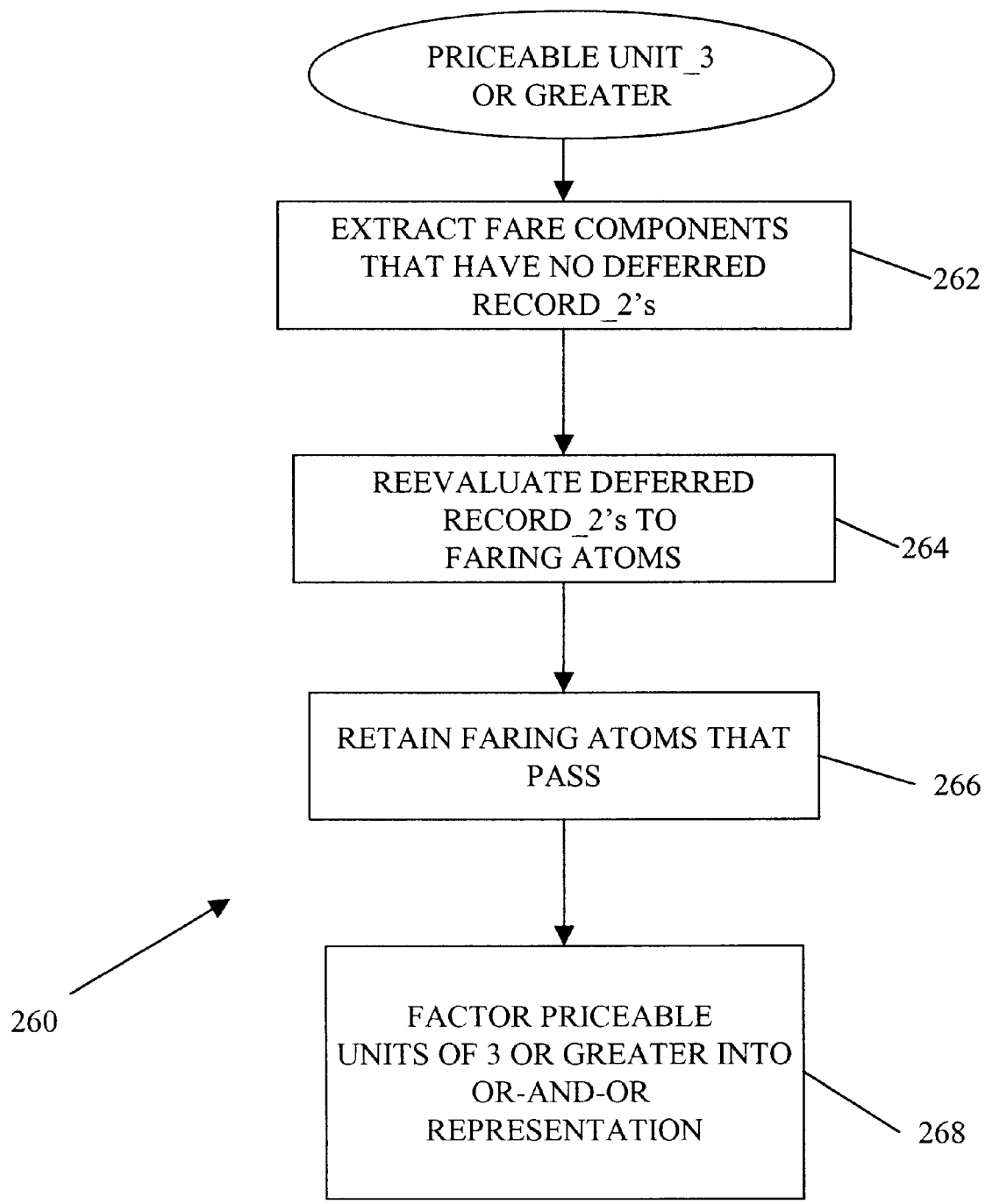

Referring now to FIG. 15, a preferred procedure 260 finds a subset of possible priceable-units. In particular, it extracts 262 those fare-components that have no deferred record-2s, and build priceable-units from them. Since there are no deferred record-2s, there are no intra-priceable-unit constraints and it is possible to construct a factored representation.

Priceable-units of size three or greater tend to have more deferred record-2s. This may somewhat reduce the effectiveness of the extracting procedure 262. The prevalence of deferred record-2s rules occurs because in complicated journeys, time-bounds used in an initial rule application tend to be broadly specified.

At this stage of processing time bound ranges can be tightened, because the faring-markets that comprise the priceable-unit are known. Therefore, deferred record-2s can be reapplied 264 to faring-atoms in the same manner that they are applied in the initial rule application. If all deferred record-2s pass, then the faring-atom is retained 266. If a record-2 fails or is deferred, the faring-atom is discarded. The function reevaluate-deferred-record-2s (TABLE 28) performs this filtering. It takes a set of faring-markets and a fare-component set, and sets time-bounds based on the faring-markets. It reevaluates deferred record-2s for each fare-component in the set, and returns the set of fare-components that have all their record-2s pass.

TABLE 28

```
reevaluate-deferred-record-2s(faring-markets, fare-component-set, environmental-information)
    set-time-bounds(faring-markets)
    Let fare-components = {}
    For fare-component in fare-component-set
        Let result = pass
        Let deferred-record-2s = {}
        For record-2 in fare-component.deferred-record-2s
            Let record-2-result, record-2-surcharges =
                apply-record-2-FC(record-2, fare-component.faring-atom, environmental-information)
            If (record-2-result = pass)
                fare-component.surcharges += record-2-surcharges
            Else If (record-2-result = defer)
                deferred-record-2s += record-2
            Else
                result = fail
        If (result = pass)
            fare-component.deferred-record-2s = deferred-record-2s
            fare-components += fare-component
    return(fare-components)
```

The procedure 268 that factors priceable-units of size three or greater, get-OR-AND-OR-3+, (TABLE 29) applies reevaluate-deferred-record-2s to each set of fare-components, to filter them. It then partitions the resulting sets based on surcharges, and takes the cross-product of these sets to construct the proper OR-AND-OR representation. The procedure for the last case does not return all possible valid priceable-units.

TABLE 29

```
get-OR-AND-OR-3+(faring-markets, fare-component-sets, environmental-information)
    Let OR-AND-OR = { {} }
    For fare-component-set in fare-component-sets
        Let valid-fare-components = reevaluate-deferred-record-2s(faring-markets, fare-component-set,
                                                                    environmental-information)
        Let new-OR-AND-OR = {}
        For OR in partition-fare-components-by-surcharges(valid-fare-components)
            For previous-AND-OR in OR-AND-OR
                new-OR-AND-OR += postpend(previous-AND-OR, OR)
        OR-AND-OR = new-OR-AND-OR
    return(OR-AND-OR)
```

LINKING ITINERARIES

Priceable-units-labels associate faring-atoms from one or more slices with fares. In the pricing-graph representation 38' set of pricing solutions, sets of priceable-unit-labels are used to link itineraries from different slices.

The pricing graph representation 38' of pricing-solutions 38 is constructed by selecting a set of priceable-unit-labels. Each of these PU-labels may or may not project onto a given slice of a journey. For example, in a round-trip journey a round-trip priceable-unit-label will project onto both slices, while a one-way priceable-unit-label will project onto only one slice of the journey. Once a set of PU-labels has been chosen, in any slice any itinerary may be chosen so long as it has some division that has faring-atoms containing exactly the PU-labels that project onto that slice. The choice of itinerary is otherwise independent of choices made in other slices.

A set of PU-labels encodes all constraints that exist between itineraries in different slices. This leads to a relatively simple procedure for constructing the pricing-graph. Itineraries within each slice are indexed by the sets of multi-slice PU-labels they can be associated with. These indices are called slice-label-sets, and act as a logical OR over itineraries. The slice-label-sets from different slices are linked by matching PU-labels.

Single-slice (one-way) priceable-unit-labels are treated somewhat differently than multi-slice priceable-unit-labels to enhance efficiency. In particular, there is no need to include single-slice PU-labels in slice-label-sets, because they do not need to be matched across slices. Rather, single-slice PU-labels are attached closely to itineraries in the pricing-graph. That is, within a slice-label-set, each itinerary is associated with a compact representation of the set of single-slice PU-labels that can be used with the itinerary, given that the multi-slice PU-labels found within the slice-label-set are also used.

The linking process constructs slice-label-sets with each slice-label-set being a set of multi-slice PU-labels and associated itinerary divisions. Slice-label-sets group itineraries by multi-slice PU-labels. Each division has associated with it a set of single-slice PU-labels.

In the pricing-graph, slice-label-sets act as ORs over itineraries. Multi-slice PU-labels encapsulate information concerning the itinerary to permit the linking process to operate over slice-label-sets rather than individual itineraries. This approval is computationally efficient and results in small pricing-graphs. In each slice-label-set, each itinerary (division) is paired with a set of single-slice PU-labels. During construction of the pricing graph, each slice-label-set is transformed into an OR over ANDs of itineraries and sets of PU-labels.

Figure 16:
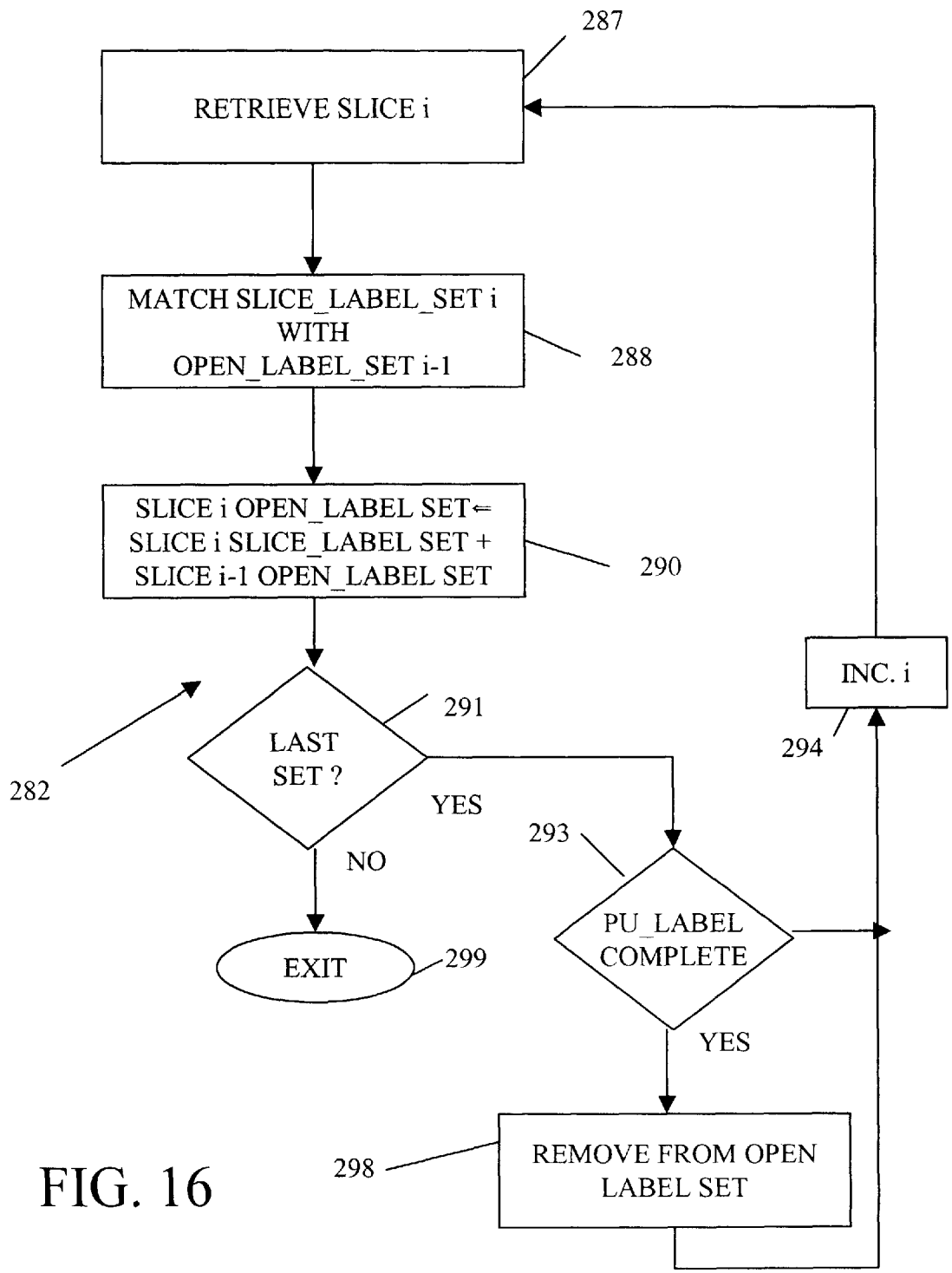
FIG. 16 is a flow chart showing a process for producing slice label sets.

The linking process 282 also connects or links slice-label-sets from different slices, as shown in FIG. 16. Connecting is accomplished by starting from the first slice and working forward to the last slice. Intermediate results are summarized in open-label-sets. Each open-label-set is a set of (multi-slice) PU-labels that project onto slices that have not been processed, along with a set of backward-links that are each a pair of a slice-label-set and an open-label-set from the previous slice. Processing starts retrieving slice 1 and matching with a single, empty slice-0 open-label-set 288. Slice-label-sets from slice 1 are "added" 290 to this open-label-set, resulting in new slice-1 open-label-sets. Then slice-label-sets from slice-2 are added to these, resulting in slice-2 open-label-sets, and so on. As this process continues, PU-labels that are complete 292 (i.e., that do not project to subsequent slices) are removed 293 from open-label-sets. The next slice is retrieved by incrementing 294. If any pricing-solutions exist, the process will terminate 297 in a single, empty, last-slice open-label-set. At that point, the backward-links serve as the top-level representation of the pricing-graph.

Set forth below is an example of the linking process. This example assumes a three-slice circle-trip journey, from BOS to MSP to MIA. In the following discussion, PU-labels are identified by a unique letter followed by a sequence of digits that indicate which slices the PU-label projects onto. For example, A-23 is a two-component PU-label that projects onto the second and third slices. Each itinerary may have several divisions, and each division may have many possible collections of PU-labels (with each collection built by selecting one PU-label per faring-atom in the division).

At this stage of processing in the faring process 18 divisions have been produced for each itinerary, each division comprising a set of faring-atoms. PU-labels have been constructed, and stored in each faring-atom. From this information it is possible to enumerate for every division, possible collections of PU-labels, by selecting one for each faring-atom. TABLE 30 below summarizes the result of this procedure, for the example journey. Each possible collection of PU-labels is partitioned into those that project onto only one slice (one-way priceable-units) and those that project onto more than one-slice. In this table, divisions are encoded using the endpoints of faring-atoms, to save space, and each itinerary and division are given numeric labels so that they can be referenced in the rest of the discussion.

TABLE 30

| Slice | Itinerary | Division | Multi-Slice PU-Labels | Single-Slice PU-Labels |
|---|---|---|---|---|
| 1 | 1.1 BOS→MSP UA123 | 1.1.1 BOS→MSP | {A-123} | {} |
|  |  |  | {F-13} | {} |
|  |  |  | {} | {I-1} |
| 1 | 1.2 BOS→CHI NW315 CHI_MSP UA739 | 1.2.1 BOS→MSP; CHI→MSP | {B-13 C-12} | {} |
|  |  |  | {B-13} | {H-1} |
|  |  |  | {C-12} | {G-1} |
|  |  |  | {} | {G-1 H-1} |
| 1 | 1.3 BOS→MSP CO450 | 1.3.1 BOS→MSP | {} | {J-1} |
| 2 | 2.1 MSP→MIA UA901 | 2.1.1 MSP→MIA | {A-123} | {} |
|  |  |  | {} | {K-2} |
| 2 | 2.2 MSP→CHI UA623 CHI_MIA UA841 | 2.2.1 MSP→MIA | {A-123} | {} |
|  |  |  | {} | {K-2} |
|  |  | 2.2.2 MSP→CHI; CHI→MIA | {C-12 D-23} | {} |
|  |  |  | {C-12} | {M-2} |
|  |  |  | {D-23} | {L-2} |
|  |  |  | {} | {L-2 M-2} |
| 2 | 2.3 MSP→MIA FL207 | 2.3.1 MSP→MIA | {E-23} | {} |
| 3 | 3.1 MIA→BOS UA112 | 3.1.1 MIA→BOS | {A-123} | {} |
| 3 | 3.2 MIA→CHI UA487 CHI→BOS NW316 | 3.2.1 MIA→CHI; CHI→BOS | {D-23 B-13} | {} |
|  |  |  | {D-23} | {O-3} |
|  |  |  | {B-13} | {N-3} |
|  |  |  | {} | {N-3 O-3} |
| 3 | 3.3 MIA→MSP FL208 MSP→BOS UA558 | 3.3.1 MIA→MSP; MSP→BOS | {E23 F13} | {} |
|  |  |  | {E23} | {P-3} |

As TABLE 30 above shows, there are three different itineraries for each slice. Each itinerary is split into one or two divisions of faring-atoms. Each division has one or several possible PU-label combinations. For example, for the second division of the second slice-2 itinerary (2.2.2) there are four different PU-label sets. This is because the division has two faring-atoms, and each faring-atom has two possible PU-labels. For reference, the table below lists each hypothetical PU-label along with its faring-markets.

TABLE 31

| Name | Faring-Markets | | | Comment |
|---|---|---|---|---|
| A-123 | 1: UA BOS→MSP | 2: UA MSP→MIA | 3: UA MIA→BOS | 3-Component Circle Trip |
| B-13 | 1: NW BOS→CHI |  | 3: NW CHI→BOS | Round Trip |
| C-12 | 1: UA CHI→MSP | 2: UA CHI→MSP |  | Round Trip |
| D-23 |  | 2: UA CHI→MIA | 3: UA MIA→CHI | Round Trip |
| E-23 |  | 2: FL MSP→MIA | 3: FL MIA→MSP | Round Trip |
| F-13 | 1: UA BOS→MSP |  | 3: UA MSP→BOS | Round Trip |
| G-1 | 1: NW BOS_CHI |  |  | One Way |

TABLE 31-continued

| Name | Faring-Markets | | Comment |
|---|---|---|---|
| H-1 | 1: UA CHI→MSP | | One Way |
| I-1 | 1: UA BOS→MSP | | One Way |
| J-1 | 1: CO BOS→MSP | | One Way |
| K-2 | | 2: UA MSP→MIA | One Way |
| L-2 | | 2: UA MSP→CHI | One Way |
| M-2 | | 2: UA CHI→MIA | One Way |
| N-3 | | 3: UA MIA→CHI | One Way |
| O-3 | | 3: NW CHI→BOS | One Way |
| P-3 | | 3: UA MSP→BOS | One Way |

TABLE 32 below lists slice-label-sets that are produced in this example, and as with itineraries and itinerary divisions, the faring process assigns each a numerical label. Many itineraries may be grouped into the same slice-label-set. For example, there are three different itinerary divisions that are grouped into slice-label-set 1.3. TABLE 30 lists, for each slice-label-set, its backward-projection. This is the set of multi-slice PU-labels that project onto previous slices.

TABLE 32

| Slice | Multi-Slice PU-Labels | Itin- erary | Divi- sion | Single- Slice PU-Labels | Backward Projection |
|---|---|---|---|---|---|
| 1 | 1.1 {A-123} | 1.1 | 1.1.1 | {} | {} |
| 1 | 1.2 {F-13} | 1.1 | 1.1.1 | {} | {} |
| 1 | 1.3 {} | 1.1 | 1.1.1 | {I-1} | {} |
|  |  | 1.2 | 1.2.1 | {G-1 H-1} |  |
|  |  | 1.3 | 1.3.1 | {J-1} |  |
| 1 | 1.4 {B-13 C-12} | 1.2 | 1.2.1 | {} | {} |
| 1 | 1.5 {B-13} | 1.2 | 1.2.1 | {H-1} | {} |
| 1 | 1.6 {C-12} | 1.2 | 1.2.1 | {G-1} | {} |
| 2 | 2.1 {A-123} | 2.1 | 2.1.1 | {} | {A-123} |
|  |  | 2.2 | 2.2.1 | {} |  |
| 2 | 2.2 {} | 2.1 | 2.1.1 | {K-2} | {} |
|  |  | 2.2 | 2.2.2 | {L-2 M-2} |  |
| 2 | 2.3 {C-12 D-23} | 2.2 | 2.2.2 | {} | {C-12} |
| 2 | 2.4 {C-12} | 2.2 | 2.2.2 | {M-2} | {C-12} |
| 2 | 2.5 {D-23} | 2.2 | 2.2.2 | {L-2} | {} |
| 2 | 2.6 {E-23} | 2.3 | 2.3.1 | {} | {} |
| 3 | 3.1 {A-123} | 3.1 | 3.1.1 | {} | {A-123} |
| 3 | 3.2 {D-23 B-13} | 3.2 | 3.2.1 | {} | {D-23 B-13} |
| 3 | 3.3 {D-23} | 3.2 | 3.2.1 | {O-3} | {D-23} |
| 3 | 3.4 {B-13} | 3.2 | 3.2.1 | {N-3} | {B-13} |
| 3 | 3.5 {} | 3.2 | 3.2.1 | {N-3 O-3} | {} |
| 3 | 3.6 {E23 F13} | 3.3 | 3.3.1 | {} | {E-23 F-13} |
| 3 | 3.7 {E23} | 3.3 | 3.3.1 | {P-3} | {E-23} |

Shown in the TABLE 33 below are lists for each slice of the open-label-sets, as well as their backward-links and their next-slice-projection. This last field is the subset of open PU-labels that project onto the subsequent slice. It is equal to the backward-projection of any slice-label-set that is part of a backward-link to the open-label-set.

TABLE 33

| Slice | Open-Label-Set | Next-Slice Projection | Backward-Link Slice-Label-Set | Backward- Link Open- Label-Set |
|---|---|---|---|---|
| 0 | 0.1 {} | {} |  |  |
| 1 | 1.1 {A-123} | {A-123} | 1.1 {A-123} | 0.1 {} |
| 1 | 1.2 {F-13} | {} | 1.2 {F-13} | 0.1 {} |
| 1 | 1.3 {} | {} | 1.3 {} | 0.1 {} |
| 1 | 1.4 {B-13 C-12} | {C-12} | 1.4 {B-13 C-12} | 0.1 {} |
| 1 | 1.5 {B-13} | {} | 1.5 {B-13} | 0.1 {} |

TABLE 33-continued

| Slice | Open-Label-Set | Next-Slice Projection | Backward-Link Slice-Label-Set | Backward- Link Open- Label-Set |
|---|---|---|---|---|
| 1 | 1.6 {C-12} | {C-12} | 1.6 {C-12} | 0.1 {} |
| 2 | 2.1 {A-123} | {A-123} | 2.1 {A-123} | 1.1 {A-123} |
| 2 | 2.2 {} | {} | 2.2 {} | 1.1 {} |
| 2 | 2.3 {D-23} | {D-23} | 2.3 {C-12 D-23} | 1.6 {C-12} |
|  |  |  | 2.5 {D-23} | 1.3 {} |
| 2 | 2.4 {E-23} | {E-23} | 2.6 {E-23} | 1.3 {} |
| 2 | 2.5 {D-23 F-13} | {D-23 F-13} | 2.5 {D-23} | 1.2 {F-13} |
| 2 | 2.6 {E-23 F-13} | {E-23 F-13} | 2.6 {E-23} | 1.2 {F-13} |
| 2 | 2.7 {F-13} | {F-13} | 2.2 {} | 1.2 {F-13} |
| 2 | 2.8 {D-23 B-13} | {D-23 B-13} | 2.3 {C-12 D-23} | 1.4 {B-13 C-12} |
|  |  |  | 2.5 {D-23} | 1.5 {B-13} |
| 2 | 2.9 {E-23 B-13} | {E-23 B-13} | 2.6 {E-23} | 1.5 {B-13} |
| 2 | 2.10 {B-13} | {B-13} | 2.4 {C-12} | 1.4 {B-13 C-12} |
|  |  |  | 2.2 {} | 1.5 {B-13} |
| 3 | 3.1 {} | {} | 3.1 {A-123} | 2.1 {A-123} |
|  |  |  | 3.5 {} | 2.2 {} |
|  |  |  | 3.3 {D-23} | 2.3 {D-23} |
|  |  |  | 3.7 {E-23} | 2.4 {E-23} |
|  |  |  | 3.6 {E-23 F-13} | 2.6 {E-23 F-13} |
|  |  |  | 3.2 {D-23 B-13} | 2.8 {D-23 B-13} |
|  |  |  | 3.4 {B-13} | 2.10 {B-13} |

Each open-label-set contains a set of PU-labels that are still "open", i.e., project onto a subsequent slice. For the PU-label C-12 does not appear in open-label-sets from slice 2 or slice 3. In the pricing-graph, each open-label-set will be translated into an OR over the backward-links. The backward-links represent paths that lead to the open-label-set. Each is a pair (an AND) of a slice-label-set with an open-label-set from the previous slice. Because TABLE 33 is consistent, the backward-projection of any slice-label-set in a link is equal to the next-slice-projection of the open-label-set in the link. Furthermore, the PU-labels in each open-label-set can be constructed by selecting any backward-link, taking the union of the PU-labels in the link's open-label-set and slice-label-set, and removing any PU-labels that do not project forward.

If there is an empty open-label-set for the last slice, then pricing-solutions exist. This open-label-set provides the "root" of the pricing-graph, a node that has a child for every link. Each of these links will become an AND of the slice-label-set and the previous open-label-set. In this way open-label-sets and slice-label-sets are used to produce the pricing-graph.

FARE-COMBINABILITY RESTRICTIONS

The linking procedure described above assumes that there are no restrictions on the mixing of priceable-unit-labels other than those imposed by itineraries. This is not always the case. For example, although the various create-PUs-in-markets procedures described above apply fare-combinability checks, those checks include only restrictions on the fares that may coexist within a priceable-unit. These checks include ATPCO categories 101, 102 and 103, but not category 104. The category-10 record-2s that are stored on fare-components may also include so called "end-on-end" fare-combinability restrictions. These restrictions constrain the fares within other priceable-units. One example of such an end-on-end fare-combinability constraint is that all fares within an entire journey must be published by the same airline as the fare with the constraint.

Cross-priceable-unit constraints such as end-on-end fare-combinability restrictions complicate the process of finding valid fares for itineraries. In general cross-priceable unit constrains can be very expensive to evaluate. These constraints can often be efficiently evaluated during the process that links the set of valid fares to the sets of flights to form a pricing solution. Below, an efficient approach for evaluating many common end-on-end fare-combinability restrictions is described.

First, priceable-unit-labels are constructed in such a manner that all priceable-unit-cores within them share the same end-on-end combinability restrictions. This is reflected in the procedure partition-fare-components-into-sets, described previously. During the linking process each priceable-unit-label end-on-end fare-combinability restriction is applied to the fares in other priceable-unit-labels. This happens during the initial stage of the linking process, in the execution of create-slice-label-sets. Create-slice-label-sets iterates over itinerary divisions, and for each division, iterates in an inner loop over covering sets of priceable-unit-labels. In this inner loop an end-to-end fare-combinability restriction attached to one priceable-unit-label in the set can be applied to fares in other priceable-unit-labels within the set. If the restriction fails, the set of priceable-unit-labels is rejected.

For this procedure it is desirable that every priceable-unit-label containing an end-on-end restriction projects onto all the slices that the restriction needs to be checked against. Some restrictions may only need to be checked against fares adjacent to the fare-component or priceable-unit containing the restriction, while others may need to be applied to every other priceable-unit in the entire journey. Hence, if a priceable-unit-label projects onto every slice, then its end-on-end restrictions can be applied to every other priceable-unit-label in a potential pricing-solution.

But, if a priceable-unit-label projects onto only one slice (as a one-way priceable-unit-label would) while its restriction must be applied to priceable-units from several slices, then the restriction cannot be applied using the method described here. In such a case there are several options available. One is to reject the set of priceable-unit-labels currently under consideration. Another is to accept it, but mark it as potentially requiring that any solution containing it must be split into several journeys (a "split ticket").

When a combinability record-2 is applied in this manner, the information available to it at any one time is a set of priceable-unit-labels that collectively cover a division of an itinerary (one of these priceable-unit-labels contains the source record-2). Each of these priceable-unit-labels reference one or more priceable-unit-cores, each of which in turn references one or more fares. It is these fares that are validated by the combinability record-2. It may be that some priceable-unit-cores from within a priceable-unit-label pass, while others fail. Several options are available in this ambiguous case: a new priceable-unit-label can be generated, referencing only those priceable-unit-cores that pass, or the entire priceable-unit-label can be rejected. The second is the more efficient option, though it may cause some valid pricing-solutions to be unnecessarily rejected.

CONSTRUCTING SLICE-LABEL-SETS

Slice-label-sets are constructed during the process of producing open-label-sets 282, by the pseudo-code given below (TABLE 34). This code is passed the set of itineraries for a slice.

For each itinerary and each division within that itinerary, all possible sets of PU-labels are enumerated. Each set is partitioned into a set of multi-slice PU-labels and a set of single-slice PU-labels. A unique slice-label-set is produced for each collection of multi-slice PU-labels. Within the slice-label-set are stored itinerary-label-holders. Each of these pairs an itinerary with a set of division-label-holders. Each division-label-holder pairs an itinerary division with a set of sets of single-slice PU-labels.

TABLE 34

```
create-slice-label-sets(itineraries)
    Subroutine division-PU-label-sets(division)
        //
        // Return a list of all the possible sets of PU-labels for this division.
        //
        Let PU-label-sets = { {} }
        For faring-atom in division
            Let new-PU-label-sets = {}
            For PU-label in faring-atom.priceable-unit-labels
                For previous-PU-label-set in previous-PU-label-sets
                    new-PU-label-sets += postpend(previous-PU-label-set, PU-label)
            PU-label-sets = new-PU-label-sets
        return(PU-label-sets)
    Let slice-label-sets = {}
    For itinerary in itineraries
        For division in itinerary.divisions
            For PU-labels in division-PU-label-sets(division)
                Let multi-slice-PU-labels = multi-slice-PU-labels(PU-labels)
                Let single-slice-PU-labels = single-slice-PU-labels(PU-labels)
                Let slice-label-set find(multi-slice-PU-labels, slice-label-sets)
                If (slice-label-set = nil)
                    slice-label-set = new-slice-label-set()
                    slice-label-set.multi-slice-PU-labels = multi-slice-PU-labels
                    slice-label-set.division-single-slice-labels = {}
```

TABLE 34-continued

```
            Let itinerary-label-holder = find(itinerary, slice-label-set.itinerary-label-holders)
            If (itinerary-label-holder = nil)
                itinerary-label-holder = new-itinerary-label-holder()
                itinerary-label-holder.itinerary = itinerary
                itinerary-label-holder.division-label-holders = {}
                slice-label-set.itinerary-label-holders += itinerary-label-holder
            Let division-label-holder = find(division, itinerary-label-holder.division-label-holders)
            If (division-label-holder = nil)
                division-label-holder = new-division-label-holder()
                division-label-holder.division = division
                division-label-holder.single-slice-label-sets = {}
                itinerary-label-holder.division-label-holders += division-label-holder
            division-label-holder.single-slice-label-sets += single-slice-PU-labels
    return(slice-label-sets)
```

CONSTRUCTING OPEN-LABEL-SETS

Open-label-sets are constructed slice-by-slice, starting from a single, empty open-label-set. For each slice, the first step is to produce slice-label-sets using the procedure described above and enumerate the current set of open-label-sets. For each open-label-set, the projection into the next slice is computed. All slice-label-sets with backward-projections equal to that next-slice-projection are used to create a new set of open multi-slice priceable-unit-labels, and from this a new open-label-set is produced. The pseudo code below in TABLE 35 describes this.

TABLE 35

```
link-itineraries(itinerary-sets)
            Subroutine projection(PU-labels, slice-number)
                //
                // Return those PU-labels that project onto this slice.
                //
                Let result = {}
                For PU-label in PU-labels
                        If (find(slice-number, PU-label.slice-numbers))
                                result += PU-label
                return(result)
            Subroutine backward-projection(PU-labels, slice-number)
                //
                // Return those PU-labels that project onto a previous slice.
                //
                Let result = {}
                For PU-label in PU-labels
                        If (find-if-less-than(slice-number, PU-label.slice-numbers))
                                result += PU-label
                return(result)
            Subroutine forward-projection(PU-labels, slice-number)
                //
                // Return those PU-labels that project onto a subsequent slice.
                //
                Let result = {}
                For PU-label in PU-labels
                        If (find-if-greater-than(slice-number, PU-label.slice-numbers))
                                result += PU-label
                return(result)
            Let initial-open-label-set = new-open-label-set()
            initial-open-label-set.open-PU-labels = {}
            initial-open-label-set.backward-links = {}
            Let open-label-sets = list(initial-open-label-set)
            Let open-PU-labels = open-label-set.open-PU-labels
            Let next-slice-projection = projection(open-PU-labels slice-number)
            For slice-label-set in slice-label-sets
            Let slice-PU-labels-slice-label-set.multi-slice-PU-labels
            If (next-slice-projection = backward-projection(slice-PU-labels slice-number))
            Let new-open-PU-labels = forward-projection(union(slice-PU-labels, open-PU-labels),
                                                                                    slice-number)
                    Let new-open-label-set = find(new-open-PU-labels, new-open-label-sets)
                    If (new-open-label-set = nil)
                        new-open-label-set = new-open-label-set()
                        new-open-label-set.open-PU-labels = new-open-PU-labels
                        new-open-label-set.backward-links = {}
                    Let backward-link = new-backward-link()
                    backward-link.slice-label-set = slice-label-set
                    backward-link.open-label-set = open-label-set
                    new-open-label-set.backward-links += backward-link
            open-label-sets = new-open-label-sets
            slice-number += 1
```

TABLE 35-continued

```
If (open-label-sets = {})
        return(nil)
    Else
        // Return the root open-label-set.
        return(first(open-label-sets))
```

PRICING GRAPH

Figure 17:
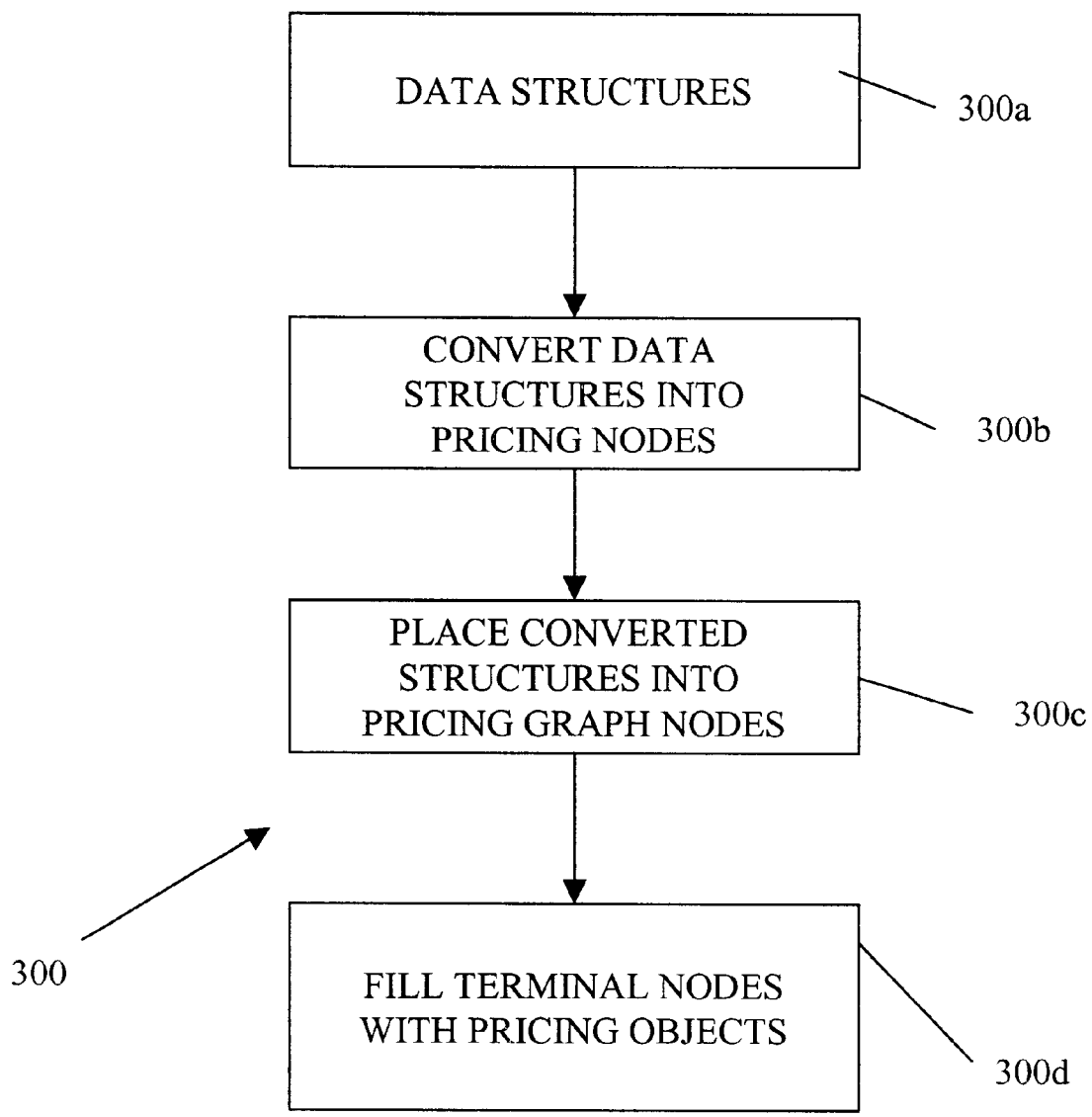
FIG. 17 is a flow chart showing the process for constructing a pricing graph.

Referring now to FIG. 17, a pricing graph 38' (FIG. 3) is produced containing logically combinable nodes that can be used to efficiently and compactly represent a set of pricing solutions 38 (FIG. 1). The pricing graph 38' as used herein is a so-called directed acyclic graph although other types of representations could be used. For example, a grammar could be used.

The pricing graph 38' is constructed 300 from data structures 300a (summarized below in TABLE 36 and mentioned in conjunction with FIGS. 4A–4B) provided during the preceding processes. The data structures convert 300b to one or more nodes in the pricing graph. The open-label-set data structure becomes an OR node and its children are the converted versions of its backward links. Each backward link in the open label set is converted to an AND node. If a pricing object is shared, for example, a priceable unit core is shared between several priceable unit labels, then its counterpart nodes in the pricing graph will be shared so that the size of the pricing graph is not unnecessarily enlarged. The converted nodes are placed 300c in the pricing graph nodes. Terminal objects such as fares and itineraries undergo essentially no conversion. They are placed 300d into special terminal nodes with no children and are obtained from the various data structures that have the pricing objects.

TABLE 36

| Data-Structure Type | Type | Child Fields |
|---|---|---|
| open-label-set | OR | backward-links (each a backward-link). |
| backward-link | AND | open-label-set (an open-label-set). |
| | | slice-label-set (a slice-label-set). |

TABLE 36-continued

| Data-Structure Type | Type | Child Fields |
|---|---|---|
| slice-label-set | AND | multi-slice-PU-labels (each a priceable-unit-label). |
| | (OR) | itinerary-label-holders (each an itinerary-label-holder). The itinerary-label-holders are put into an OR and the OR is placed under the AND, which also includes all multi-slice-PU-labels. |
| itinerary-label-holder | AND | itinerary (an itinerary). |
| | (OR) | division-label-holders (each a division-label-holder). The division-label-holders are put into an OR and the OR is placed in an AND with the itinerary. |
| division-label-holder | OR | single-slice-PU-label-sets |
| | (AND) | (each a set of sets of PU-labels). The inner sets are put into ANDs, and these are all embedded under an OR. |
| priceable-unit-label | OR | priceable-unit-cores (each a priceable-unit-core). |
| priceable-unit-core | AND | fares (each a fare). |
| | | surcharges (each a surcharge, penalty, discount, etc.) |
| fares | Term | |
| itinerary | Term | |
| surcharge | Term | |

In cases where a node has only one child, there is no need to produce the node. Rather, a direct link can be passed to its child. This does not alter the interpretation of the pricing-graph, but can result in a smaller graph.

The pseudo-code below TABLE 37 summarizes construction of the pricing graph, given the "root" open-label-set that is the output of the linking process.

TABLE 37

```
create-pricing-graph(root-object)
    Let nodes = {}
    Subroutine convert-object(object)
        // Convert the object and cache the result, so that nodes with multiple parents are shared
        Let node = find(object, nodes)
        If (node = nil)
            node = convert(object)
            nodes += node
        return(node)
    Subroutine convert-objects (objects)
        // Convert the set of objects and return a set of nodes.
        Let result = {}
        For object in objects
            result += convert-object(object)
        return(result)
    Subroutine create-node(children, type)
        // Create a node of type type with children children, if there is more than one child.
        // Otherwise the node is unnecessary, and the only child is returned.
        If (length(children) = 1)
            return(first(child))
        Else
            Let node = new-node()
            node.type = type
            node.children = children
```

TABLE 37-continued

```
            node.terminal-object = nil
            return(node)
    Subroutine convert(object)
        Let object-type = type(object)
        If (type = open-label-set)
            return(create-node(convert-objects(object.backward-links), OR))
        Else If (type = backward-link)
            return(create-node(list(convert-object(object.slice-label-set). convert-object(object.open-label-set)), AND)
        Else If (type = slice-label-set)
            Let children = convert-objects(object.multi-slice-PU-labels)
            children += create-node(convert-objects(object.itinerary-label-holders), OR)
            return(create-node(children, AND))
        Else If (type = itinerary-label-holder)
            Let children = convert-objects(object.division-label-holders)
            children += create-node(convert-objects(object.itinerary), OR)
            return(create-node(children, AND))
        Else If (type = division-label-holder)
            Let children = {}
            For single-slice-PU-label-set in object.single-slice-PU-label-sets
                children += create-node(convert-objects(single-slice-PU-label-set), AND)
            return(create-node(children, OR))
        Else If (type = priceable-unit-label)
            return(create-node(convert-objects(object.priceable-unit-cores), OR))
        Else If (type = priceable-unit-core)
            return(create-node(append(convert-objects(object.fares), convert-objects(object.surcharges)), AND))
        Else // object is a terminal.
            Let node = new-node()
            node.type = terminal
            node.children = {}
            node.terminal-object = object
            return(node)
    return(connvert-object(root-object))
```

The pricing graph 38' resulting from the search procedure 54 provides a compact way for representing a very large number of set of pricing solutions. By the above process, it is often possible to obtain a very large number of pricing solution components. Although the number of pricing solutions can be returned in the form of a simple list, this is not desirable. A very large number of pricing solutions can be difficult to manipulate, enumerate and interrogate and to transfer/transmit across a network since the amount of data involved is very large. The pricing graph 38' provides a more compact way of representing these pricing solutions. The compact representation of the range of set of pricing solutions is generated where choices are represented explicitly and redundancy is removed wherever possible.

As mentioned above, the pricing graph 381 produced by the search procedure 54 includes three types of nodes. The first type of node is a node that represents choices called "LOGICAL OR" nodes. The second type of node is a node that represents collections referred to as "LOGICAL AND" nodes. A third type of node represented in the pricing graph is a terminal node that represents pricing objects.

A data structure representation (TABLE 38) of the nodes is set out below. Each node contains a "type", which specifies whether the node is an AND node, an OR node or a terminal node. The data structure also contains either list of children (if the node is an AND node or an OR node) or a terminal object (if the node is a terminal). The node contains fields that store values used by algorithms that manipulate the pricing graph 38'.

TABLE 38

| Node fields | Use |
| --- | --- |
| type | Either AND, OR or TERMINAL |
| children | A list of child-nodes, if node is AND or OR. |
| terminal-object | A terminal-object such as a fare or itinerary, if the node is TERMINAL. |

TABLE 38-continued

| Node fields | Use |
| --- | --- |
| active? | True or false, depending on whether the node is active. |
| inner-value | The node's minimum possible inner-value. |
| outer-value | The node's minimum possible outer-value. |
| total-value | The node's minimum possible total-value. |
| best-child | For OR-nodes, the child with the least-positive inner-value. |

As mentioned above, the pricing graph 38' is a compact representation of a set of set of pricing solutions. The typical number of set of pricing solutions represented by pricing graph ranges from tens of millions into hundreds of billions with the number of nodes in the graph ranging from thousands to tens of thousands. The pricing graph can be easily stored and/or transmitted over a network or other connection to a client and represents complete representation of all or substantially all of possible pricing solutions. Therefore, the pricing graph 38' can be used by a smart client without further intervention from the server 12.

MANIPULATING THE PRICING-GRAPH

Figure 18:
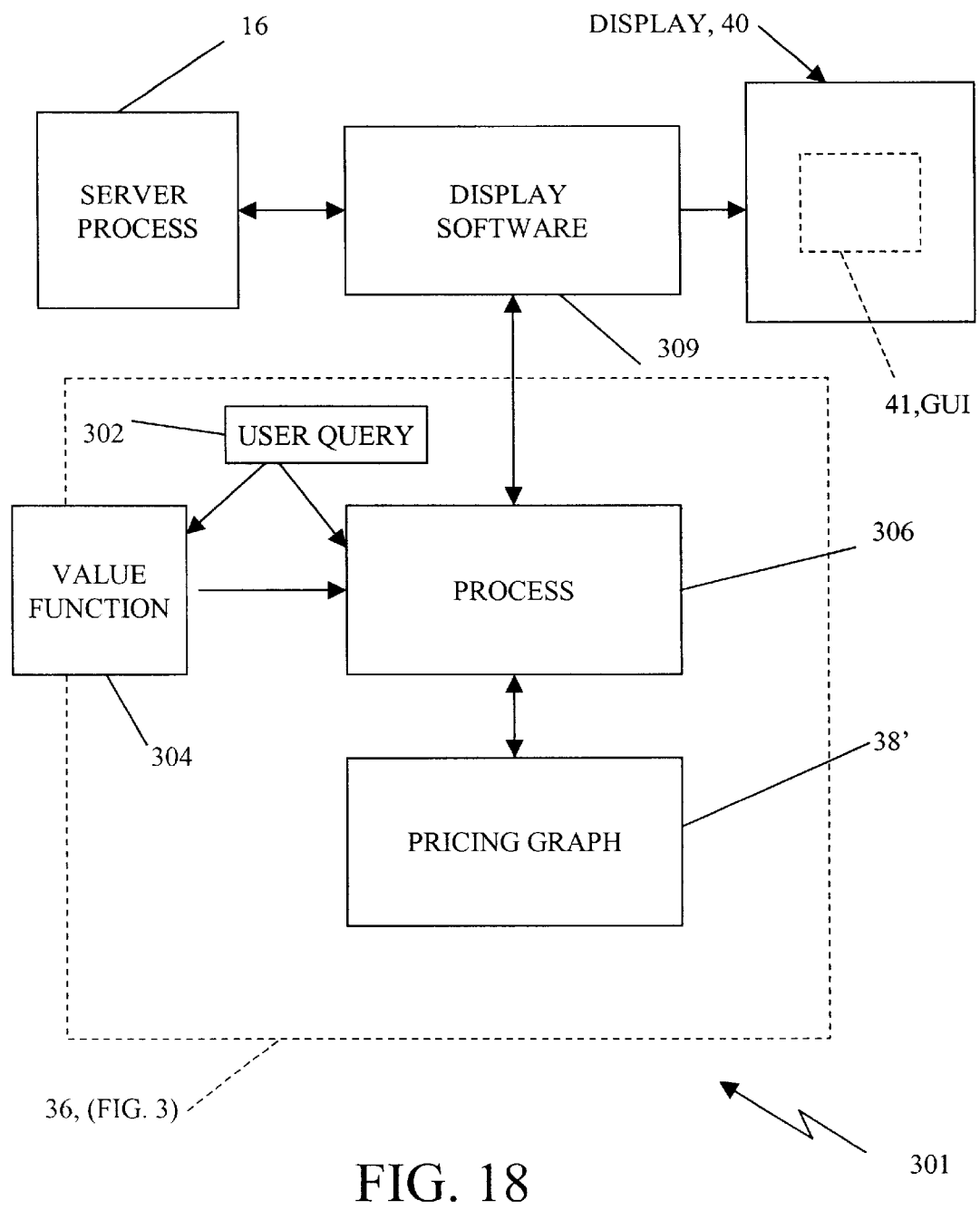
FIG. 18 is a block diagram showing the relationship between the pricing graph and a graphical user interface for the travel planning system of FIG. 1.

Referring now to FIG. 18, a high level illustration of a process 301 that operates on the pricing graph 38' typically as a client process 36 on the client computer system is shown. The process 301 includes a user query 302 that passes parameters into a process 304 and a value function 306 to extract from the pricing graph 38' certain pricing solutions 308 that satisfy parameters specified by the user query 302. The extracted pricing solutions are returned as a list 308 or other representation. Generally the pricing solutions are displayed on the display 40. Display software 309 handles production of GUI's 41 to present the information.

The pricing solution list 308 will contain pricing solutions extracted from the pricing graph 38' in accordance with user specified parameters from the user query 302 using one of the processes 304 and one of the value functions 306.

Figure 19:
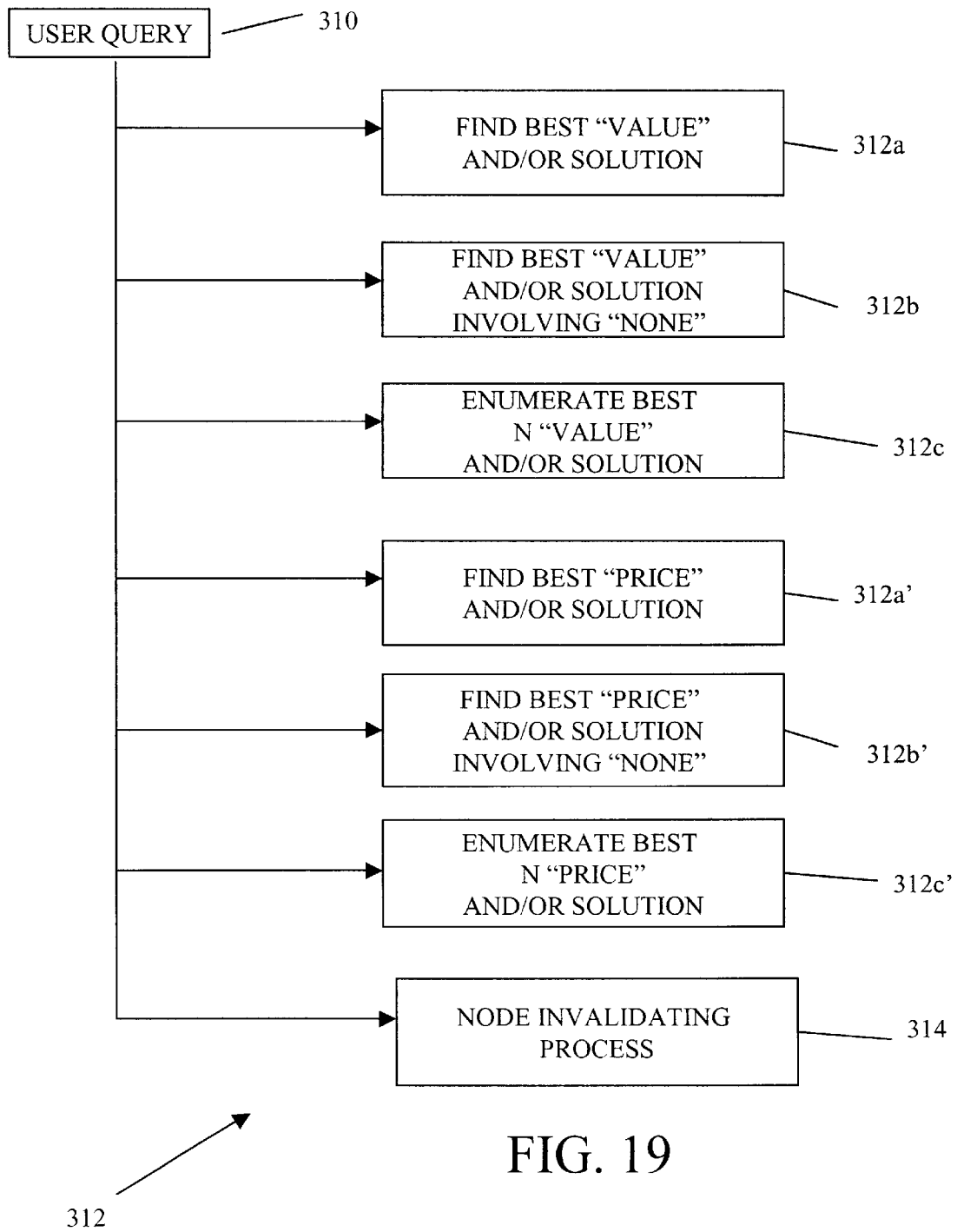
FIG. 19 is a flow chart showing various enumeration functions.

Referring now to FIG. 19, illustrative processes are shown. In particular, in response to the user query 310, one of the processes is executed. The processes 312 can comprise a find best "value" and pricing solutions associated with the value (e.g., price) process 312a; find best "value" and pricing solutions associated with the value for "node" (e.g., find best price for a particular itinerary) process 312b; an enumeration for "N" pricing solutions 312c; or an enumeration process that lists the pricing solutions according to some "value." Additional enumeration processes can be provided to produce query results corresponding to different ways of looking at pricing solutions extracted from the pricing graph 38'. A node invalidating process 314 that invalidates selected nodes from contributing to a pricing solution is also included.

Examples of each of these processes are set forth below.

Efficient algorithms 312 are used for manipulating this representation to extract information of interest and to enumerate set of pricing solutions from the structure. For example, it is possible to quickly extract the cheapest solution; to find the cheapest solution involving selected fares and itineraries; to verify whether any pricing solution remains if specific fares or itineraries are excluded; to enumerate solutions under various orderings and so forth. Furthermore, the representation is compact enough so that it can be efficiently stored and transmitted such as from the server to the client. One benefit, therefore, is that after a single fare search 54 in the server process 16, the server process 16 transfers the pricing graph 38 to the client process 36. The client process 36 can examine and manipulate the large space of pricing solutions represented in the pricing graph 38' without further interaction with the server process 18.

For the set of pricing solutions represented by the pricing graph 38' to be useful, processes are provided to extract pricing solutions from the graph and manipulate the set of pricing solutions, as depicted in FIG. 19. In general, each of the enumeration processes to be described operate on the pricing graph to extract pricing solutions from the pricing graph according to particular criteria that can be set, for example, by a client system 30c (FIG. 2) in response to a user query 48 (FIG. 4). Examples of user queries as well as a display representation for information extracted from the pricing graph will be described below.

An example of an enumeration function enumerates pricing solutions in a specific order. For example, an enumeration function can enumerate the 100 cheapest pricing solutions represented by the pricing graph 38'. A second enumeration function can find extreme points of the set of pricing solutions. This can be used, for example, to find the most convenient pricing solution. In addition, a value function can specify a minimum value of some value over the set of pricing solutions that involve a particular node. One value function finds for each itinerary the cheapest pricing solution that involves that itinerary or the shortest total duration of any pricing solution that involves that itinerary.

In addition, each of the above operations can be performed on a subset of the graph. For example, it may be desirable to enumerate the 100 cheapest solutions that involve a given itinerary or finding the most convenient solution that involves only refundable fares or includes only certain airlines or excludes certain airlines.

VALUE FUNCTIONS

Referring now to FIG. 19, many processes or operations on the pricing graph 38' use a value-function, a function that operates on the terminal nodes of the pricing graph 38' and returns a numerical value that can be used to rank pricing-solutions. Examples of value-functions include price computed by summing the prices of fares (and penalties and surcharges) in a pricing-solution, duration, or convenience (that might be a mix of total travel-time with penalties for stops and airline-changes, for example), or mixes of each.

Many of the processes used to manipulate the pricing graph 38' depend on a value-function being decomposable into the sum of a second function that is applied to individual terminal nodes in the pricing-graph. The "price value function" meets this requirement, because the total price of a pricing-solution is equal to the sum of the prices of fares. Many expressions of convenience also meet this requirement, including those that can be computed as the sum of a function applied to individual itineraries. However, there are some value-functions that cannot be placed into this form. An example is a "convenience" function that checks whether travel in different slices is on the same airline. Such a function depends on all itineraries at once.

In general, in the discussion below, the term node-value-function is used to refer to a function that is applied to individual nodes in the pricing-graph, and summed to produce the value of an entire itinerary. The term value-function is used for the more general case of a function that may or may not be decomposable into the sum of a node-value-function applied to each terminal in the pricing-graph.

FINDING THE BEST PRICING SOLUTION

The first process 312a is an example of one that finds extreme points of the set of pricing-solutions, such as the cheapest pricing-solution.

Assuming that it is desired to find a pricing-solution that minimizes some value-function that can be decomposed into a node-value-function F, the best pricing solution could be found by enumerating all pricing-solutions and applying F to each of them. This is impractical because of the large number of set of pricing solutions.

The Best Price algorithm 312a' efficiently finds the cheapest (best) price by starting at the "bottom" of the pricing-graph 38' and constructing the best solution for each node by looking at the best solution of its children. In this way it works in one pass from the bottom of the graph to the top. At the end of the process the root node contains the best pricing solution for the entire pricing graph 38.

The algorithm proceeds as follows: first, the nodes in the graph are ordered by depth and placed in a list, so that iterating over the list ensures that a child node is always encountered before its parent(s). Then, iterating across the list, the best value of F is computed for each node, using the already-computed values of F for its children. At this point every node in the graph is marked with its inner-value. The inner-value of a node is the best possible value of the function F on the set of (partial) pricing-solutions represented by the node. As inner-values are computed, for every OR node the child with the lowest inner-value is computed and stored. Finally, the best pricing solution can be constructed by starting at the root of the graph and collecting children. Whenever an OR node is encountered, the best child is chosen (the child with the lowest inner-value).

If a node is a terminal fare or itinerary, then its inner-value is the value of F applied to the node. If the node is an AND, representing a combination, then the minimum value of F over the partial solutions it represents is the sum of the minimum values of F over the partial solutions represented by each of its children. If a node is an OR, representing a choice, then the minimum value of F over the partial solutions it represents is found by making the optimal choice of children, that is, the child with the minimum inner-value. So the inner-value of an OR is the minimum of the inner-values of its children.

The pseudo-code in TABLE 38 summarizes the computation of inner-values. The function sort-nodes takes a root node and returns a list of all nodes under it, sorted by depth with the root node at the end. The procedure compute-inner-values takes in a sorted list of nodes as would be produced by sort-nodes, and a node-value-function. The procedure find-optimal-solution takes in a root-node and a node-value-function, calls sort-nodes and compute-inner-values to calculate inner-values for all nodes in the pricing-graph, and constructs a pricing-solution.

TABLE 38

```
    sort-nodes(node)
        Let nodes = {}
        For child in node.children
            nodes = append(nodes, sort-nodes(child))
        nodes += node
        return(nodes)
            compute-inner-values(sorted-nodes, node-value-function)
    For node in sorted-nodes
        If (node.type = terminal)
            node.inner-value = apply(node-value-function, node.terminal-object)
        Else If (node.type = OR)
            node.inner-value infinity
            For child in node.children
                If (child.inner-value < node.inner-value)
                    node.inner-value = child.inner-value
                    node.best-child = child
        Else If (node.type = AND)
            node.inner-value = 0
            For child in node.children
                node.inner-value += child.inner-value
find-optimal-solution(root-node, node-value-function)
    Subroutine get-node-solution(node)
        If (node.type = terminal)
            return(list(node.terminal-object))
        Else If (node.type = OR)
            return(get-node-solution(node.best-child))
        Else If (node.type = AND)
            Let solution = {}
            For child in node.children
                solution = append(solution, get-node-solution(child))
            return(solution)
    compute-inner-values(sort-nodes(root-node), node-value-function)
    return(get-node-solution(root-node))
```

FINDING MINIMUM VALUE

Another procedure 312b finds, for each node, the best (i.e., minimum) value of some value-function over all the set of pricing solutions involving that node. Price function 312b finds for each itinerary, the cheapest price of any pricing solution that contains that itinerary. These values can be computed efficiently, if the value-function can be decomposed into a node-value-function.

The best price value function 312a computes inner-values, as above, and computes for every node, an outer-value, equal to the minimum value contributed by all parts of the graph except that represented by the node. For each node, the minimum value of the value-function over all solutions that involve the node, (i.e., the total-value) is computed as the sum of that node's inner-value and outer-value.

The outer-value and total-value of a node are computed in a manner very similar to the computation of the inner-value. In particular, the outer-value for each node is calculated starting from the root of the graph, that has an outer-value of 0. Each node propagates outer-values down to its children. An OR-node passes its outer-value unchanged. An AND-node adds to its outer-value the inner-values of all children except that being propagated to. At every node, after the outer-value has been computed, the total-value is computed as the sum of the inner-value and outer-value.

When outer-values are propagated from a node to its children, a minimum computation is performed. This is because each child may have more than one parent, and its outer-value must be the minimum outer-value contributed by any parent. See TABLE 39 below.

TABLE 39

```
compute-outer-and-total-values(root-node, node-value-function)
            // Sort nodes and computer inner-values.
            Let sorted-nodes = sort-nodes(root-node)
            compute-inner-values(sorted-nodes, node-value-function)
            Let reversed-nodes = reverse(sorted-nodes)
        // Initialize all nodes to have outer-values of infinity.
        For node in reversed-nodes
            node.outer-value = infinity
        // The root-node has an outer-value of 0.
        first(reversed-nodes).outer-value = 0
        For node in reversed-nodes
            // Compute the total-value for the node.
            node.total-value = node.inner-value + node.outer-value
            If (node.type = OR)
                // For OR nodes, the outer-value is propagated down to its children unchanged.
                For child in node.children
                    child.outer-value = minimum(child.outer-value, node.outer-value)
            Else If (node.type = AND)
                // For AND nodes, the outer-value is propagated down by adding the inner-values of
```

TABLE 39-continued

```
// all but the child being propagated to. This is equal to the node's inner-value minus
// the child's inner-value, which is equal to the node's total-value minus the child's
// inner-value.
For child in node.children
        child.outer-value = minimum(child.outer-value, node.total-value - child.inner-value)
```

INVALIDATING NODES

It may be desirable to "invalidate" 314 certain nodes from the pricing-graph 38'. For example, itineraries containing or not containing specified airlines could be marked as not participating in the above algorithms, enabling the algorithms to find the best solutions involving or not involving these itineraries. The above algorithms can be easily adapted to accommodate checking whether the node is valid. In particular, the computation of inner-values, the first step in all the above algorithms, is modified to mark for every node whether the node represents any valid partial pricing-solutions given a specific query parameter. This information can be used in the rest of the algorithms. Every terminal node contains a field "valid?" that is either true or false. The compute-inner-values procedure uses these values to set the "valid?" field for non-terminals. See TABLE 40 below:

TABLE 40

```
// Initialize all nodes to have outer-values of infinity.
For node in reversed-nodes
      node.outer-value = infinity
// The root-node has an outer-value of 0.
first(reversed-nodes).outer-value = 0
For node in reversed-nodes
      If (node.valid? = true)
            // Compute the total-value for the node.
            node.total-value = node.inner-value + node.outer-value
            If (node.type = OR)
                  // For OR nodes, the outer-value is propagated down to its children unchanged.
                  For child in node.children
                        child.outer-value = minimum(child.outer-value, node.outer-value)
            Else If (node.type = AND)
                  // For AND nodes, the outer-value is propagated down by adding the inner-values of
                  // all but the child being propagated to. This is equal to the node's inner-value minus
                  // the child's inner-value, which is equal to the node's total-value minus the child's
                  // inner-value.
                  For child in node.children
                        child.outer-value = minimum(child.outer-value,
                                                           node.total-value - child.inner-value)
sort-nodes (node)
If (not(find(node,nodes)))
For child in node.children
sort-nodes-inner(child)
nodes +=node
sort-nodes-inner(node);
return (nodes)
compute-inner-values(sorted-nodes, node-value-function)
      For node in sorted-nodes
            If (node.type = terminal)
                  node.inner-value = apply(node-value-function, node.terminal-object)
            Else If (node.type = OR)
                  node.inner-value = infinity
                  node.valid? = false
                  For child in node.children
                        If (child.valid? = true and child.inner-value <node.inner-value)
                              node.inner-value = child.inner-value
                              node.best-child = child
                              node.valid? = true
            Else If (node.type = AND)
                  node.inner-value = 0
                  node.valid? = true
                  For child in node.children
                        If (child.valid? = true)
                              node.inner-value += child.inner-value
                        Else
                              node.valid? = false
find-optimal-solution(root-node, node-value-function)
      Subroutine get-node-solution(node)
            If (node.type = terminal)
                  return(list(node.terminal-object))
            Else If (node.type = OR)
                  return(get-node-solution(node.best-child)
            Else If (node.type = AND)
                  Let solution = {}
                  For child in node.children
```

TABLE 40-continued

```
            solution = append(solution, get-node-solution(child))
            return(solution)
    compute-inner-values(sort-nodes(root-node), node-value-function)
    If (root-node.valid? = true)
        return(get-node-solution(root-node))
    Else
        return(nil)
compute-outer-and-total-values(root-node, node-value-function)
    // Sort nodes and computer inner-values.
    Let sorted-nodes = sort-nodes(root-node)
    compute-inner-values(sorted-nodes, node-value-function)
    Let reversed-nodes = reverse(sorted-nodes)
// Initialize all nodes to have outer-values of infinity.
For node in reversed-nodes
    node.outer-value = infinity
// The root-node has an outer-value of 0.
first(reversed-nodes).outer-value = 0
For node in reversed-nodes
    If (node.valid? = true)
        // Compute the total-value for the node.
        node.total-value = node.inner-value + node.outer-value
        If (node.type = OR)
            // For OR nodes, the outer-value is propagated down to its children unchanged.
            For child in node.children
                child.outer-value = minimum(child.outer-value, node.outer-value)
        Else If (node.type AND)
            // For AND nodes, tne outer-value is propagated down by adding the inner-values of
            // all but the child being propagated to. This is equal to the node's inner-value minus
            // the child's inner-value, which is equal to the node's total-value minus the child's
            // inner-value.
            For child in node.children
                child.outer-value = minimum(child.outer-value,
                                     node.total-value - child.inner-value)
```

ENUMERATING PRICING SOLUTIONS

It is often desirable to arbitrarily enumerate many pricing solutions: the best, the second-best, the third-best, etc.

The enumeration algorithm 312c maintains a queue of partial-solutions, ordered by the lowest possible total value (e.g., price, 312c') of the value-function over all complete solutions that contain the partial-solution. At the start of the search, a single partial solution is constructed from the root node of the pricing-graph 38'. At each step the best partial-solution is dequeued, and expanded. Each partial-solution has a set of non-terminal nodes and a set of terminal objects. A partial-solution is expanded by selecting a non-terminal node and substituting the node's children (all of its children in the case of an AND, one of its children in the case of an OR). If a dequeued partial-solution contains only terminal objects, it is complete, and is returned. This process continues until the desired number of pricing-solutions that can be specified by a user has been produced.

The algorithm can accommodate value-functions that cannot be decomposed into the sum of a node-value-function. It does this by applying a second penalty-value-function to partial pricing-solutions as it constructs them. This function returns a non-negative number when given a new terminal object and existing set of terminal objects. The number is added to the values produced by the normal node-value-function. If the number is positive, it acts as a penalty. An example of how this could be used is for the case where a penalty is applied if travel in two slices is on different airlines. The penalty-value-function would return a (positive) penalty if the terminal was an itinerary, and the set of existing terminals contained an itinerary with travel on different airlines. Otherwise it would return 0. See TABLE 41 below.

TABLE 41

```
compute-inner-values(sorted-nodes, node-value-function)
    For node in sorted-nodes
        If (node.type = terminal)
            node.inner-value = apply(node-value-function, node.terminal-object)
        Else If (node.type = OR)
            node.inner-value = infinity
            node.valid? = false
            For child in node.children
                If (child.valid? = true and child.inner-value < node.inner-value)
                    node.inner-value = child.inner-value
                    node.best-child = child
                    node.valid? = true
        Else If (node.type = AND)
            node.inner-value = 0
            node.valid? = true
            For child in node.children
                If (child.valid? = true)
                    node.inner-value += child.inner-value
                Else
```

TABLE 41-continued

```
            node.valid? = false
find-optimal-solution(root-node, node-value-function)
    Subroutine get-node-solution(node)
        If (node.tvpe = terminal)
            return(list(node.terminal-object))
        Else If (node.type = OR)
            return(get-node-solution(node.best-daughter))
        Else If (node.type = AND)
            Let solution = {}
            For child in node.children
                solution = append(solution, get-node-solution(child))
            return(solution)
    compute-inner-values(sort-nodes(root-node), node-value-function)
    If (root-node.valid? = true)
        return(get-node-solution(root-node))
    Else
        return(nil)
compute-outer-and-total-values(root-node, node-value-function)
    // Sort nodes and computer inner-values.
    Let sorted-nodes = sort-nodes(root-node)
    compute-inner-values(sorted-nodes, node-value-function)
    Let reversed-nodes = reverse(sorted-nodes)
    // Initialize all nodes to have outer-values of infinity.
    For node in reversed-nodes
        node.outer-value = infinity
    // The root-node has an outer-value of 0.
    first(reversed-nodes).outer-value = 0
    For node in reversed-nodes
        If (node.valid? = true)
            // Compute the total-value for the node.
            node.total-value = node.inner-value + node.outer-value
        If (node.type = OR)
            // For OR nodes, the outer-value is propagated down to its children unchanged.
            For child in node.children
                child.outer-value = minimum(child.outer-value, node.outer-value)
        Else If (node.type = AND)
            // For AND nodes, the outer-value is propagated down by adding the inner-values of
            // all but the child being propagated to. This is equal to the node's inner-value minus
            // the child's inner-value, which is equal to the node's total-value minus the child's
            // inner-value.
            For child in node.children
                child.outer-value = minimum(child.outer-value,
                                    node.total-value - child.inner-value)
```

Figure 20:
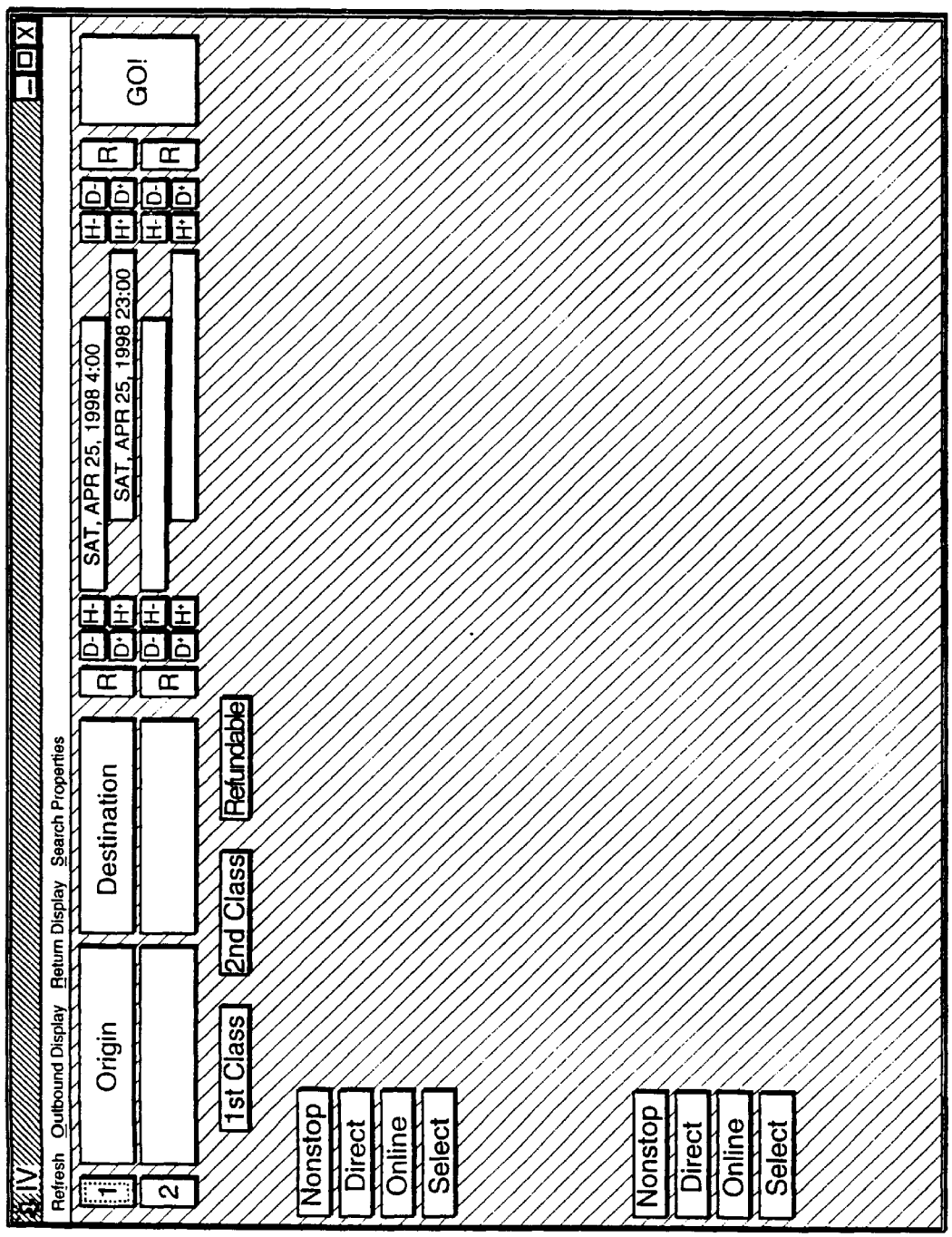
FIG. 20; is a diagram of a window depicting a user interface.

Referring now to FIG. 20, a window 350 that is part of a graphical user interface of the client process 36 (FIG. 3) is shown. The graphical user interface permits the user to access inter alia the enumeration processes 304, value functions 306 and invalidate routine 307. The graphical user interface has user selectable controls 352 such as "origin" and "destination". There are also controls for selecting time and date. In addition, there are controls 352 that specify "slices" of a journey. The user enters values corresponding to origin, destination, dates and time by selecting an appropriate one of the controls. The origin and destination controls 352 invoke a query window (FIG. 21) where the user can enter a value. After the origin destination and preferably date and time information are entered, a user control "GO" becomes activated. Pressing the "GO" button will, for an initial query, send the query to the server process 18. The server process handles the query and initiates the server process 18. The server process 18 returns to the client process 36 a set of pricing solutions in a compact representation such as the pricing graph 38'.

Figure 21:
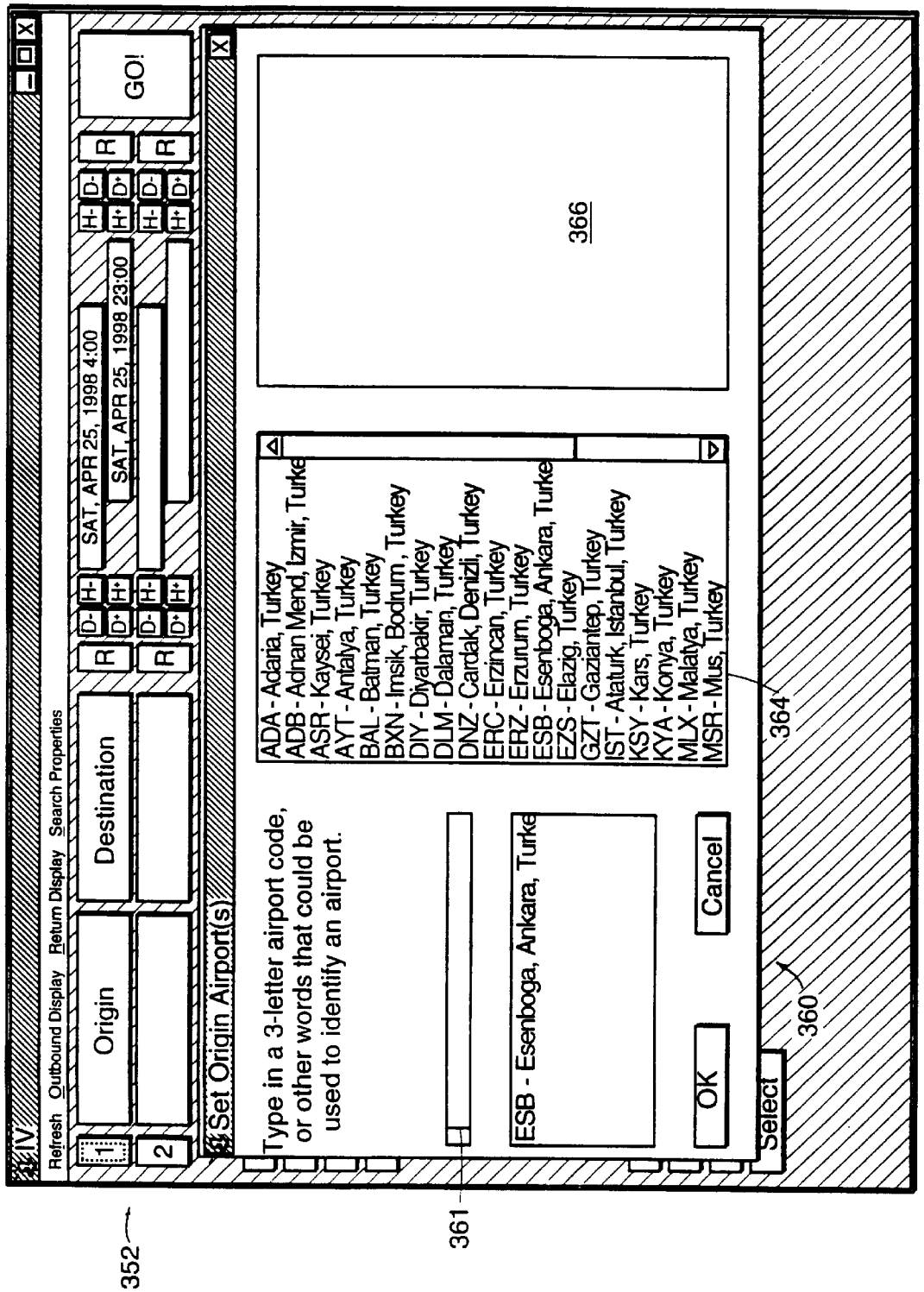
FIG. 21 is a diagram of a window used in an initial query.

Referring now to FIG. 21, a query entry window 360 is shown. The query entry window 360 is produced by activating either the ORIGIN or DESTINATION controls 352 in the window 350. The query window 360 includes a user entry area 361 for entering a destination code or origin code (as appropriate) such as a three letter airport code or a location such as a city, region or country (e.g., Turkey). Region 364 depicts a listing of airports in a region about the location entered in area 361, whereas area 364 lists origins and destinations of a flight slice (none shown) that has been selected for the query. In addition, in the entry area 361 the user can enter more than one airport or region. The query can be constructed, therefore, with two or more origins and destinations appearing in each slice of a journey and the pricing solution would be determined for the various combinations.

Figure 22:
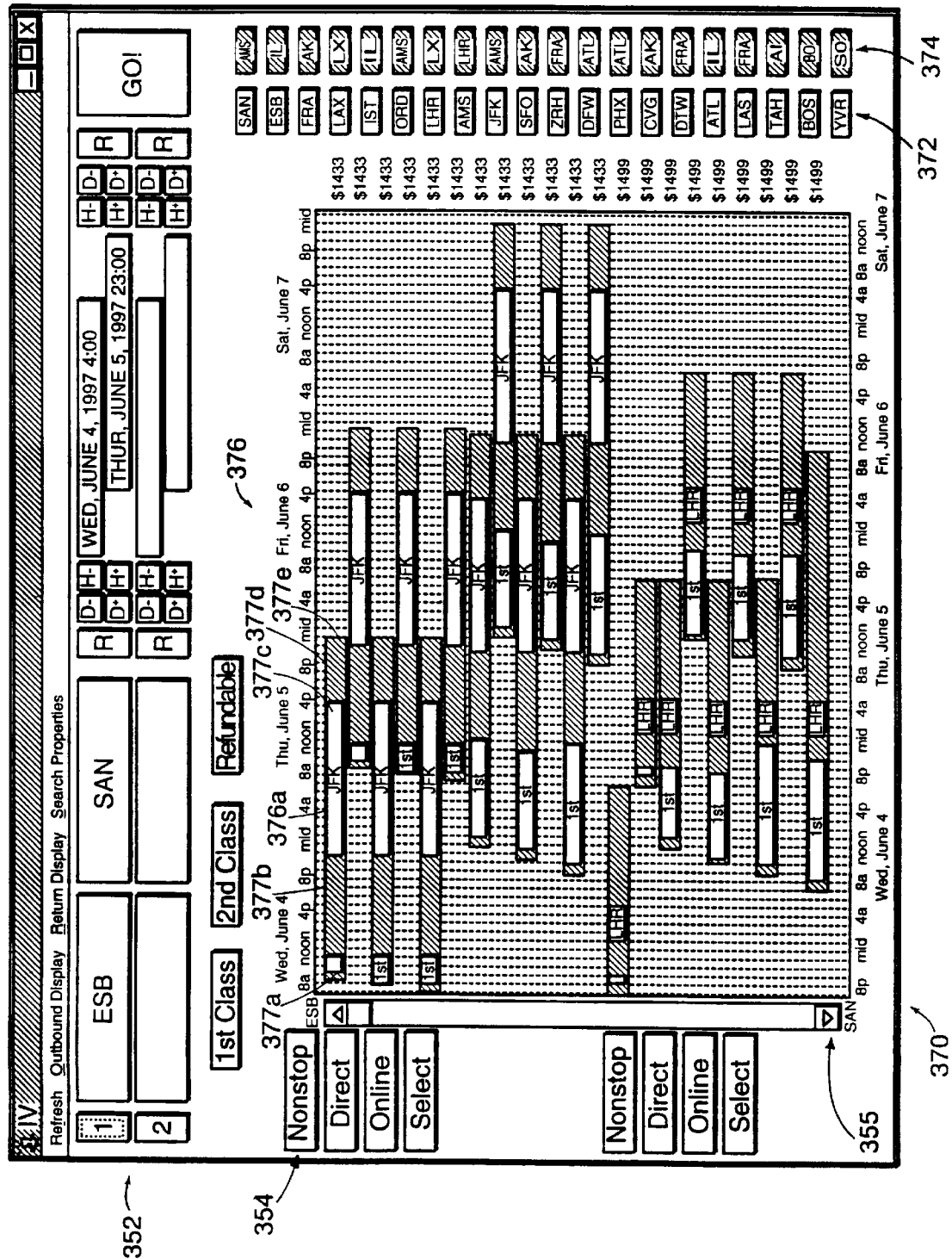
FIG. 22 is a diagram of a window depicting an exemplary solution of a one-way travel request.

Referring now to FIG. 22, a window 370 is illustrated. Window 370 appears after a user query input to the server process 18 producing the pricing graph 38' that is sent to the client process 36 (FIG. 3). Window 370 is an example of a single slice journey. Since window 370 depicts a one-way (i.e., single slice journey), only controls 352 corresponding to the first slice are shown as activated with information about the slice. Window 370 includes the same controls or buttons 352, as described above with respect to window 350. The window 370 also includes a series of user preference controls 354, here "Nonstop", "Direct", "Online (on the same airline)" and "Select" shown as not activated and "1st class", "2nd class" and "Refundable" shown activated. The Nonstop, Direct and Online controls when selected by a user will eliminate all components from the pricing solution that do not correspond to nonstop, direct or online flights. A select control operates in conjunction with the user marking one or more potential pricing solutions such that the numbers which appear shaded out are activated. When one or more of the pricing solutions are activated and the select button is pressed, the client process extracts pricing solutions from the pricing graph. The "1st class", "2nd class" and "Refundable" controls when activated eliminate fares that do not correspond to these classes of travel.

The window 370 also includes a listing 372 of airports involved in the results provided from the pricing graph 38', as well as, a listing 374 of airlines.

The window 370 has a graphical region that provides a visual representation of pricing solutions extracted from the pricing graph 38'. One preferred representation of the pricing solution is a horizontal bar graph 376. The itineraries are ordered by increasing total fare with each entry 376a of the bar graph corresponding to a set of flight segments on airlines that provide travel from the origin (e.g., "ESB") to the destination (e.g., SAN, San Diego International Airport) on airlines coded in accordance with the legends for the airline in listing 374 with stopovers denoted by airports. The bar graph representation displays a metric of the pricing solution in a graph format. Thus, as shown for the first entry 376a, there are two legs 377a, 377b on airline "TK" with a stopover 377c at airport "JFK" and two legs 377d and 377e on airline "HP" arriving in San Diego (SAN). As shown in FIG. 22, twenty-one possible solutions are represented in the horizontal bar graph ordered by increasing total fare. This typically represents a small fraction of the total number of pricing solutions that may be represented by the pricing graph 38'. Other ones, if they exist, can be revealed by manipulation of a scroll bar 355.

Referring now to FIG. 23, a window 380 illustrates a sample pricing solution including an itinerary 382 and fares 384. In this embodiment, such a window is produced by double-clicking on an itinerary such as 376a. Such a pricing solution is extracted from the pricing-graph 38' by invalidating 314 all other itineraries in the same slice and then using procedure 314 to find the single cheapest remaining pricing-solution. The window 380 illustrates the sample outbound itinerary 382 with fares 384. The itinerary 382 can be selected, for example, by double clicking on the itinerary or by using the right button of a computer mouse and so forth. For example, what is displayed in this interface are the itineraries (which are TERMINAL NODES in the pricing graph 38') along with their associated "lowest prices" that are computed by running algorithm 304b (with value function such that it computes for every node in the graph the lowest total price for any pricing solution involving the node.

Figure 24:
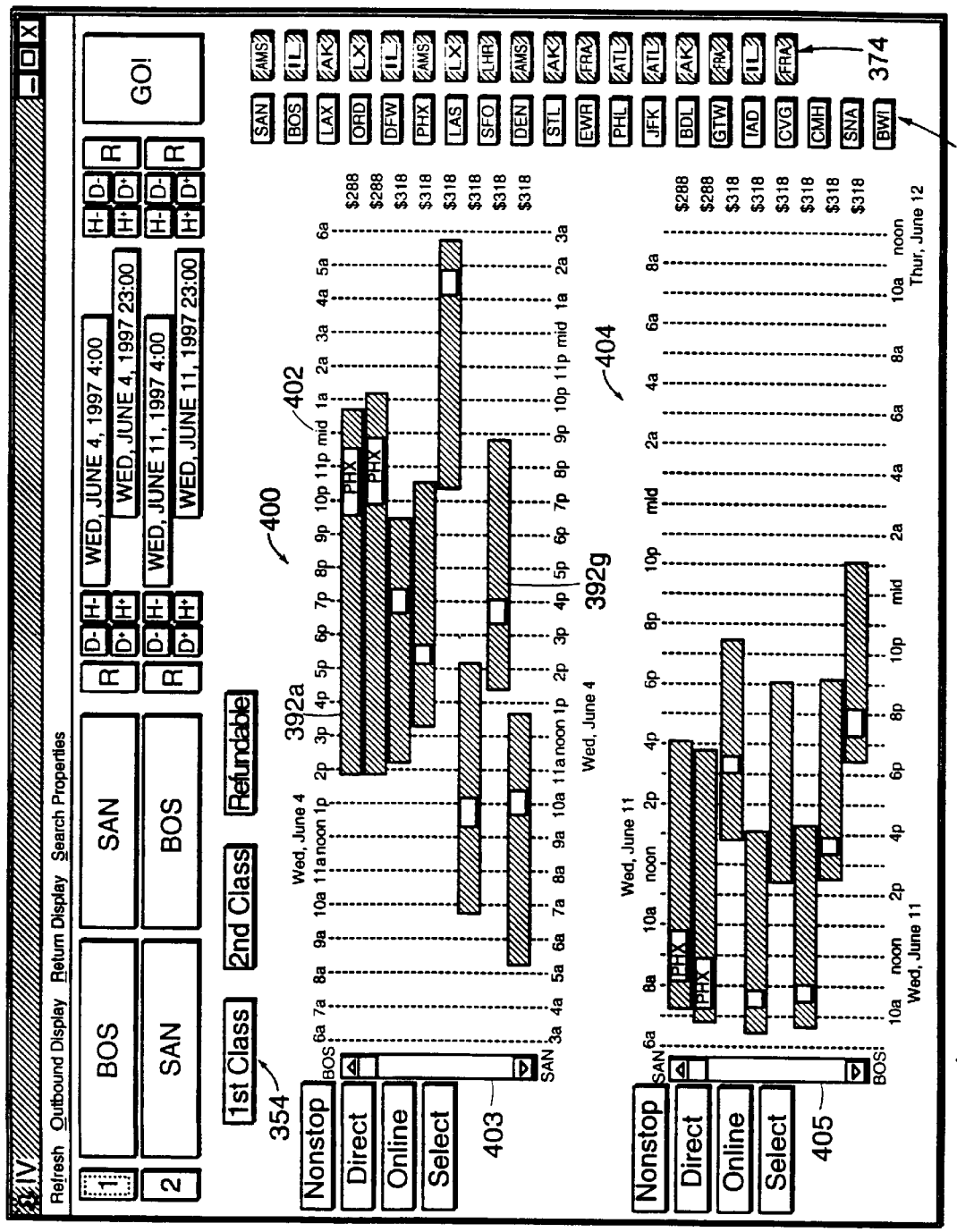
FIG. 24 is a diagram of a window depicting an exemplary solution of round trip travel request.

Referring now to FIG. 24, a second example of a window 390 containing pricing solutions is shown. Window 390 illustrates a round trip journey between Boston (BOS) and San Diego (SAN). The window 390 includes a section 380 including user controls 352 that permit user entry and modification of the results in the window as described above in conjunction with FIG. 22. Here, however, controls are shown activated for both slice 1 and slice 2 of the journey.

The window also includes the airport 372 and airline lists 374 and a graphical representation 400 of information (e.g., itineraries) with a subsection 402 corresponding to outbound or first slice information (e.g., itineraries) and section 404 corresponding to inbound or second slice information. Each graphical section 402, 404 is a horizontal bar graph and includes scroll bar controls 403 and 405, respectively. In addition, the window also includes user preference controls 354 shown activated for the first and the second slices of the journey.

Figure 25:
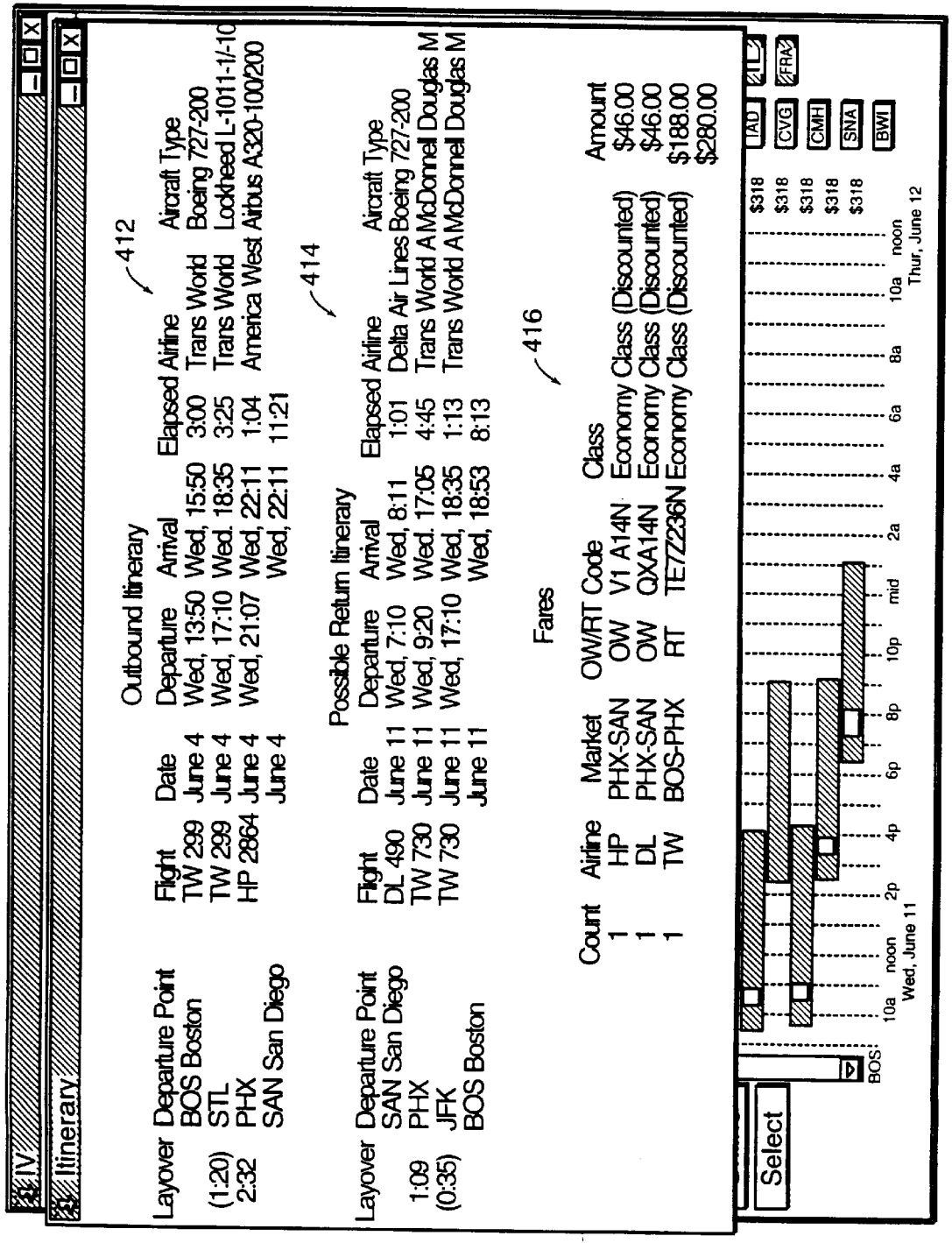
FIG. 25 is a diagram of a window depicting an outbound itinerary and a possible return itinerary and associated fares corresponding to one of the solutions depicted in FIG. 24.

In a similar manner as discussed in conjunction with FIG. 23, double clicking or otherwise selecting an illustrative ITINERARY, for example, the first ITINERARY 392a will produce an itinerary window 410 (FIG. 25) that depicts information corresponding to the selected outbound itinerary 412 as well as information for possible return itineraries 414 selected in accordance with the current outbound itinerary. The window 410 also includes fare information 416.

Figure 26:
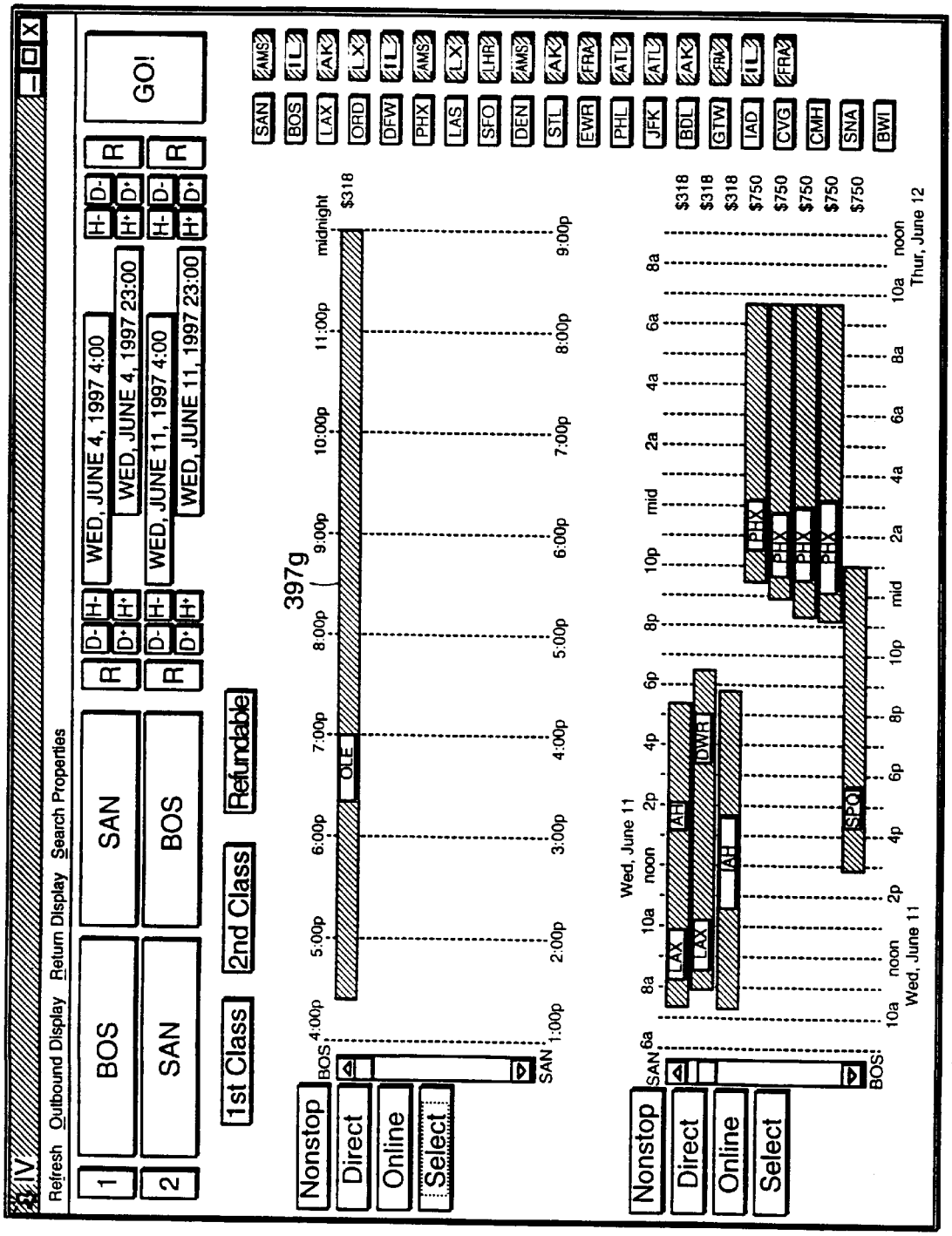
FIG. 26 shows the window generally depicted in conjunction with FIG. 24 modified based upon a user selected criteria.

Referring now to FIG. 26, a window 390' is shown. This window depicts a subset of the set of pricing solutions represented by the pricing graph as displayed in window 390 (FIG. 24). The subset is selected by activating the "Select" button and highlighting a pricing solution (e.g., 392g, FIG. 24). The window 390' depicts possible return itineraries that can be matched with the selected outbound itinerary 392g and the corresponding total fares for the itinerary. This operation modifies the pricing solutions and is performed within the client process 36. The client process uses the node invalidating function described in conjunction with FIG. 19.

Another process that can use the node invalidated function 316 described in conjunction with FIG. 19 would permit the user to point and click at certain airports and/or airlines represented as icons in fields (not numbered). In one mode, by selecting airline and/or airport pricing solutions that do not include the selected airline or airports are not extracted from the pricing graph 38'. In an alternate mode, selecting an airline or airport does not extract solutions containing the selected airline and/or airport from the pricing graph.

The pricing graph can be viewed in other ways through the activation of the pull down menus shown in any of FIGS. 22, 24 and 26. For example, as shown in FIG. 22, there are four pull down menus "refresh", "outbound display", "return display" and "search properties." The refresh display will permit storing queries and permit a user to refresh the display. The outbound display menu will permit the user to resort the data according to any one of a number of characteristics. Example characteristics include, but are not necessarily limited to, cost, duration, departure time, arrival time, number of legs, number of segments and so forth. The outbound display can also be adjusted to allow a user to change the horizontal axis to a time or duration axis as well as change the itinerary size to have it displayed small or large. A similar arrangement is provided for the return display. The search properties allow a user to conduct a faring search by computing fares or not computing fares, that is, by providing complete pricing solutions or merely just activating the schedule portion of the server process 18. The search properties also permit the user to search by legs or segments, specify a search time, a number of itineraries and number of extra itineraries to discard.

Each of the display options referred to above make use of one or more of the value functions and processes described in conjunction with FIG. 19 and permitting the client process to extract or manipulate the pricing graph 38'. Accordingly, the pull down menus as well as the other controls on the graphical user interface are the user interface to the "value" functions and enumeration processes described above.

Figure 27:
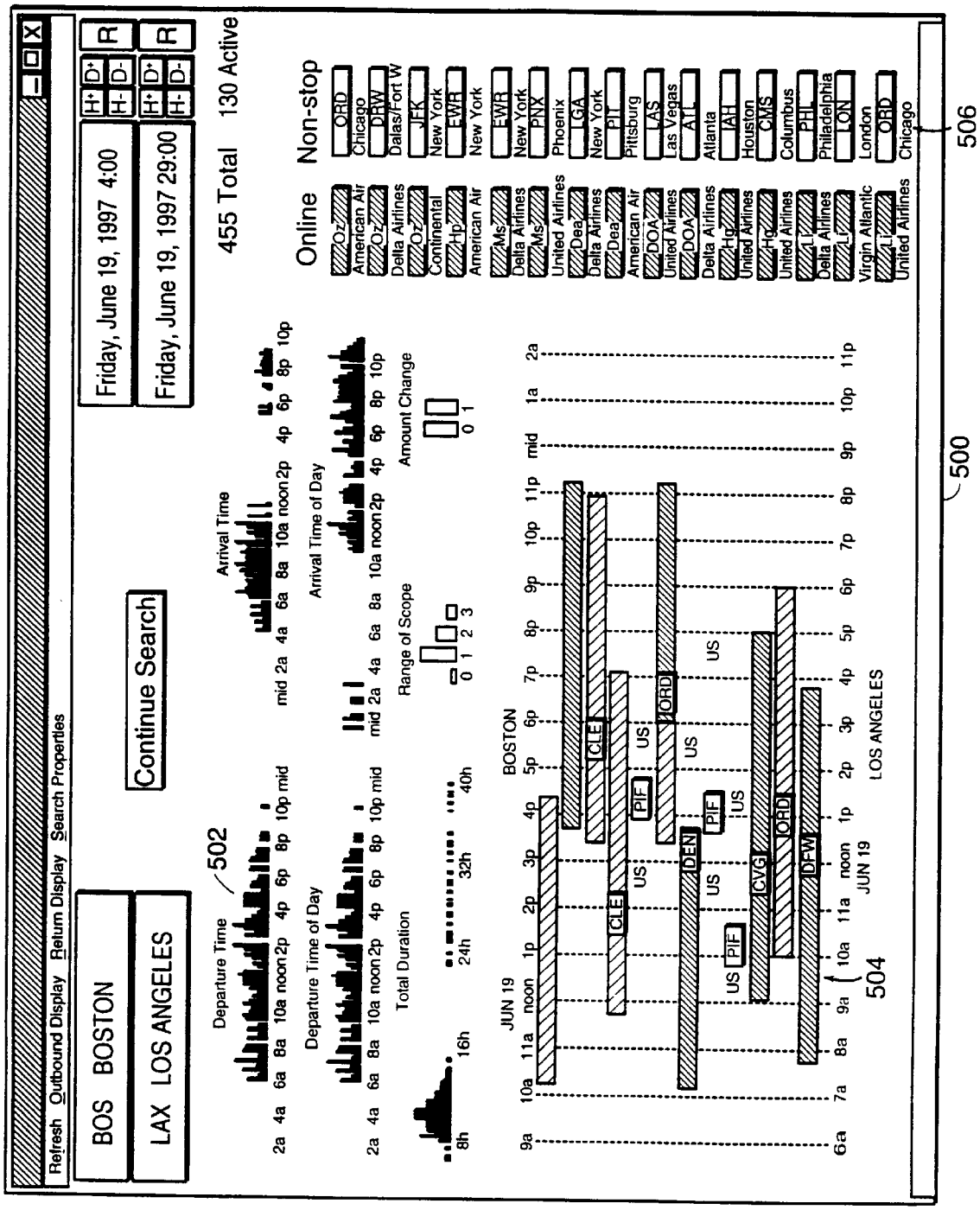
FIG. 27 shows a window depicting a histogram

Referring now to FIG. 27, a window 500 is shown. The window 500 includes an ensemble of travel options depicted as a histogram 502. The histogram 502 is a plot of an metric or option such as time as the x axis versus the number of itineraries on the y axis. Portions of the histogram representation can be selected and the processes above will invalidate all travel node that are not selected. These will provide corresponding changes in a bar graph representation 504 disposed below the histogram 502. This will also affect a list airports 506 by possible changing a visual appearance of icons in the list 506.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of validating fares in a travel planning system comprises:

retrieving a fare rule for a fare;

applying the retrieved fare rule to an itinerary to determine an answer as to whether the fare can be used with the itinerary; and storing the answer provided from applying the rule and determining for a subsequent application of the rule to a fare whether there is a stored answer as to whether the fare can be used with the itinerary that corresponds to a previous application of the rule to be applied to a fare component and, if there is a stored answer, return the stored answer.

2. The method of claim 1 wherein if the rule does not have a corresponding stored answer, further comprising:

retrieving the rule; and applying the rule to the itinerary and storing the answer resulting from applying the rule.

3. The method of claim 1 wherein the itinerary includes a sequence of flight segments spanned by a single fare.

4. The method of claim 1 wherein the itinerary is a faring atom that corresponds to a sequence of flight segments spanned by a single fare.

5. A method for retrieving rules over multiple travel dates comprises:

retrieving rules from a rules database that divides rules according to sets of records having travel dates;

finding a first record from the sets of records that is matched to a current fare;

storing an answer of applying the matched record and storing a latest travel date for which the answer remains valid and;

determining for subsequent travel dates whether the subsequent travel date falls within a bound defined by the stored date.

6. The method of claim 5 wherein if the subsequent date does fall within the bound of the stored date;

using the stored result corresponding to the stored travel date to validate the fare.

7. The method of claim 5 wherein if the travel date does not fall within the bound of the stored travel date, comprising:

retrieving rules for the subsequent travel date.

8. The method of claim 5 wherein retrieving rules comprises:

retrieving rules from the rules database;

finding a first rule matched to the current fare; and storing the resulting answer of applying the rule.

9. A method of validating faring atoms for an airline travel planning system comprises:

retrieving a faring atom and determining whether a previous answer of applying a current rule is stored in the faring atom; and if the previous answer is stored, returning the previous stored answer for the current rule.

10. The method of claim 9 wherein if an answer for a rule is not stored, applying the rule.

11. The method of claim 10 wherein applying the rule further comprises:

storing the answer of applying the rule in the faring atom.

12. The method of claim 10 further comprising:

evaluating whether application of the rule returns a pass or defer result and, if it returns a pass or defer result, constructing a fare component from the faring atom.

13. The method of claim 12 wherein if the application returns a defer answer further comprising:

storing the deferred rule in the fare component.

14. The method of claim 11 further comprising:

evaluating whether application of the rule returns a pass or defer answer and, if it returns a pass or defer answer, constructing a faring component from the faring atom.

15. The method of claim 14 wherein if the application returns a defer answer further comprising:

storing the deferred rule in the fare component.

16. A computer program product residing on a computer readable medium for validating faring atoms, for inclusion in a pricing solution of a travel planning system, comprises instructions for causing a computer to:

retrieve rules from a rules database that divides rules according to hierarchical sets of records;

search each hierarchical set of records for a first record from the hierarchical sets of records that matches a current faring atom;

store matched records and a latest date for which a result of applying the matched record remains valid;

determine for a subsequent travel date of the faring atom whether the subsequent travel date of the faring atom falls within a bound defined by the stored travel date; and if the subsequent travel date does fall within the bound of the stored date, use a rule corresponding to the stored travel date to validate the faring atom.

17. The product of claim 16 wherein if the date does not fall within the bounds of the stored date, the instructions retrieve rules for the subsequent date.

18. The product of claim 17 wherein instructions that cause the computer to retrieve rules comprises instructions for causing the computer to:

retrieve rules from the rules database and find a first rule matched to the current fare and store the rule.

19. A computer program product residing on a computer readable medium for validating fares for inclusion in a pricing solution of a travel planning system, comprises instructions for causing a computer to:

retrieve a fare rule for a fare;

apply the rule to an itinerary to provide an answer as to whether the fare can be used with the itinerary; and store the answer resulting from the applied rule and determine for a subsequent application of the rule whether there is a answer that corresponds to a previous application of the rule to be applied to a fare component; and, if there is a stored answer; return the stored answer.

20. The product of claim 19 wherein if the rule does not have a corresponding stored answer, the instructions cause the computer to apply the rule to the fare.

21. The product of claim 19 wherein the fare is represented as a faring atom that corresponds to a sequence of flight segments spanned by a single fare.

22. The method of claim 20 wherein the fare is a faring atom that corresponds to a sequence of flight segments spanned by a single fare.

23. A computer program product residing on a computer readable medium for validating faring atoms, for inclusion in a pricing solution for an airline travel planning system, comprises instructions for causing a computer to:

retrieve a faring atom and determining whether a current rule has an answer that is stored in the retrieved faring atom; and if the current rule has a result that is stored in the retrieved faring atom, return the answer stored for the rule; if the current rule has a result that is not stored in the faring atom, apply the rule to the fare.

24. The product of claim 23 wherein instructions that cause the computer to apply the rule further comprise instructions that cause the computer to:

cache the answer provided by the application of the rule in the faring atom.

25. The product of claim 24 further comprising instructions that evaluate the rule and, if it returns a pass or defer answer, construct a faring component from the faring atom.

26. The product of claim 25 wherein if the application returns a defer answer further comprising instructions that cause the computer to:

store the deferred record in the fare component.

27. A travel planning system, comprises:

a computer; and a computer readable medium including:

a computer program product residing on the computer readable medium for validating faring atoms, for inclusion in a pricing solution provided by the travel reservation system, comprises instructions for causing to:

retrieve rules from a rules database that divides rules according to hierarchical sets of records;

search the hierarchical sets of records for a first record from the hierarchical sets of records that matches a current faring atom;

store matched records and a latest travel date for which a result of applying the matched record remains valid;

determine for a subsequent travel date of the faring atom whether the subsequent travel date of the faring atom falls within a bound defined by the stored travel date; and if the subsequent travel date does fall within the bound of the stored travel date, use a stored answer corresponding to the stored travel date to validate the faring atom.

28. The system of claim 27 wherein if the computer program product determines that the date does not fall within the bounds of the stored date, the instructions retrieve rules for the subsequent date.

29. The system of claim 27 wherein the instructions of the computer program product to cause the computer to retrieve rules further comprises instructions for causing the computer to:

retrieve rules from the rules database; and find a first rule matched to the current fare and store the answer obtained from applying the rule.

* * * * *